(12) United States Patent
Watanabe

(10) Patent No.: US 7,565,343 B2
(45) Date of Patent: Jul. 21, 2009

(54) SEARCH APPARATUS AND SEARCH MANAGEMENT METHOD FOR FIXED-LENGTH DATA

(75) Inventor: Shinpei Watanabe, Yokohama (JP)

(73) Assignee: IPT Corporation, Kanagawa (JP)

( * ) Notice: Subject to any disclaimer, the term of this patent is extended or adjusted under 35 U.S.C. 154(b) by 0 days.

(21) Appl. No.: 10/599,589

(22) PCT Filed: Mar. 31, 2004

(86) PCT No.: PCT/JP2004/004641

§ 371 (c)(1), (2), (4) Date: Oct. 2, 2006

(87) PCT Pub. No.: WO2005/104456

PCT Pub. Date: Nov. 3, 2005

(65) Prior Publication Data

US 2007/0194957 A1 Aug. 23, 2007

(51) Int. Cl.
*G06F 17/30* (2006.01)
(52) U.S. Cl. .............................. 707/3; 707/101; 704/1; 704/200; 706/45; 706/61; 711/5; 711/216; 715/764; 715/862; 717/136; 717/161
(58) Field of Classification Search .................. None
See application file for complete search history.

(56) References Cited

U.S. PATENT DOCUMENTS

| | | | | |
|---|---|---|---|---|
| 3,350,695 A | * | 10/1967 | Kaufman et al. ............... | 707/2 |
| 4,558,302 A | * | 12/1985 | Welch .......................... | 341/51 |
| 5,586,292 A | * | 12/1996 | Yamaguchi ................... | 711/114 |
| 5,796,734 A | * | 8/1998 | Izawa et al. .................. | 370/394 |
| 6,058,392 A | * | 5/2000 | Sampson et al. ............... | 707/6 |
| 6,678,678 B2 | * | 1/2004 | Lee et al. ....................... | 707/3 |
| 6,898,661 B2 | | 5/2005 | Mori et al. | |
| 6,910,118 B2 | * | 6/2005 | Kagawa ....................... | 711/216 |
| 7,124,278 B2 | | 10/2006 | Mori et al. | |
| 7,178,100 B2 | * | 2/2007 | Call ............................. | 715/513 |
| 2001/0032201 A1 | * | 10/2001 | Lee et al. ...................... | 707/3 |

(Continued)

FOREIGN PATENT DOCUMENTS

EP        1 045 556  A2    10/2000

(Continued)

OTHER PUBLICATIONS

International Search Report for PCT/JP2004/004641, mailed Aug. 17, 2004.

*Primary Examiner*—Pierre M Vital
*Assistant Examiner*—Augustine Obisesan
(74) *Attorney, Agent, or Firm*—Alston & Bird LLP

(57) ABSTRACT

Fixed-length data (560) contained in a database (560) are segmented into a number of pieces of data that are searchable at a time and searching is performed at high speed. As means for it, a pointer table (500), a secondary pointer table, a local table, and a fixed-length-data table are provided, and when more segmentation is required, a table having a numeric-value comparing function is further provided. As means for performing efficient configuration/management of the tables and for performing management that does not interfere with a search operation, an empty-house table (700), an empty-room table (720), a room-management table (740), and a structure-management table (760) may be provided.

20 Claims, 31 Drawing Sheets

U.S. PATENT DOCUMENTS

| | | |
|---|---|---|
| 2003/0009453 A1* | 1/2003 | Basso et al. .................... 707/3 |
| 2003/0135369 A1* | 7/2003 | Stoimenov et al. .......... 704/235 |
| 2003/0174710 A1* | 9/2003 | Gooch .................. 370/395.32 |
| 2004/0205056 A1 | 10/2004 | Mori et al. |
| 2004/0215609 A1 | 10/2004 | Takatsu et al. |

FOREIGN PATENT DOCUMENTS

| | | |
|---|---|---|
| JP | 2000/307641 A | 11/2000 |
| JP | 2002/305539 A | 10/2002 |
| JP | 2003/500901 A | 1/2003 |
| JP | 2003 143198 | 5/2003 |
| JP | 2004 015592 | 1/2004 |
| JP | 2004 227434 | 8/2004 |
| WO | WO 00/70832 | 11/2000 |
| WO | WO 2005/104456 A1 | 11/2005 |

* cited by examiner

FIG.12

OUTPUT DATA TO OUTPUTTING MEANS

MATCH RESULT OUTPUT

| SEARCH RESULT | SYNCHRONIZATION SEARCH NUMBER | FIXED-LENGTH-DATA NAME |
|---|---|---|

MISMATCH RESULT OUTPUT

| SEARCH RESULT | SYNCHRONIZATION SEARCH NUMBER | MEANINGLESS DATA |
|---|---|---|

OUTPUT DATA TO MODIFYING MEANS

| SYNCHRONIZATION SEARCH NUMBER | DATA TABLE INDEX |
|---|---|

OUTPUT DATA TO POINTER PROCESSING MEANS

WHEN PREVIOUS NEXT PROCESS IS NOT NVC OPERATION

| SYNCHRONIZATION SEARCH NUMBER | ENTRY CONTROL DATA (SEE FIG. 15) |
|---|---|

WHEN PREVIOUS NEXT PROCESS IS NVC OPERATION

| SYNCHRONIZATION SEARCH NUMBER | FIXED-LENGTH-DATA TABLE INDEX OBTAINED BY NVC OPERATION |
|---|---|

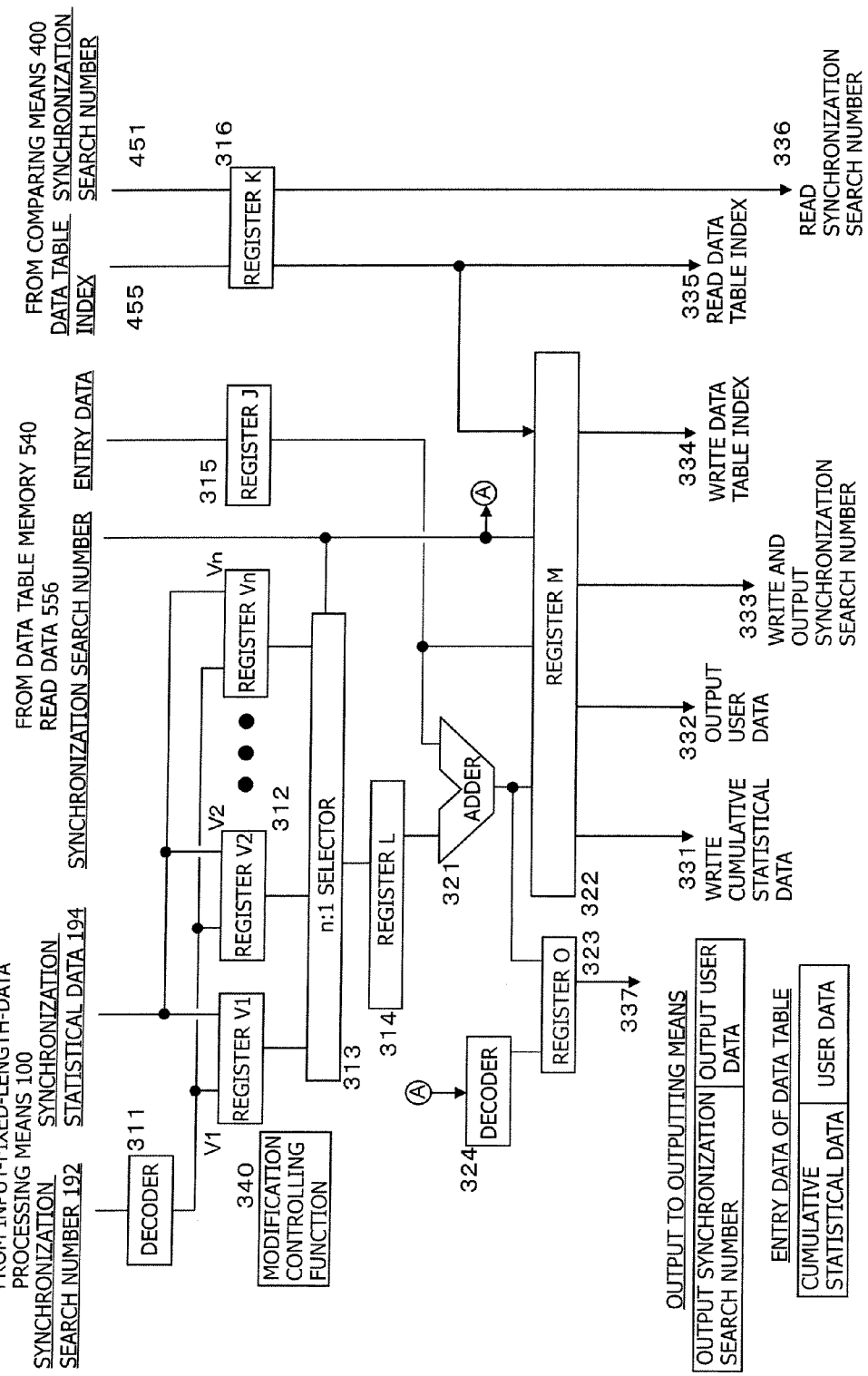

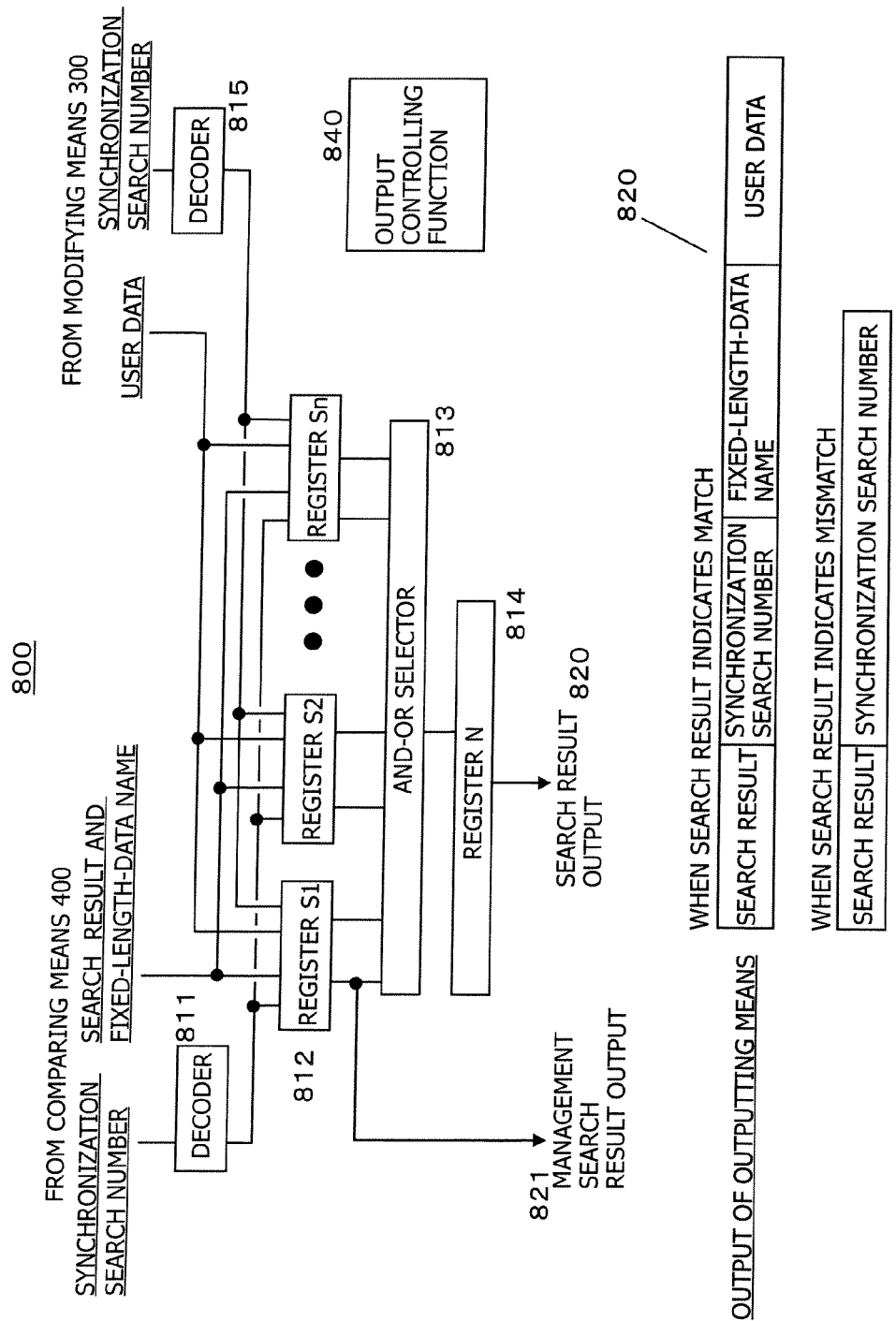

FIG.17
8 ROOMS IN HOUSE (2 MEMORY ARRAYS ARE CONSIDERED)
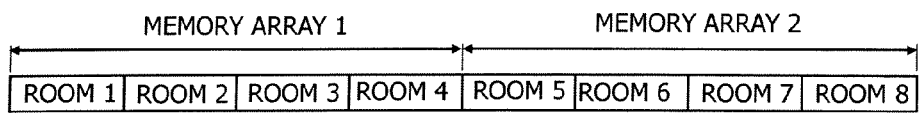
WHEN ROOMS ARE FULLY OCCUPIED
WHEN ROOMS ARE FULLY OCCUPIED BY ONE GROUP
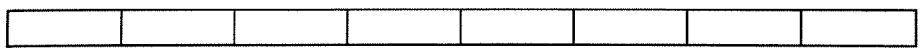
WHEN ROOMS ARE FULLY OCCUPIED BY TWO GROUPS
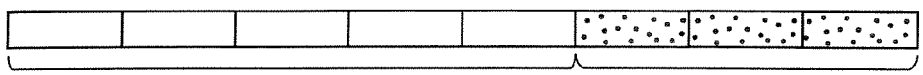
ROOMS OWNED BY LARGE GROUP     ROOMS OWNED BY SMALL GROUP
WHEN EMPTY ROOMS ARE AVAILABLE
WHEN GROUP OWNS 7 ROOMS
WHEN GROUP OWNS 6 ROOMS
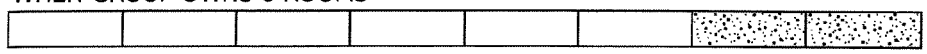
WHEN GROUP OWNS 5 ROOMS
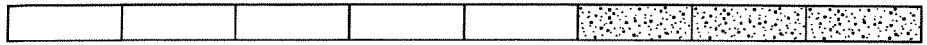
WHEN GROUP OWNS 4 ROOMS
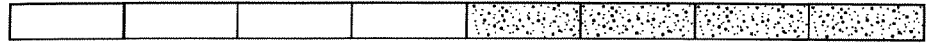
WHEN GROUP OWNS 3 ROOMS
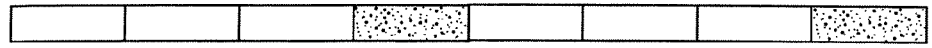

FIG.18
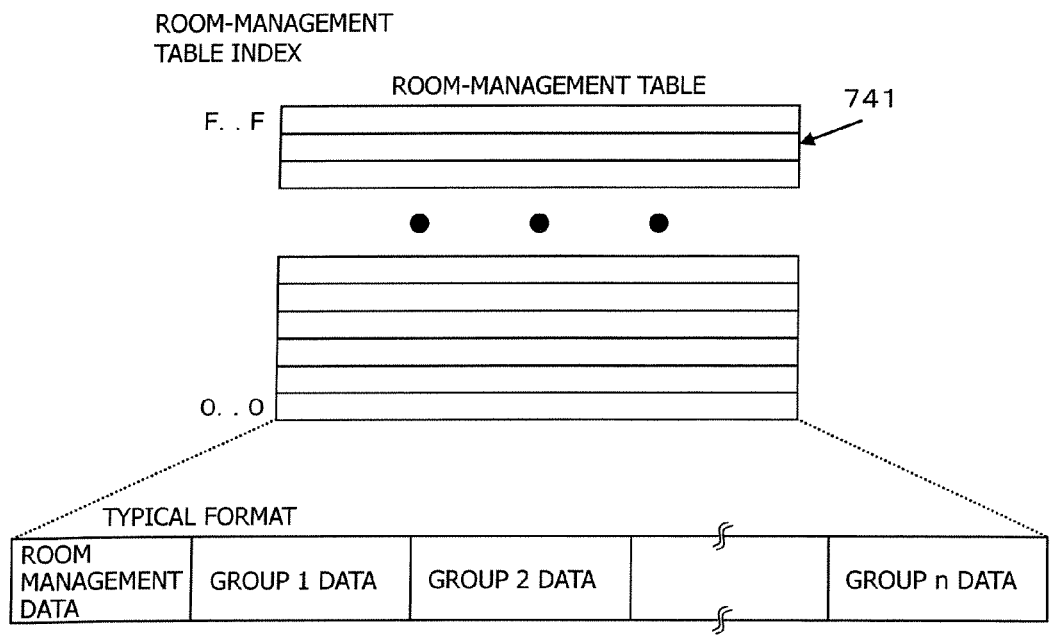
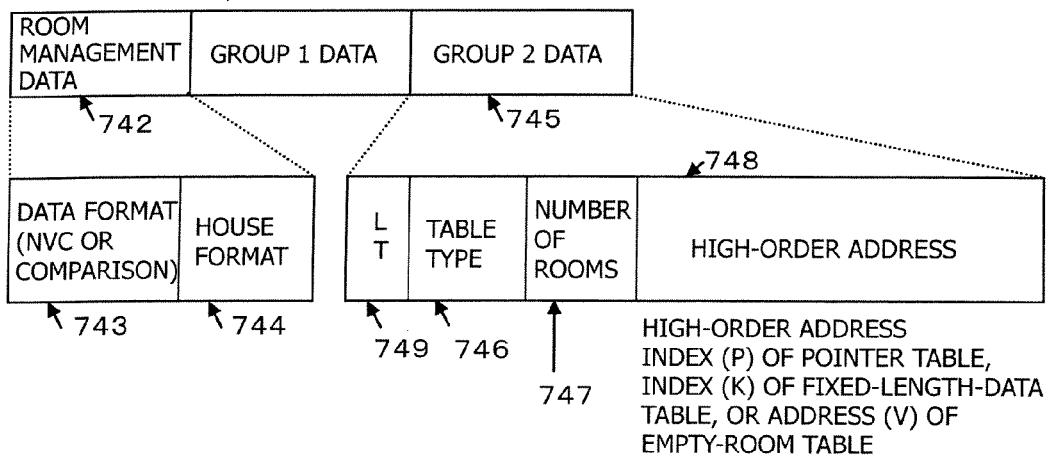

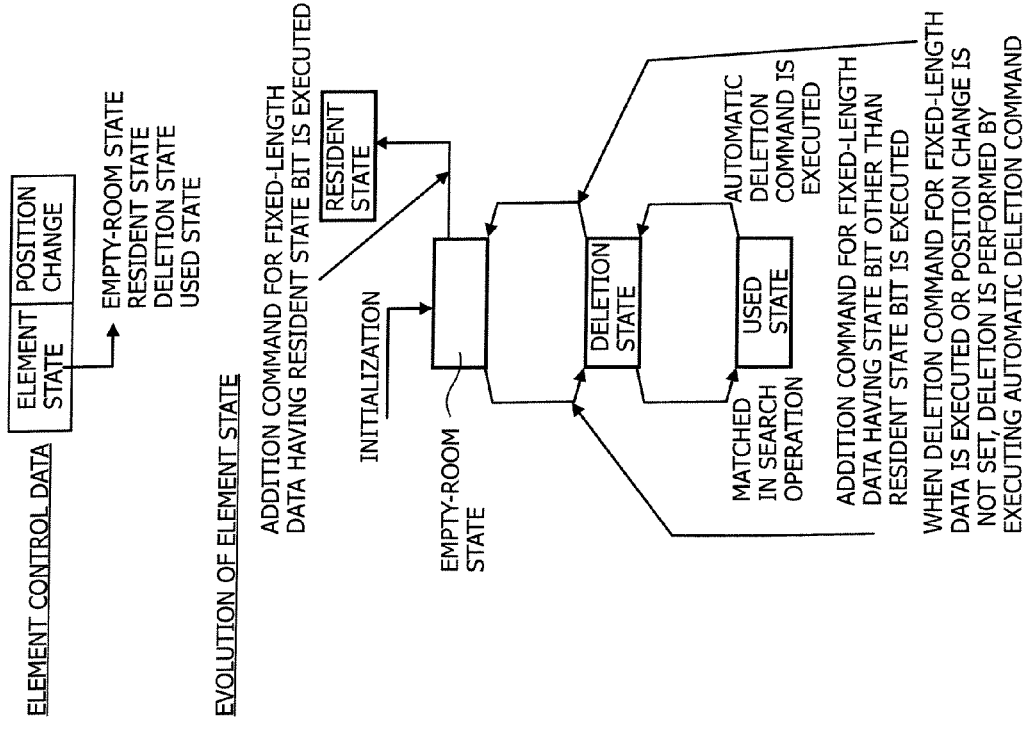
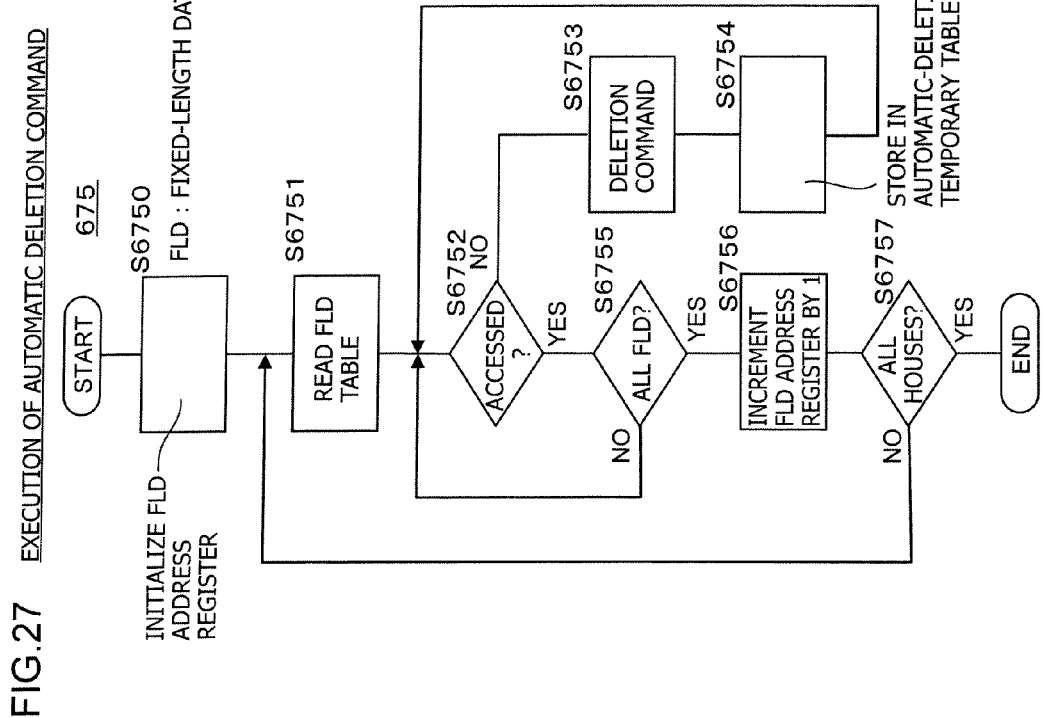
FIG. 27 EXECUTION OF AUTOMATIC DELETION COMMAND

SEARCH APPARATUS AND SEARCH MANAGEMENT METHOD FOR FIXED-LENGTH DATA

TECHNICAL FIELD

The present invention generally relates to apparatuses and methods for searching for data. In particular, the present invention relates to a control apparatus, a control method, a control program, a data structure for control, and a computer-readable storage medium which have a function for searching for, under a specified search rule, matched data at high speed from a database containing a collection of pieces of fixed-length data having a constant data bit length. Further, the present invention relates to a control apparatus, a control method, a control program, a data structure for control, and a computer-readable storage medium which have a function for efficiently configuring and managing a database, considering a search function. More specifically, the present invention relates to a communication control apparatus, a communication control method, a communication control program, a data structure for communication control, and a communication-computer-readable storage medium for realizing destination-route high-speed searching at an inter-network relay apparatus and for realizing high-speed searching required for a filtering function.

BACKGROUND ART

In various fields, demands exist for searching for desired fixed-length data from a database at high speed. In particular, in databases used for intra-network relay apparatuses or inter-network relay apparatuses to perform relay-destination determination and relay determination, when a different search rule is used, more-enhanced requirements exist for high-speed searching operation, efficient database construction/management and so on, and database reading/modification and so on after searching.

Related technologies for searching a database at high speed are used for searching MAC (media access control) address tables. Examples of the related technologies for searching a MAC address table include a method applying a hash function, a method using a CAM (content addressable memory) and other methods, such as a method using a two-way searching algorithm. When a MAC address table is configured with hundreds of thousand of MAC addresses or more, there are the following problems.

To search for desired fixed-length data from a database, there is a known search method in which desired fixed-length data exactly matches fixed-length data in the database. Many search methods using other search rules are implemented and used in practice. For example, searching for a desired IP (Internet Protocol) address from a routing table used by an inter-network relay apparatus requires searching based on an LPM (longest prefix matching) method. An IP address is constituted by a network address (also called a prefix) and a host address. Prefixes have variable lengths and are aggregated. The aggregation refers to representing multiple prefixes having the same address and common high-order bits of the prefixes as one prefix. The representative prefix is expressed by the common high-order bits. As a result, when a routing table containing an aggregated IP address is searched, matching of multiple IP addresses occurs. The LPM method is a search method that uses, as a search result, the longest prefix of matched IP addresses. A related technology that realizes high-speed searching based on the LPM method is TCAM (Ternary Content Addressable Memory). TCAM can achieve high-speed searching but has the same problem as the above-noted CAM. That is, with TCAM, it is difficult to manufacture large-scale (large-capacity) TCAMs due to the circuit structure, and TCAMs cannot hold a large amount of fixed-length data.

A rule of searching with a mask function is commonly used. With this rule, for example, to search for desired fixed-length data from a database, when the desired fixed-length data matches part (or maybe all) of the fixed-length data in the database, the matched part is used as a search result. In this case, the mask has the same data length as the fixed-length data and has a capability of masking fixed-length data bit by bit. Many search methods have been implemented under this search rule. This rule will be described in accordance with an example of an intra-network relay apparatus and an inter-network relay apparatus. The apparatus of this example searches a routing table to determine to which transmission port packets are output. In this case, whether or not to transmit packets is determined by a filtering function. This filtering function is a typical example of searching with a mask function. For example, for an input packet, the filtering function uses a flow table configured with 104-bit fixed-length data including five types of data, namely, a source IP address (32 bits), a destination IP address (32 bits), a protocol (8 bits), a source port (16 bits), and a destination port (16 bits). In this case, some of the 104 bits can be excluded (masked) from targets for comparison, and fixed-length data whose all unmasked bits shows a match is used as a search result. The related technology using searching with a mask function generally employs a hash method or CAM. The hash method and CAM also have the following problems.

Specifically, a major problem of the search system of the related technology is configuring and managing a database. To select or implement various search methods, the method for configuring and managing a database must also be evaluated to realize an intended search system.

Problems in database configuration and management in the related technology will be described in conjunction with a search method employing, by way of example, a quick search based on two-way searching and TCAM. In the two-way search method, first, a database in which m pieces of fixed-length data, which are constituent members of the database, are arranged in order of size is prepared. Fixed-length data located at the database midpoint [m/2] (when m is an odd number, [m/2] means obtaining an integer by rounding-off) and fixed-length data to be searched for are compared with each other, thereby starting the search. As a result of the comparison, when the fixed-length data to be searched for is larger, fixed-length data located at the midpoint of [m/2] and m, that is, [([m/2]+m)/2], and the fixed-length data to be searched for are compared with each other. When the first comparison shows that the fixed-length data to be searched for is smaller, fixed-length data located at the midpoint of [m/2] and 1, that is, [([m/2]+1)/2], and the fixed-length data to be searched for are compared with each other. When the fixed-length data compared with the fixed-length data to be searched for shows a match, the compared fixed-length data becomes the search result and the search finishes. The above-described comparison operation is performed as long as the midpoint calculation is possible. However, when the midpoint calculation is performed with 1 and 2, 1 is selected to perform comparison. When m is 262,144 (2 raised to the 18th power), up to 18+1 reading operations from the database are required. Since the above-described search operation is simple, this search method is feasible. However, configuring and managing the database is not simple. In particular, when m becomes large, as in the above-described example, and a typical large-scale database is configured for a communication control apparatus, a large amount of time and a great computational capability are required. In addition, under the recent environment where mobile products are more prevalent and where changes must be made to databases over time, fixed-length data are frequently deleted from or added to the databases. Each time fixed-length data is deleted or added in the related technologies, the above-noted rearrangement must be performed. In this manner, under the current situation, the configuration and management of databases is a great burden and is a large obstacle to the search capabilities.

In the related technologies, TCAM is often used as a method for searching for an IP address at high speed. TCAM, however, has the same problem as CAM. The memory capacity is not as large as that of a DRAM (dynamic random access memory). Thus, when a database including a large number of IP addresses is configured, a large number of TCAMs are required, and a large database cannot be configured due to power-supply and packaging restrictions. In addition, the use of TCAM causes a problem in configuring and managing a database. With the LPM rule, many pieces of fixed-length data that match desired fixed-length data exist, as described above. In order to select fixed-length data having the longest prefix from those pieces of fixed-length data, it is necessary to arrange the many pieces of matched fixed-length data in order of prefix lengths thereof. That is, a task for grouping a collection of IP addresses having common high bits and arranging the IP addresses in a group in order of lengths is required as a task for configuring the database. In this case, in order to minimize the influence on the search performance after changes are made, it is necessary to prepare some empty locations across the groups for an additional operation, with an aim to complete the additional operation in a minimum period of time. In this manner, when TCAM is used, configuring and managing the database without a reduction in the search performance involves a major problem. The preparation of some empty locations across the groups results in a vicious circle in which the use efficiency of the TCAM is reduced, thus causing a further reduction in the capacity of the TCAM.

Communication control apparatuses typically have functions for, after searching a database, reading user data at a destination port or the like from its search result and modifying statistical data of the matched fixed-length data. In the high-speed search methods of the related technologies, user data, statistical data, and so on are stored in an external memory device; therefore, a large amount of time is required from commencing the search to obtaining a destination port.

DISCLOSURE OF INVENTION

Typically, the search method is broadly classified as: (4) performing high-speed searching, (2) using a large database, (1) containing data required for searching, user data, statistical data, and so on, (3) under a search rule required for the database, and (5) efficiently configuring and managing the database. However, the search method of the related technologies poses major problems in each of these requirements with respect to the above-mentioned demands. In general, when (1) and (2) are satisfied, problems with (3) and (4) remain, and conversely, when (3) and (4) are satisfied, problems with (1) and (2) remain. The problem in (5) is commonly seen in the related technologies.

The present invention has been conceived to overcome the problems described above, and a main object of the present invention is to make it possible to (1) search at high speed for a large amount of fixed-length data, containing various data such as data required for searching, user data, and statistical data, that are stored in a database, (2) perform modification according to a search result, (3) achieve high memory-use efficiency, that is, obviate the need for an empty location, during database configuration, and (4) perform database management in which an addition/deletion operation on the database does not cause a reduction in the search performance, and also to provide an apparatus, a method or a storage medium for computers therefor.

Searching for desired fixed-length data from fixed-length data in a database involves comparing fixed-length data in a database with desired fixed-length data piece by piece. When matched fixed-length data is obtained or the last piece of fixed-length data is compared, the search finishes. As the size of the database increases, this method becomes impractical due to the increased search time.

One challenge in the high-speed search method is how to reduce the number of pieces of fixed-length data in a database which are compared with desired fixed-length data. A search method proposed by the present invention has means for segmenting the number of pieces of fixed-length data in the database to minimize the number of pieces of fixed-length data to be compared with desired fixed-length data. Main means is segmenting fixed-length data contained in the database by using a hash value, part of a hash value, fixed-length data, and part of fixed-length data. To achieve intended segmentation, conventional means configures a table by using part of a hash value or part of the fixed-length data or uses an L-way search method to which a two-way search method is applied (L is an integer equal to or greater than $Q*K$, which will be described below).

In the present invention, in order to perform high-speed searching, Q memory arrays and a memory for maximizing the number (R) of bits read from the memory arrays are proposed with the aim of increasing the number of pieces of fixed-length data to be compared at a time. In the present invention, the provision of a comparator corresponding to those bits allows $Q*K$ pieces of fixed-length data to be compared at a time, where R corresponds to K pieces of fixed-length data. Consequently, when the number of pieces of fixed-length data is $Q*K$ or less, a single memory-reading operation can provide a search result. When the number of members is $Q*K$ or more and $2*Q*K$ or less, the number of memory reading operations can also be made to be 2. Similarly, in the present invention, making the number of memory reading operations variable can also solve the problem of an imbalanced number of pieces of fixed-length data which is caused by the segmentation of the number of pieces of fixed-length data in the database. With this scheme, when 262,144 random numeric values (members) are segmented into 65,536 groups, the number of groups having 4 to 5 members is most common and groups having 15 to 16 members also exist. There is no group having members more than that. In this example in which random numeric values are segmented, when it is assumed that $Q*K$ is 4, intended searching is completed with a maximum of four memory reading operations. What is described above is the basic search method proposed by the present invention. However, the number of memory arrays, Q, has an upper limit and the number of bits read from the memory arrays is also limited. Under these limitations, the segmentation of the database must be enhanced in order to reduce the number of memory reading operations. Accordingly, the present invention provides a method for solving the problem of an imbalanced number of pieces of fixed-length data and a method capable of dealing with a high-degree of imbalance.

The segmentation of the number of pieces of fixed-length data in the database employs a general scheme, namely, a hash function, or the data itself if a hash function is not applicable. An example of the latter case is the segmentation of for IP address. An entire index is computed for segmentation. In the use of a hash function, the entire index is a hash value, and in the case of an IP address, the entire index is the IP address. This processing employs a pointer table that uses the entire index or a part of the entire index as the index. With this arrangement, the database to be searched is segmented into groups having entries corresponding to the number of entries in the pointer table. The segmented groups are stored in a fixed-length-data table. One entry in the fixed-length-data table can store Q*K members. In this case, an entry that stores Q*K members is defined as a house and a place in which one member is stored in the house is defined as a room. When the number of groups segmented by the pointer table is smaller than the number of rooms in a house, the search is finished by a reading operation of the pointer table and a single reading operation of the fixed-length-data table. When the pointer table and the fixed-length-data table are stored in separate memories and are read independently of each other, the search time required corresponds to two memory reading operations due to the parallel operation, but the number of search operations is equal to the number of search operations performed by a single memory operation.

There is a problem when the number of groups segmented using the pointer table is greater than the number of rooms in the house. For the segmentation into groups in this case, the present invention provides two methods, one method is to use an SPT (secondary pointer table) and a local table. The SPT is stored in a memory where the pointer table is stored and the local table is stored in the fixed-length-data table. The SPT and the local table can also be stored in separate memories. Both tables have a small number of entries, namely, 4 to 16 entries, and Q*K members belonging to an entry in the pointer table are segmented. When the number of members searched by reading the pointer table and the fixed-length-data table is 1, (1) a maximum number of members searched by reading the pointer table, the SPT, and the fixed-length-data table is 4 to 16; (2) a maximum number of members searched by reading the pointer table and the local table is 4 to 16; and (3) a maximum number of members searched by reading the pointer table, the SPT, and the local table is 16 to 256. These schemes, however, have two problems. One problem occurs when an IP address is searched for. When an index portion of the SPT or the local table and the mask length overlap each other due to the mask of the IP address, consideration must be given to processing of the IP address having the mask. Details of this point will be described in conjunction with a best mode for implementing the present invention. The other problem is that, in the worst case, the SPT and local table do not provide a solution for segmentation, that is, when all members are distributed in one entry in the SPT or local table. Such a case is very rare and may be not necessarily have to be taken into consideration. In order to seek a complete solution, however, the present invention provides the use of a numeric-value comparison (NVC) method. The NVC method performs L-way searching, which uses the same principle as two-way searching. The number of members that can be searched in a single searching operation based on the NVC method is L times the number of members that can be searched using the two-way searching. The number of members that can be searched by two searching operations based on the NVC method is L*L times the number of members that can be searched based on the two-way searching. Details of the numeric-value comparison method will be given in conjunction with a best mode for implementing the present invention. With the method described above, the present invention provides a high-speed search method that is capable of searching for intended fixed-length data in two or three memory-reading operations.

In order to generalize the search method, the present invention provides a searching apparatus that uses various search rules for searching. They are (1) a search rule using a global mask, (2) a search rule using a local mask, and (3) a search rule using an LPM (longest prefix mask). Only bits that are not masked are compared during searching. In the case of (1) and (2), matched data is used as a search result. In the case of (3), of many pieces of matched data, data having the longest mask is used as a search result.

In the searching apparatus proposed by the present invention, in order to maximize the number of search operations per second, searching in order of input data is not necessarily performed during memory reading; instead, searching is performed in order of processible data. In the present invention, in order to synchronize processing operations required for the search operation, the searching apparatus uses a search number to achieve searching by asynchronous search processing. Inputting a search number to the searching apparatus of the present invention allows a search command and a search result to be synchronized with each other. In addition, this arrangement provides an advantage in that it prevents the apparatus from overrunning caused by excessive input (overflow). Specifically, when a search command is input with a search number N, a new search command cannot be input with the search number N, unless a search result for the search number N is obtained. Specifying a maximum value for N can prevent the problem caused by the excessive input.

The present invention solves the problems of the related technologies in configuring or managing a table in which search targets are stored. The problems in configuring/managing a table, which have been described in connection with the related technologies, are: (1) the ability to use only 70% to 80% of the number of data pieces that can be stored in a table in which search targets are stored; and (2) the requirement of a large amount of work for configuring/managing the table. By managing the structures of houses, rooms, and tables, the present invention solves (1) and reduces (2) performed by a host control apparatus. The present invention essentially performs management by a method in which all rooms in a house are maintained occupied. The management, which will be described in conjunction with a best mode for implementing the present invention, is performed such that all rooms in a house are occupied by a large group and a small group or by two groups having the same size. A house in which no group exists is managed by an empty-house table, and a house in which no small group exists or in which one of two groups having the same size does not exist is managed by an empty-room table and a room-management table. Thus, a house whose rooms are fully occupied is not managed. The search method of the present invention has various table formats and has a structure for search procedures. The present invention, therefore, provides a scheme that allows a structure change, associated with a change in a table search procedure, to be easily made in a short period of time.

BRIEF DESCRIPTION OF THE DRAWINGS

FIG. 12 is a diagram showing types and contents of output data output by the comparing means 400 in one embodiment of the present invention.

FIG. 13 is an explanatory diagram showing the functional block of modifying means 300 included in the fixed-length-data searching apparatus 10, output data output by the modifying means 300, and the contents of entry data of the data table in one embodiment of the present invention.

FIG. 14 is an explanatory diagram showing the functional block of outputting means 800 included in the fixed-length-data searching apparatus 10 and output data output by the outputting means 800 in one embodiment of the present invention.

FIG. 17 is a diagram showing a room management method in one embodiment of the present invention.

FIG. 18 is a diagram showing an empty-room-management table stored in an empty-room-management table memory 740 and the contents of the empty-room-management table in one embodiment of the present invention.

FIG. 27 includes a flow chart showing the execution of an automatic-deletion command and an explanatory diagram showing the contents of element control data in the fixed-length-data table in one embodiment of the present invention.

BEST MODE FOR CARRYING OUT THE INVENTION

Hereinafter, a best mode and examples for implementing the present invention will be specifically described. The present invention, however, is not limited to embodiments and examples described below and various improvements can be made thereto without departing from the spirit of the present invention.

[Overall Configuration]

Figure 1:
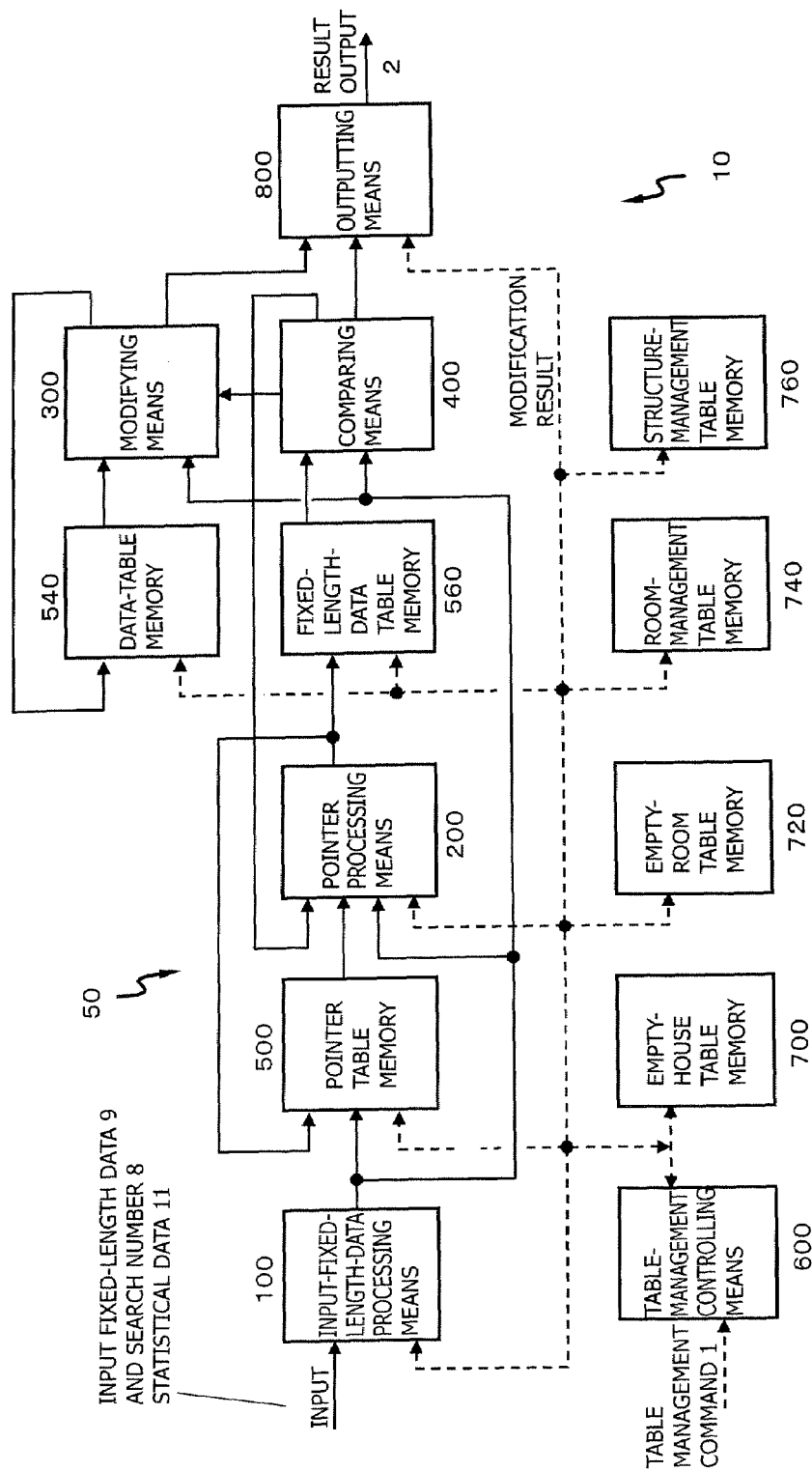
FIG. 1 is a block diagram showing an example of a fixed-length-data searching and managing apparatus according to an embodiment of the present invention.

FIG. 1 is a functional block diagram showing an example of searching for and managing fixed-length data in the present invention. For ease of understanding, a function required for searching is first described with reference to FIGS. 1 to 14, and a managing function, which serves as a basic function therefor, for configuring and maintaining various tables will be described next.

FIG. 1 is a block diagram showing an example of a fixed-length-data searching and managing apparatus in the present invention. A fixed-length-data searching and managing apparatus 50 shown in FIG. 1 includes, as a component thereof, a fixed-length-data searching apparatus 10. The fixed-length-data searching apparatus 10 shown in FIG. 1 includes input-fixed-length-data processing means 100, a pointer table memory 500, pointer processing means 200, a fixed-length-data table memory 560, comparing means 400, a data-table memory 540, modifying means 300, and outputting means 800. The input-fixed-length-data processing means 100 performs specified processing on input fixed-length data 9, a search number 8, and statistical data 11 and outputs resulting data. The pointer table memory 500 stores a pointer table indexed by the output of the input-fixed-length-data processing means 100 or an output of the pointer processing means 200. The pointer processing means 200 performs computation on an output of a fixed-length-data table memory 560 described below or an output of the pointer table memory 500, together with a part of an output of the input-fixed-length-data processing means 100, and outputs the results. The fixed-length-data table memory 560 stores a fixed-length-data table in which the output of the pointer processing means 200 is used as an index. In accordance with a specified rule, the comparing means 400 compares many pieces of fixed-length data output by the fixed-length-data table memory 560 with the input fixed-length data 9. The data-table memory 540 stores a data table in which user data and statistical data are held and the data table is indexed by the output of the pointer processing means 200 with the output of matched result from the comparison means 400. The modifying means 300 outputs a part of the output of the data-table memory 540 or performs computation on part of that data and writes the resulting data to the same location in the data-table memory. The outputting means 800 outputs the output of the comparing means 400 and the output of the modifying means 300 in synchronization with each other. The pointer table memory 500, the fixed-length-data table memory 560, and the data-table memory 540 may be implemented with a unified memory.

Figure 2:
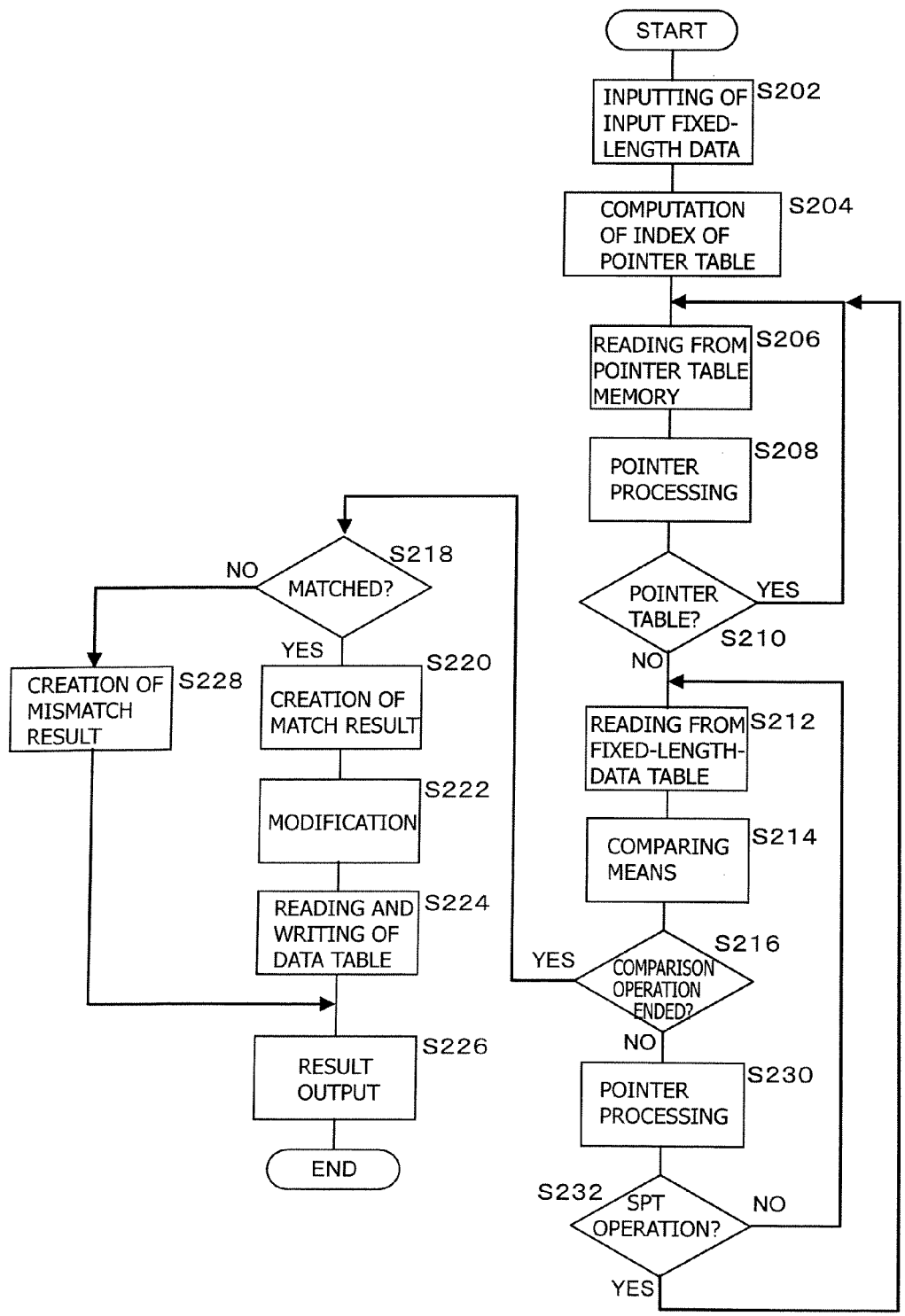
FIG. 2 is a flow chart showing the operation of a fixed-length-data searching apparatus 10 in one embodiment of the present invention.

FIG. 2 is a processing flow diagram of the fixed-length-data searching apparatus 10 illustrated in FIG. 1. An overview is described. The input fixed-length data 9 to be searched for is input (S202). The index of a pointer table is then calculated by the input-fixed-length-data processing means 100 (S204). In addition, the pointer table is read (S206). Thereafter, an output of the pointer table is processed by the pointer processing means 200 (S208). When the output indicates a pointer table (S210), the pointer-table reading (S206) is performed again. When the output of the pointer processing means 200 indicates the reading of a fixed-length-data table, the reading thereof is executed (S212). When a comparison operation (S214) is completed by a single fixed-length-data-table reading operation (S216), a search result is created. When the search result indicates a match (S218 to S222), reading and writing of the data table are performed by the modifying means 300 (S224), and a search result is output by the outputting means (S226). When the comparison result indicates a mismatch (S218), a mismatch result is created (S228), and a search result is output by the outputting means (S226). If the comparison operation is not completed (S216 to S230), the address calculation of a table is performed again in the pointer processing and a table is selected (S232). When a local table is selected, reading of a fixed-length-data table (S212) is executed. When an SPT is selected in the table selection (S232), the reading from the pointer table (S206) is executed. A database segmentation feature in the present invention is realized by reading multiple pointer tables, reading multiple fixed-length-data tables, and multiple reading operations of a combination of the pointer tables and the fixed-length-data tables. The operation of the fixed-length-data searching apparatus 10 will be described below in detail with reference to FIGS. 1 and 2.

The search number 8 input to the fixed-length-data searching apparatus 10 is mainly used in the pointer processing means 200, the comparing means 400, the modifying means 300, and memories to operate in parallel, and is used as a name for outputs of the comparing means 400, the modifying means 300, and the outputting means 800. The input statistical data 11 is used by the modifying means 300. The search number 8 and the statistical data 11 are not essences of this search scheme, and thus are not illustrated in FIG. 2.

[Input-Fixed-Length-Data Processing Means]

The input fixed-length data 9, the search number 8, and the statistical data 11 are input to the input-fixed-length-data processing means 100. The input-fixed-length-data processing means 100 computes the index of a pointer table stored in the pointer table memory 500 and outputs the computed index. The role of the pointer table is to split fixed-length data in a database into groups and equalize and minimize the number (member numbers) of pieces of fixed-length data in the groups. Thus, for the computation method, the following four items are prepared:

(1) a hash value calculated by a hash method;
(2) part of a hash value calculated by a hash method;
(3) input fixed-length data; and
(4) part of input fixed-length data.

Figure 3:
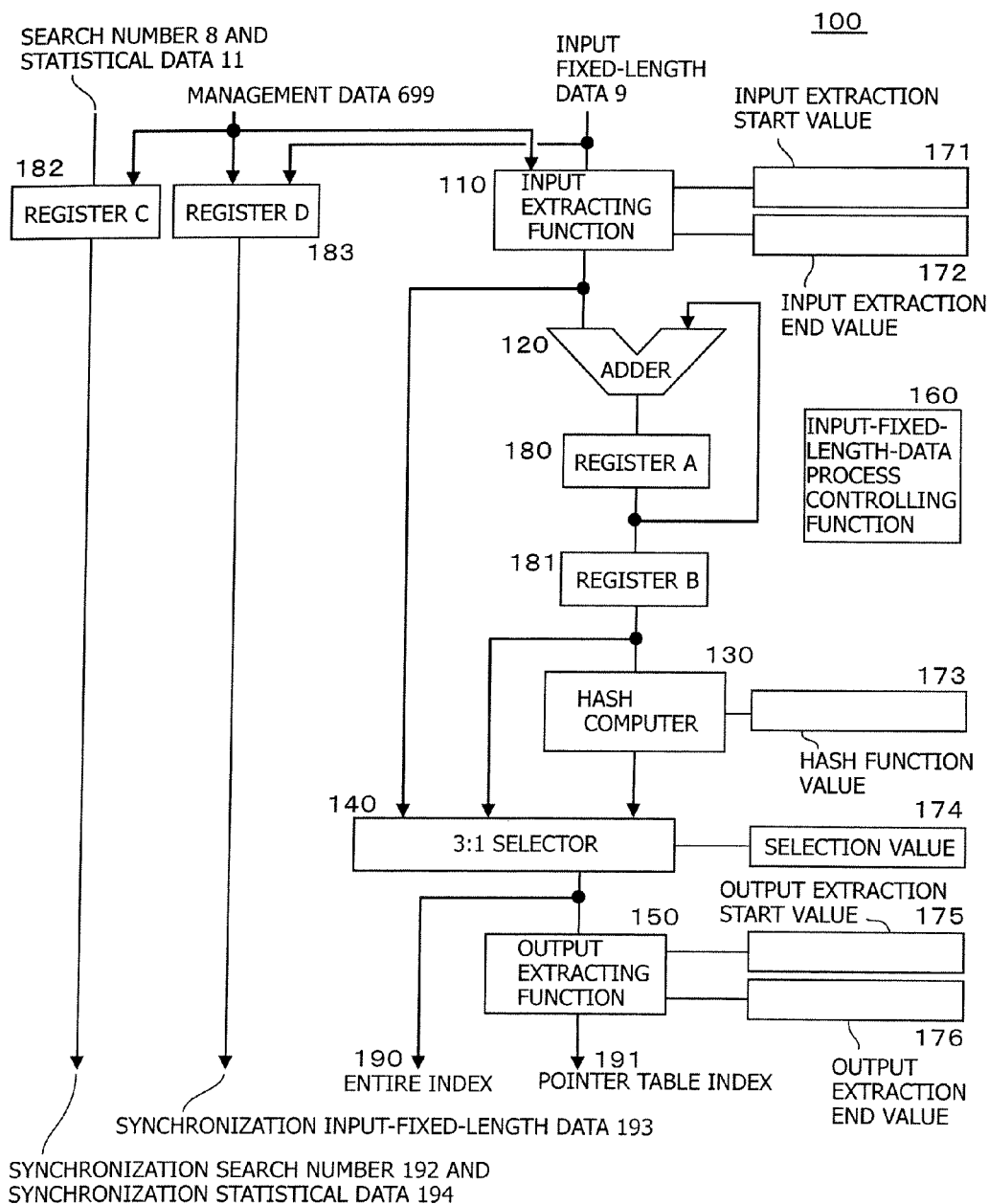
FIG. 3 is a block diagram showing the function of input-fixed-length-data processing means 100 included in the fixed-length-data searching apparatus 10 in one embodiment of the present invention.

The computation method and a method for extracting a part out of a hash value or input fixed-length data can be specified. FIG. 3 shows an example of the input-fixed-length-data processing means 100.

The input fixed-length data 9 input to the input-fixed-length-data processing means 100 is temporarily stored in a register D, and the search number 8 and the statistical data 11 are temporarily stored in a register C. The fixed-length data 9, the search member 8, and the statistical data 11 are output in synchronization with each other when other output data described below are output from the input-fixed-length-data processing means 100. Thus, outputs of the register C are called a synchronization search number 192 and synchronization statistical data 194, and an output of the register D is called synchronization input-fixed-length data 193. In the description of the fixed-length-data searching apparatus 10, in order to avoid confusion, the same name is used for a synchronized number or data. However, the number differs each time. The individual signals are input to the pointer processing means 200, the comparing means 400, and the modifying means 300. Other data input to the input-fixed-length-data processing means 100 include management data 699, as shown in FIG. 3. The management data 699 is constituted by management fixed-length data, a management search number, and management statistical data, which are handled in the same manner as the fixed-length data 9, the search number 8, and the statistical data 11. The management data 699 is input for managing various tables of the fixedlength-data searching apparatus 10. Details of the management data 699 will be described in conjunction with the fixed-length-data searching and managing apparatus 50.

The input fixed-length data 9 is input to an input extracting function 110. The input extracting function 110 extracts bits located from a bit position specified by an input extraction start value 171 of the input fixed-length data 9 to a bit position specified by an input extraction end value 172 and outputs the extracted bits. When the input extraction start value 171 indicates the first bit position of the input fixed-length data 9 and the input extraction end value 172 indicates the last bit position, the output value is the input fixed-length data 9 itself. Although the description has been given assuming that the input extraction start value 171 and the input extraction end value 172 are specified for each bit, they may also be specified for each byte. The procedure of the input extracting function 110 is controlled by an input-fixed-length-data process controlling function 160. An output of the input extracting function 110 is input to a 3:1 selector 140 and an adder 120 which are described below. When the extracted data exceeds the width of an output bus of the input extracting function 110, the input extracting function 110 outputs the extracted data in multiple output-bus transfer cycles. In this case, output values output in respective bus cycles are accumulated by the adder 120. As one example, if the output-bus width of the input extracting function 110 is 32 bits, the adder 120 includes a 32-bit adder, and the extracted data has 64 bits, then the extracted data is output in two output-bus transfer cycles. Before inputting, a register A 180 is set to an initial value (zero). A first output value of the extracted data is added by the adder 120 to a value (which is the initial value, zero, in this case) held by the register A 180, and the result is held by the register A 180. A second output value of the extracted data is similarly added by the adder 120 to the value (the first output value in this case) held by the register A 180, and the result is held by the register A 180. When the processing of the extracted data is completed, the input-fixed-length-data process controlling function 160 transfers the data of the register A 180 to a register B 181. The input-fixed-length-data process controlling function 160 generates and controls data holding signals for the register A 180 and the register B 181.

An output of the register B 181 is input to the 3:1 selector 140 and a hash computer 130, which are described below. The hash computer 130 refers to a hash function value 173 from the output value of the register B 181 and outputs a hash value. The output value of the hash computer 130 is input to the 3:1 selector 140. Various methods have been proposed for the hash function. As an example of the hash function, the output value of the register B 181 is divided by a hash function value to yield a quotient and a remainder. Then, the remainder is used as the hash value. Although the hash-function value is variable in this embodiment, a method in which the hash-function value is fixed and the output value of the register B 181 is varied by a shift operation or the like is also possible.

The output of the input extracting function 110, the output of the register B 181, and the output of the hash computer 130 are input to the 3:1 selector 140. The 3:1 selector 140 refers to a selection value 174 and outputs, as an entire index 190, one of the three outputs that were input. The entire index 190 is input to an output extracting function 150.

The output extracting function 150 extracts bits located from a bit position specified by an output extraction start value 175 of the entire index 190 to a bit position specified by an output extraction end value 176 and outputs the extracted bits as a pointer table index 191. When the output extraction start value 175 indicates the first bit position of the entire index 190 and the output extraction end value 176 indicates the last bit position, the output value is the entire index 190 itself. Although a description has been given assuming that the output extraction start value 175 or the output extraction end value 176 is specified for each bit, it may also be specified for each byte. The procedure of the input extracting function 110 is controlled by the input-fixed-length-data process controlling function 160.

In FIG. 3, the input extraction start value 171, the input extraction end value 172, the hash function value 173, the selection value 174, the output extraction start value 175, and the output extraction end value 176 are held in programmable registers.

When the circuitry of the input-fixed-length-data processing means 100 is divided into the input extracting function 110, the adder 120 and the register A 180, the hash computer 130, the 3:1 selector, and the output extracting function 150 and each of which is called a stage, each stage can perform a search operation with a different search number 8. In this manner, the input-fixed-length-data processing means 100 performs pipeline processing for increasing the search processing performance.

In general, all or part of the input fixed-length data 9 is used to search for an IP address and all or part of the hash value is used for other search operations.

[Pointer Table]

Figure 4:
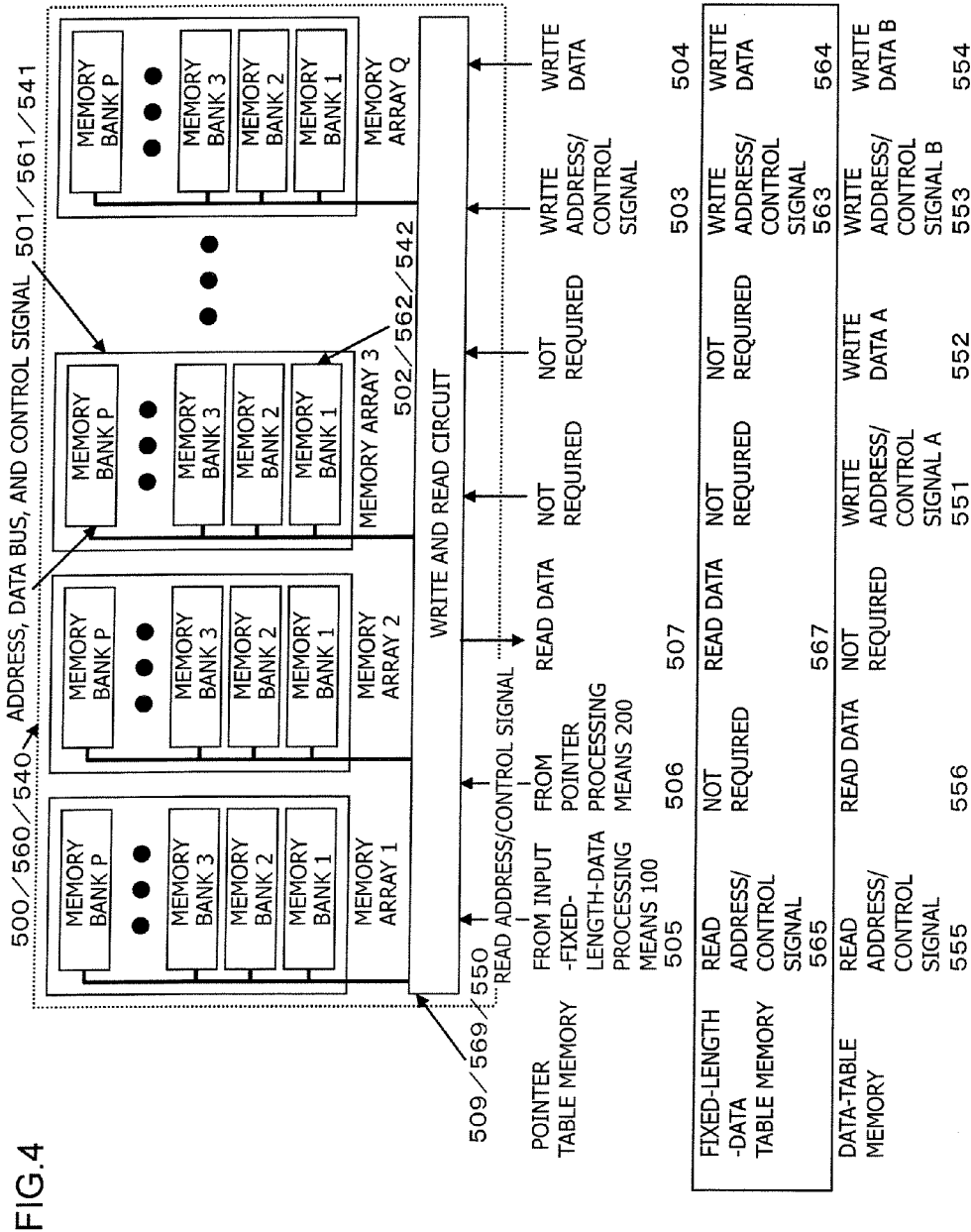
FIG. 4 is a block diagram showing the configuration of a pointer table memory 500 included in the fixed-length-data searching apparatus 10, the configuration of a fixed-length-data table memory 560 included in the fixed-length-data searching apparatus 10, and the configuration of a data table memory 540 included in the fixed-length-data searching apparatus 10 in one embodiment of the present invention.

FIG. 4 shows an example of the configuration of the pointer table memory 500. FIG. 4 collectively illustrates an example of cases in which the structures of the pointer table memory 500, the fixed-length table memory 560, and the data-table memory 540 are similar to each other. The bottom section of FIG. 4 illustrates combinations of control signals, addresses, and data when used for those memories.

Figure 5:
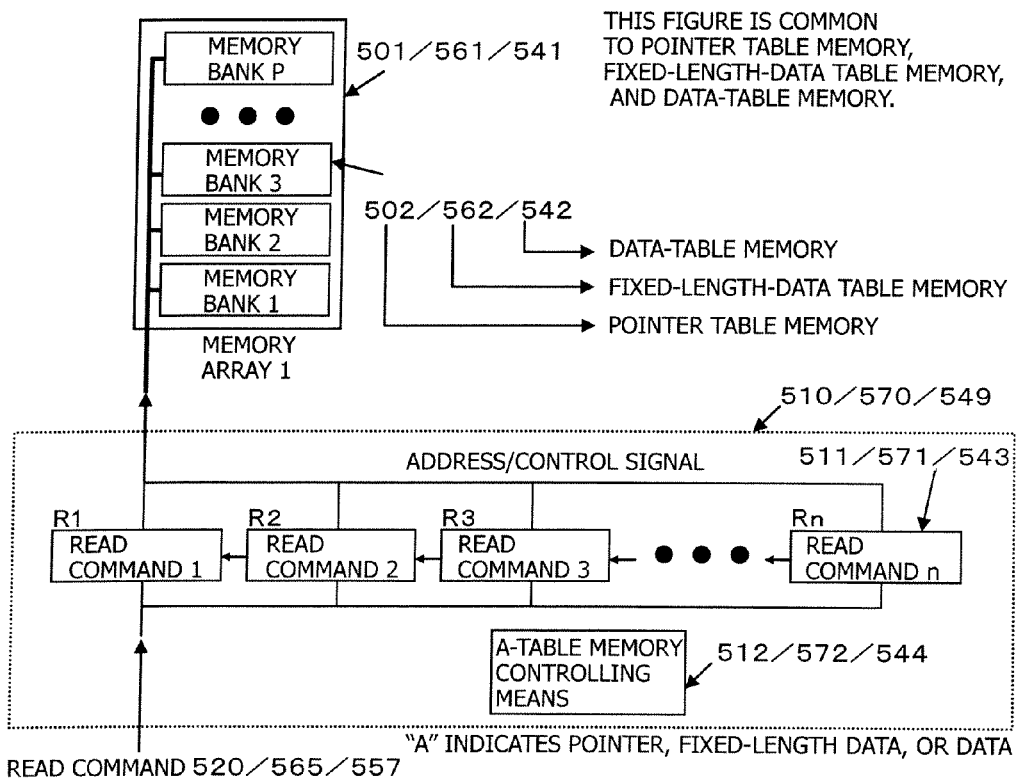
FIG. 5 is an explanatory diagram showing an index of a pointer table stored in the pointer table memory 500, a read functional block of the pointer table memory 500, an index of a fixed-length-data table stored in the fixed-length-data table memory 560, a read functional block for the fixed-length-data table memory 560, a read and write index for a data table stored in the data-table memory 540, and a read functional block of the data-table memory 540 in one embodiment of the present invention.

The pointer table memory 500 includes a memory section, constituted by memory arrays 501, and a write and read circuit 509. Of the outputs of the input-fixed-length-data processing means 100, the pointer table index 191 (FIG. 3) is used for a memory address of the pointer table memory 500 and the synchronization search number 192 is used to synchronize the read circuit of the pointer table memory 500. As shown in FIG. 5, the pointer table index 191 is constituted by the address of the memory array 501, the address of a memory bank 502 itself, and an address (displacement) in the memory bank 502, and serves as a memory address of the pointer table memory 500.

The writing function is accomplished by executing a write command provided by the write address/control signal 503 and write data 504 being input to the write and read circuit 509. This writing function for the pointer table memory 500 is mainly used by the fixed-length-data searching and managing apparatus; therefore, a detailed description will be given in conjunction with a description of the fixed-length-data searching and managing apparatus.

The reading function of the write and read circuit 509 can operate upon receiving read commands from two sections. One of the read commands is a read command 505 sent from the input-fixed-length-data processing means 100 and the other is a read command 506 sent from the pointer processing means 200. Each of the commands contains a control signal and the address of a memory to be read and has the synchronization search number 192 unique to the command. The reason for such a configuration is that the read commands are not necessarily executed in sequence; an executable command is executed first. After the read command is executed, the read data is output together with the input synchronization search number 192 as read data 507 shown in FIG. 4. With this arrangement, it is possible to determine which read command the read data corresponds to.

The memory section of the pointer table memory 500 is constituted by Q memory arrays 501 (Q is an integer of 1 or greater) and each memory array is constituted by P memory banks 502 (P is an integer of 1 or greater). The memory arrays 501 are operated independently and all or some of the memory arrays 501 can be operated simultaneously. In each memory array 501, the memory banks 502 have independent timing generating circuits and thus operate independently. However, since address and data buses and control signals which connect the banks are shared, the number of memory banks 502 that can start operations at a time is just one. Since the operation time of each memory bank 502 is long compared to the intervals of a memory operation command, multiple memory banks 502 in the memory array 501 can be operated. The pointer table memory 500 is constituted by P*Q memory banks. The reason why it is not constituted by P*Q memory arrays 501 is that the amount of the address and data buses and the number of control signals would become enormous.

In the pointer table memory 500, the read command can be issued to the same memory array 501 at the memory operation command intervals. When all memory banks 520 are operable, the memory operation command interval (t seconds) depends on the transfer capabilities of a bus that transfers the read address/control signals and a bus that transfers the read data. The memory operation command, i.e., the reading of a pointer table, can be executed up to Q/t times per second. However, multiple read commands are issued to the same memory bank 502, the commands can be executed only at the memory operation time intervals. In this case, the merit of the parallel-operation capability of the pointer table memory 500 is lost. When this situation occurs, the only solution is to employ means for reducing the memory operation time. A scheme for improving the memory parallel operation when that situation occurs in a short period of time will be described below.

FIG. 5 shows a reading function 510 of the pointer table memory 500. The reading function 510 for the memory array 501 includes n registers 511 and pointer-table memory controlling means 512. The n registers are labeled R1, R2, R3, . . . , and Rn and store the read commands. The read command includes a control signal and a memory address containing the address of the memory bank 502 to be read. The registers are connected by wiring lines that allow independent shift operations for shifting read commands from R2 to R1 and a read command from R3 to R2. Each shift operation is controlled by an execution command issued from the pointer-table memory controlling means 512. For example, when three read commands are in an execution-waiting state, the pointer-table memory controlling means 512 performs control so that the three commands are stored in R1, R2, and R3. In this case, regarding the time at which the commands are received, the command for R1 is the first and the command for R3 is the last. The pointer-table memory controlling means 512 manages the operation state of each memory bank 502 in the memory array 501 that the pointer-table memory controlling means 512 is in charge of.

A read command 520 is a command composed of a combination of the read command 505 sent from the input-fixed-length-data processing means 100 and the read command 506 sent from the pointer processing means 200. When the read command 520 is input to the reading function 510, the pointer-table memory controlling means 512 selects a register next to a register in which storage was performed last and stores the command in the selected register. For example, when the registers R1, R2, and R3 are occupied, the register R4 is selected and the command is stored in the register R4. Before the start time of accessing the memory array 501, the pointer-table memory controlling means 512 selects a next executable command for the memory bank, from the commands stored in the registers R1, R2, R3, and R4. When there are multiple executable commands, the execution is performed sequentially from older commands. For example, when the commands in the registers R2 and R4 are executable, the command in the register R2 is executed. After the command in R2 is transferred to the memory bank 502, the command in the register R3 is shifted to R2 and the command in the register R4 is shifted to R3. The number of registers, n, is determined considering the number of memory banks 502 in the memory array 501, the memory operation command interval, and the memory operation time. In this manner, the sequential execution of the given read commands 520 from an executable command can increase the number of memory reading operations per unit time.

The output of the pointer table memory 500 includes the read data 507 (FIG. 4) that was read and the synchronization search number 192 (FIG. 3) accompanying the read command 520. The read data 507 is entry data of the pointer table.

Figure 6:
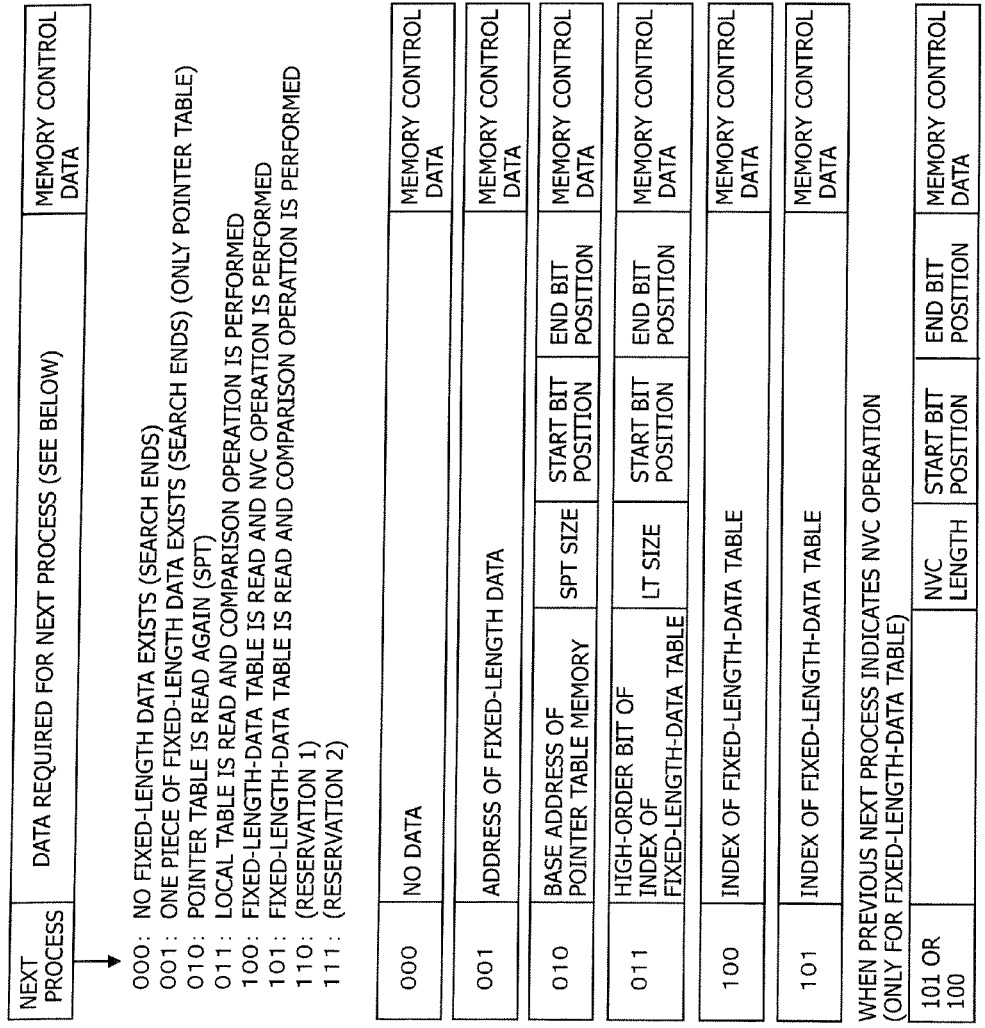
FIG. 6 is a diagram showing the format and contents of entry data in the pointer table and the format and contents of entry control data in the fixed-length-data table in one embodiment of the present invention.

FIG. 6 shows the contents of the entry data in the pointer table stored in the pointer table memory 500. As shown in FIG. 6, the entry data can be broadly classified into three elements: (1) a next process, (2) data required for the next process, and (3) memory control data. The memory control data is data for controlling the memory arrays 561 containing a memory array to be read next, the memory arrays 561 being included in the fixed-length-data table memory 560 in which the fixed-length-data table is stored. In the fixed-length-data table memory 560, only a memory array in which fixed-length data are stored is read according to the memory control data.

Entry data of the pointer table indicates the following six next processes.

(1) No fixed-length data exists in this entry in the pointer table, which results in the end of searching.

(2) One piece of fixed-length data exists in this entry in the pointer table, which results in the end of searching.

(3) A pointer table is read again.

(4) A local table (LT) is read and comparison is executed.

(5) A fixed-length-data table is read and NVC (numeric-value comparison) is executed.

(6) A fixed-length-data table is read and comparison is executed.

These next processes will be described in detail.

When the next process is (1) noted above, i.e., when no fixed-length data exists in this entry in the pointer table, a search result is output from the outputting means 800 via the pointer processing means 200, the fixed-length-data table memory 560, and the comparing means 400. Naturally, in this case, the command output from the pointer processing means 200 and input to the fixed-length-data table memory 560 does not cause the reading operation to be executed and the command is directly output to the comparing means 400. If any search result corresponding to the synchronization search number 192 is not stored in the comparing means 400, a search result indicating a mismatch is output together with the synchronization search number 192.

When the next process is (2) noted above, i.e., when one piece of fixed-length data exists in this entry in the pointer table, the entry data has the address of the fixed-length data. In this case, the modifying means 300 obtains user data via the pointer processing means 200, the fixed-length-data table memory 560, and the comparing means 400. Then, after a change is made to the statistical data, the match search result and the user data, together with the synchronization search number 192, are output from the outputting means. Since this case corresponds to a process used for searching for an IP address, there is no need for the subsequent comparison processing. In this case, the operation of the fixed-length-data table memory 560 is the same as in next process (1).

When the next process is (3) noted above, i.e., when a pointer table is read again, many pieces of fixed-length data exist in this entry of the pointer table, thus requiring even more segmentation. As means for achieving this, segmentation of the pointer table is performed. In order to distinguish it from the first pointer table, this pointer table will be called a secondary pointer table (SPT) or a second-order pointer table. This entry has the base address of the pointer table memory 500, the size of the pointer table, the start bit position of an entire index, and the end bit position of the entire index in order to generate an index of an SPT. The SPT index is obtained by concatenating the base address of the pointer table memory 500 and bits that exist from the start bit position of the entire index to the end bit position thereof. Bits that exist from the start bit position of the entire index to the end bit position thereof are different portions from the pointer table index. After the SPT index is obtained, a pointer table is read again. The subsequent process complies with an entry in the read pointer table.

When the next process is (4) noted above, i.e., when a local table (LT) is read and comparison is executed, an LT configured in the fixed-length-data table is read and many pieces of read fixed-length data are compared. In this next process, since many pieces of fixed-length data exist in this entry in the pointer table, even more segmentation is required. The LT is one means for achieving this. With the LT, multiple entries in the fixed-length-data table are used in the form of a table. An index of the LT is obtained by concatenating the high-order portion of an index of the fixed-length-data table and bits that exist from the start bit position of an entire index to the end bit position thereof Processing after the LT index is obtained is the same as the processing after the fixed-length-data table index in process (6) is obtained.

When the next process is (5) noted above, i.e., when the fixed-length-data table is read and NVC is executed, an enormous number of pieces of fixed-length data exist in this entry in the pointer table, which is a case in which even more drastic grouping is required. This entry data has an index of the fixed-length-data table. The fixed-length-data table is read based on the index, and NVC is executed based on the read data. The use of this next process is rare. In the NVC, numeric values are compared to segment the database. The details of the NVC operation will be described in conjunction with a description of the fixed-length-data table memory. This next process is followed by (5) or (6). When (5) is selected, this entry is expected to have an enormous number of pieces of fixed-length data.

When the next process is (6) noted above, i.e., when a fixed-length-data table is read and comparison is executed, this entry data has an index of a fixed-length-data table and memory control data for the fixed-length-data table. The fixed-length-data table is read based on the index and comparison is executed based on the read data. During the reading of the fixed-length-data table, only the memory array 501 in which fixed-length data belonging to the entry is stored is read according to the memory control data for the fixed-length-data table. Consequently, availability of memory reading operations is increased and power needed for the memory reading is saved. In general, a majority of the search operations performed by the fixed-length-data searching apparatus 10 are completed at this next process. After the fixed-length-data table index is obtained from the entry data, the fixed-length-data table is read. Entries obtained from the fixed-length-data table are sent to the comparing means and are compared with the synchronization input-fixed-length data 193, so that a comparison result is obtained.

[Pointer Processing Means]

Figure 7:
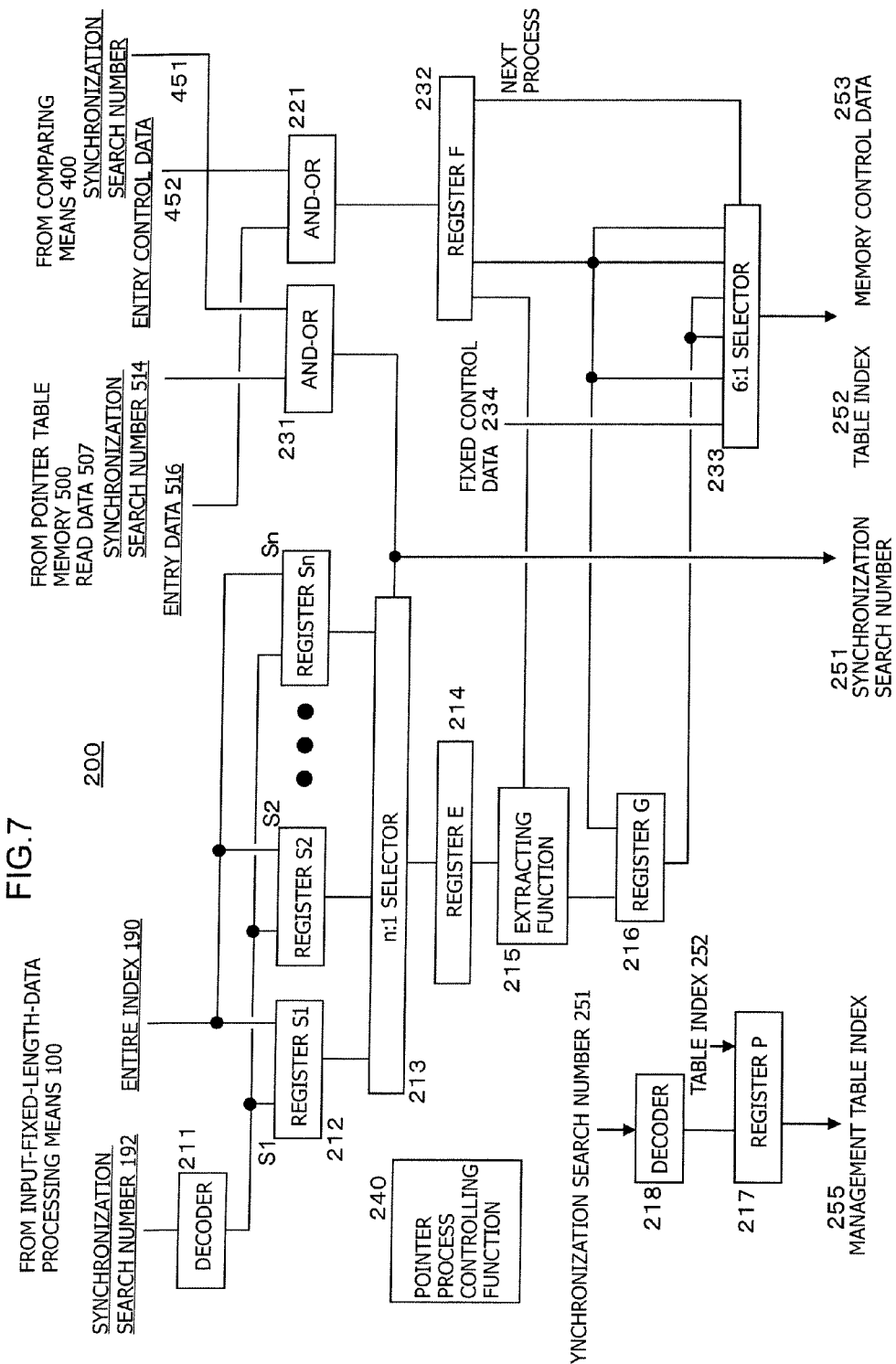
FIG. 7 is a block diagram showing the function of pointer processing means 200 included in the fixed-length-data searching apparatus 10 in one embodiment of the present invention.

Entry data (the read data 507), which is an output of the pointer table memory 500, is input to the pointer processing means 200 (FIG. 1). The aim of the pointer processing means 200 is to output an index of the fixed-length-data table memory based on the input information, this outputting corresponding to the next process. FIG. 7 shows an example of the pointer processing means 200. Inputs of the pointer processing means 200 include entry data of the pointer table, the outputs of the input-fixed-length-data processing means 100, and entry control data of the fixed-length-data table. Entry data of the pointer table and entry control data of the fixed-length-data table have the same format and thus will simply be called "entry data" in the following description.

In FIG. 7, the pointer processing means 200 receives the synchronization search number 192 and the entire index 190 output from the input-fixed-length-data processing means 100, decodes the synchronization search number 192, and stores the entire index 190 in a register Sx corresponding to the decoded number x.

In FIG. 7, the pointer processing means 200 receives a synchronization search number 514 contained in the read data 507 from the pointer table memory 500 and a synchronization search number 451 from the comparing means 400, and similarly receives entry data 516 contained in the read data 507 from the pointer table memory 500 and entry data 452 from the comparing means 400. The two synchronization search numbers 514 and 451 are input to an AND-OR 231. Under the control of a pointer process controlling function 240, the AND-OR 231 generates a synchronization search number 251. Similarly, the entry data 516 and the entry control data 452 are input to an AND-OR 221. Under the control of the pointer process controlling function 240, the AND-OR 221 also generates entry data.

The synchronization search number is used to process the entry data and to obtain an entire index corresponding to the synchronization search number in order to generate an index of the fixed-length-data table. The synchronization search number is output, as the synchronization search number 251, to the fixed-length-data table memory 560. The entire index corresponding to the synchronization number is prepared by an n:1 selector 213 and is stored in a register E.

After being output from the AND-OR 221, the entry data is stored in a register F. Thereafter, the entry data is decoded based on a next-process bit included therein to generate a target table index 252 and memory control data 253. The relationships between the next process and the table index 252 and the memory control data 253 will be described next.

(1) When no fixed-length data exists in this entry in the pointer table, the memory control data 253 becomes data having no matched data and is data indicating non memory reading. Both data are generated from fixed control data 234 input to a 6:1 selector 233. The fixed control data 234 is one type of control data generated by the pointer process controlling function 240. The table index 252 becomes meaningless data. The table index 252 and the memory control data 253 are sent to the fixed-length-data table memory 560 (FIG. 1).

(2) When one piece of fixed-length data exists in this entry in the pointer table, the memory control data 253 becomes data indicating matched data and also becomes data indicating non memory reading. Both data are generated from the fixed control data input to the 6:1 selector 233. The table index 252 becomes the address of fixed-length data extracted from the entry data. The table index 252 and the memory control data 253 are sent to the fixed-length-data table memory 560.

(3) When a pointer table is read again, the memory control data 253 is data for reading a pointer table. The data is generated from the fixed-control data 234 input to the 6:1 selector 233. An output of a register G 216 is selected as the table index 252. A pointer-table base address, an SPT size, a start bit position, and an end bit position which are extracted from the entry data are input to an extracting function 215, and bits existing from the start bit position of an entire index to the end bit position thereof are stored in the register G 216. Consequently, a pointer table index is formed. The table index 252 and the memory control data 253 are sent to the pointer table memory 500.

(4) When a local table (LT) is read and comparison is executed, the memory control data 253 is data for reading a fixed-length-data table. The data is generated based on the fixed-control data 234 input to the 6:1 selector 233. An output of a register G 216 is selected as the table index 252. A high-order bit of the index of the fixed-length-data table, an LT size, a start bit position, and an end bit position which are extracted from the entry data are input to the extracting function 215, and bits existing from the start bit position of an entire index to the end bit position thereof are stored in the register G 216. Consequently, a fixed-length-data table index is formed. The table index 252 and the memory control data 253 are sent to the fixed-length-data table memory 560.

(5) When a fixed-length-data table is read and NVC is executed, the memory control data 253 is data reading the fixed-length-data table and also is data for an NVC operation. The data is generated based on the fixed-control data 234 input to the 6:1 selector 233. The table index 252 becomes the fixed-length-data-table index extracted from the entry data. The table index 252 and the memory control data 253 are sent to the fixed-length-data table memory 560.

(6) When a fixed-length-data table is read and comparison is performed, the memory control data 253 is data reading the fixed-length-data table and also is fixed-length-data-table-memory control data extracted from the entry data. Read data of the fixed-length-data table is generated based on the fixed-control data 234 input to the 6:1 selector 233. The fixed-length-data-table index extracted from the entry data is output using the table index 252. The table index 252 and the memory control data 253 are sent to the fixed-length-data table memory 560.

A register P 217 for the pointer processing means 200 stores the table index 252, which is output from the pointer processing means 200 and is provided with a search number for handling management data. When a table index 252 having a search number for processing management data is generated multiple times, the register P 217 performs a storage operation for each generation. Consequently, the register P 217 holds the table index 252 generated last.

When the circuit configuration of the pointer processing means 200 is divided into multiple stages at the register E 214, the register F 232, and the register G 216, a search operation is possible using a search number 8 that is different from stage to stage. In this manner, the pointer processing means 200 performs pipeline processing for increasing the search processing performance. The pointer process controlling function 240 of the pointer processing means 200 manages the extracting function 215, the storage signal generation for the register G 216, and the pipeline processing.

[Fixed-length-data Table Memory]

FIG. 4 shows an example of the configuration of the fixed-length-data table memory 560 (FIG. 1). The fixed-length-data table memory 560 includes the memory section, constituted by the memory arrays 561, and a write and read circuit 569. An output of the pointer processing means 200, i.e., the fixed-length-data table index 252, is used to address the memory of the fixed-length-data table memory 560, and the synchronization search number 251 is used for synchronization of the read circuit the fixed-length-data table memory 560. As shown in FIG. 5, the fixed-length-data table index 252 is constituted by the address of a memory bank 562 itself and an address (displacement) in the memory bank 562 and serves as a memory address of the fixed-length-data table memory 560. In this case, the address of the memory arrays 561 is not output, and the fixed-length-data table memory 560 is independently controlled by memory control data (not shown), which is an output of the pointer processing means 200. Thus, all memory arrays 561 of the fixed-length-data table memory 560 can be read.

The writing function of the fixed-length-data table memory 560 is accomplished by a write address/control signal 563 and a write command provided by write data 564, the write address/control signal 563 and the write data 564 being input to the read and write circuit 569. Since the writing function is mainly used by the fixed-length-data searching and managing apparatus, a detailed description will be given in conjunction with a description of the fixed-length-data searching and managing apparatus.

The reading function of the fixed-length-data table memory 560 is executed based on a read command 565 issued from the pointer processing means 200. The read command 565 contains a control signal and the address of a memory to be read and also has the synchronization search number 251 unique to the read command. The reason is that the read commands are not necessarily executed in order but are executed in order of executable commands. After the read command is executed, the resulting read data is output as read data 567 shown in FIG. 4 together with the input synchronization search number 251. With this arrangement, it is possible to determine which read command the read data 567 corresponds to.

The memory section of the fixed-length-data table memory 560 is constituted by N memory arrays 561 (N is an integer of 1 or greater) and each memory array is constituted by M memory banks 562 (M is an integer of 1 or greater). The memory arrays 561 are operated independently and all or some of the memory arrays 561 can be operated simultaneously. In memory array 561, each memory bank 562 has independent timing generating circuits and thus operates independently. However, since address and data buses and control signals which connect the banks are shared, the number of memory banks 562 that can start operating at a time is just one. Since the operation time of each memory bank 562 is long compared to the memory operation command intervals, multiple memory banks 562 in the memory array 561 can be operated. The fixed-length-data table memory 560 is constituted by M*N memory banks. The reason why it is not constituted by M*N memory arrays 561 is that the amount of the address and data buses and the number of control signals would become enormous.

In the fixed-length-data table memory 560, a read command can be issued to one memory 561 at the memory operation command intervals (t seconds). When all memory banks 562 are operable, the memory operation command interval depends on the transfer capabilities of a bus that transfers the read address/control signals and a bus that transfers the read data. The memory operation command, i.e., the reading of a fixed-length-data table, can be executed a minimum of 1/t times and a maximum of N/t times per second. However, when multiple read commands are issued to the same memory bank 562, the commands can be executed only at the memory operation time intervals. In this case, the merit of the parallel-operation capability of the fixed-length-data table memory 560 is lost. When this situation occurs, the only solution is to employ means for reducing the operation time. A scheme for improving the memory parallel operation when that situation occurs in a short period of time will be described below.

FIG. 5 shows a reading function 570 of the fixed-length-data table memory 560. The reading function 570 for the memory array 561 is constituted by n registers 571 and fixed-length-data table memory controlling means 572. The n registers are labeled R1, R2, R3, . . . , and Rn and store the read commands. Each read command includes a control signal and a memory address containing the address of the memory bank 562 to be read. The registers are connected by wiring lines that allow independent shift operations for shifting a read command from R2 to R1 and a read command from R3 to R2. Each shift operation is controlled by an execution command issued from fixed-length-data table memory controlling means 572. For example, when three read commands are in an execution-waiting state, the pointer-table memory controlling means 512 performs control so that the three commands are stored in R1, R2, and R3. In this case, regarding the time at which the commands are received, the command for R1 is the first and the command for R3 is the last. The fixed-length-data table memory controlling means 572 manages the operation state of each memory bank 562 in the memory array 561 that the fixed-length-data table memory controlling means 572 is in charge of.

When the read command 565 is input to the reading function 570, the fixed-length-data table memory controlling means 572 selects a register next to a register in which storage was performed last and stores the command in the selected register. For example, when R1, R2, and R3 are occupied, R4 is selected and the command is stored therein. Before the start time of accessing the memory array 561, the fixed-length-data table memory controlling means 572 selects a next executable command for the memory bank, from the commands stored in the registers R1, R2, R3, and R4. When there are multiple executable commands, the execution is performed sequentially from older commands. For example, when the commands in the registers R2 and R4 are executable, the command in the register R2 is executed first. After the command in the register R2 is transferred to the memory bank 562, the command in the register R3 is shifted to R2 and the command in the register R4 is shifted to R3. The number of registers, n, is determined considering the number of memory banks 562 in the memory arrays 561, the memory operation command intervals, and the memory operation time. In this manner, the sequential execution of the given read commands 565 from an executable command can increase the number of memory reading operations per unit time.

The output of the fixed-length-data table memory 560 includes read data 567 that was read and the synchronization search number 251 that accompanies the read command 565. The read data 567 is entry data of the fixed-length-data table.

Figure 8:
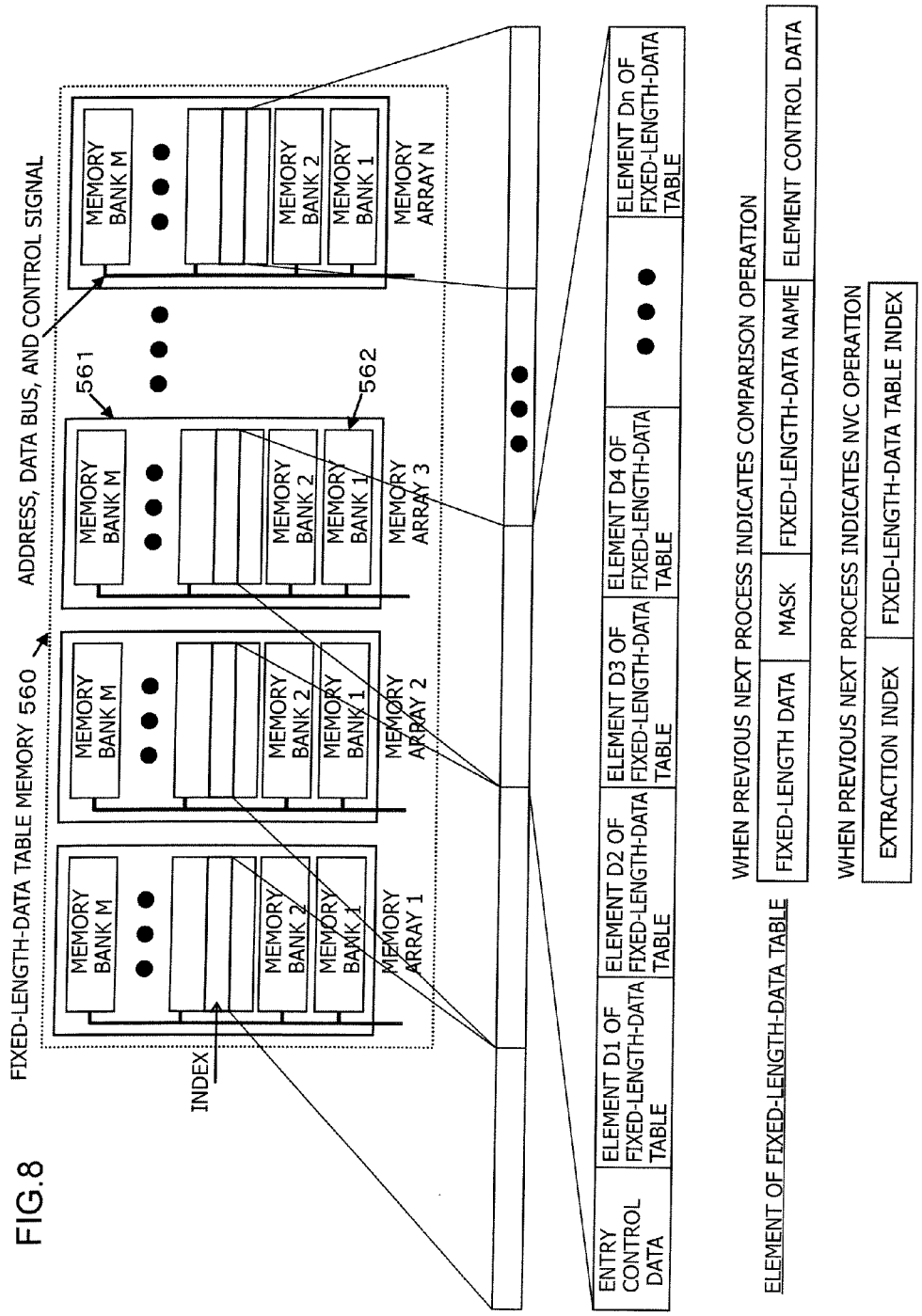
FIG. 8 is a diagram showing the format and contents of entry data of the fixed-length-data table and types of elements and their contents in the entry data of the fixed-length-data table in one embodiment of the present invention.

As shown in FIG. 5, the index of the fixed-length-data table includes the address of the memory bank 562 itself and an address (displacement) in the memory bank 562. The memory array is controlled by the memory control data 253. The reason is to increase the number of pieces of fixed-length data compared at a time and to prevent unnecessary memory-array reading. FIG. 8 shows the structure of fixed-length data read with one index of the fixed-length-data table. Entry data read from the memory array 561 contains entry control data and multiple pieces of, a single piece of, or part of fixed-length-data. The number of pieces of fixed-length-data contained in the memory array 561 depends on the length of the fixed-length-data. FIG. 8 shows, by way of example, a case in which a maximum number of pieces of fixed-length data exist at one index in the fixed-length-data table. In this case, entry control data included in the memory arrays, other than the memory array 1, are ignored and thus are not illustrated.

FIG. 8 shows the configuration of elements of the fixed-length-data table. Two formats exist for the elements of the fixed-length-data table and the format therefor is determined by the previous next processes. One is format (1) in which the previous next process indicates the comparison operation and the other is format (2) in which the previous next process indicates the NVC operation. Format (1) is constituted by fixed-length data, a mask, and a fixed-length-data name. In the case of format (1), there is a case in which the mask does not exist (i.e., a case in which a global mask is used) depending on a search rule. In this case, comparison target data is fixed-length data and the mask is used for the comparison operation. In this case, when a fixed-length-data name shows a match as a result of the comparison operation, the comparison target data is output as the label of the matched fixed-length data. Format (2) is constituted by an extraction index and a fixed-length-data table index. For the sake of understanding format (2), the NVC operation will be described below.

The NVC operation is described with reference to FIG. 9. In order to facilitate the understanding of the NVC operation, a procedure for creating entry data for the NVC operation is described with reference to FIG. 9. By way of example, it is assumed that one entry in the pointer table contains m pieces of fixed-length data. Each piece of fixed-length data contains, specifically, fixed-length data, a corresponding entire index, a mask and a fixed-length-data name. As illustrated at task 1 in FIG. 9, first, a specified portion is extracted from the entire index, and the extracted portion is called an extraction index. Consequently, extraction indices corresponding to the m pieces of fixed-length data are obtained. Next, at task 2, the m extraction indices are arranged in order of size together with other data. Further, at task 3, the m extraction indices arranged in order of size together with the other data are divided in order of size to create a predetermined number of groups or less. This predetermined number indicates a number of groups that can be accommodated in one piece of entry data of the fixed-length-data table. Since any number of groups within the predetermined number can be stored in the entry data, the predetermined number of groups can be arbitrarily selected. At task 4, the fixed-length data and other data in the groups are stored in the entry data. The stored data becomes entry data for the comparison operation. Each piece of entry data has a corresponding index. In addition, at task 5, entry data for the NVC operation is created. Although a method for creating entry data for the NVC operation has been described above, the method for creating an NVC format table structure in the present invention is different.

Figure 9:
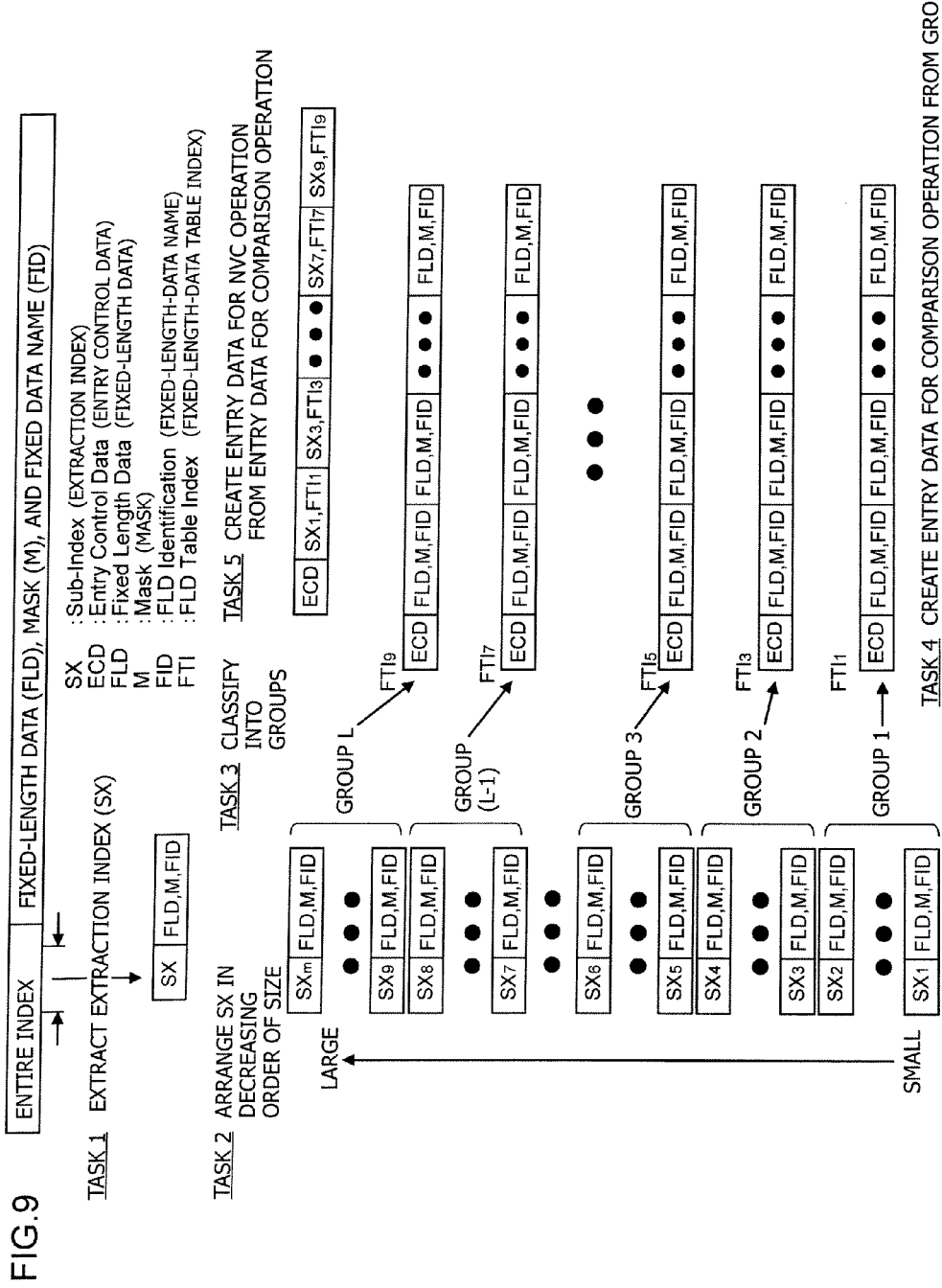
FIG. 9 is a diagram illustrating an operation for an NVC format of the fixed-length-data table in one embodiment of the present invention.

The entry data for the NVC operation can be understood from the illustration of FIG. 9. That is, the NVC operation is performed as follows. For example, when the next process in entry data of the pointer table indicates the NVC operation, the fixed-length-data table memory is read in accordance with a fixed-length-data table index specified by the entry data, and the entry data for the NVC operation is obtained. Thereafter, a portion specified by the next process in the entry data for the NVC operation is extracted from the entire index 190 of the input fixed-length data 9. The value size of the extracted extraction index is compared with that of the extraction index of each fixed-length-data-table element in the entry data for the NVC operation. The NVC-operation entry data obtained at task 5 shown in FIG. 9 are arranged so that the left-side extraction index is minimum and extraction indices become large toward the right. In accordance with this example, when the value-size comparisons with the extraction index are described from the left, the results can be arranged in the manner, for example, large, large, large, large, small, and small. In this case, the fixed-length-data table index having "large" immediately before "small" serves as a next fixed-length-data-table read index. When all results of the size comparison show "large", the fixed-length-data table index included in the rightmost extraction index becomes a next fixed-length-data-table read index.

If the number of pieces of fixed-length data belonging to an entry in the pointer table is so large that they cannot be stored in the entry data for the NVC operation and the entry data for the comparison operation, the number of pieces of entry data for the NVC operation is increased. Thus, a great number of pieces of fixed-length data can be searched for with the configuration of the entry data for the NVC operation, the entry data for the NVC operation, and the entry data for the comparison operation. Since the NVC operation itself is a very rare event, a case in which two pieces of entry data for the NVC operation continue cannot happen, but a function therefor is provided.

FIG. 6 shows the contents of entry control data in the fixed-length-data table stored in the fixed-length-data table memory 560. The entry control data has a structure similar to that of entry data of the pointer table. As shown in FIG. 6, the entry control data can be broadly classified into three elements: (1) a next process, (2) data required for the next process, and (3) memory control data. The memory control data is data for controlling the memory array 561 to be read next, the memory array 561 being included in the fixed-length-data table memory 560 in which the fixed-length-data table is stored. In the fixed-length-data table memory 560, only memory arrays in which fixed-length data are stored are read by the memory control data. When a memory to be read next is the pointer table memory 500, the memory control data is ignored.

The entry control data has the following five next processes.

(1) No fixed-length data exists in this entry in the fixed-length-data table, which results in the end of searching.

(2) A pointer table is read again.

(3) A local table (LT) is read and comparison is executed.

(4) A fixed-length-data table is read and NVC is executed.

(5) A fixed-length-data table is read and comparison is executed.

These next processes will be described in detail.

When the next process is (1) noted above, i.e., when no fixed-length data exists in this entry in the fixed-length-data table, a search result is output from the outputting means 800 via the comparing means. If any search result corresponding to the synchronization search number 192 is not stored in the comparing means 400, a search result indicating a mismatch is output together with the synchronization search number 192.

When the next process is (2) noted above, i.e., when a pointer table is read again, a large number of pieces of fixed-length data exist in this entry in the fixed-length-data table, which means that yet more segmentation is required. As means for achieving this, segmentation by the pointer table is performed. This entry has the base address of the pointer table memory 500, the size of the pointer table, the start bit position of an entire index, and the end bit position of the entire index. An index of the SPT is obtained by concatenating the base address of the pointer table memory 500 and bits that exist from the start bit position of the entire index to the end bit position thereof. The bits that exist from the start bit position to the end bit position of the entire index are different portions from the pointer table index. After the index of the SPT is obtained, the pointer table is read again via the comparing means. The subsequent process complies with an entry in the read pointer table.

When the next process is (3) noted above, i.e., when a local table (LT) is read and comparison is performed, an LT configured in the fixed-length-data table is read and a large number of pieces of obtained fixed-length data are compared. This means that even more segmentation is required since a large number of pieces of fixed-length data exist in this entry in the pointer table. The LT is one means for achieving this. The LT utilizes multiple entries in the fixed-length-data table as a table. An index of the LT is obtained by concatenating a high-order portion of an index of the fixed-length-data table and bits that exist from the start bit position of an entire index to the end bit position thereof. Processing after an index of the LT is obtained is the same as the processing after an index of the fixed-length-data table in process (5) is obtained.

When the next process is (4) noted above, i.e., when a fixed-length-data table is read and NVC is executed, an enormous number of pieces of fixed-length data exist in this entry in the pointer table, which means that even more drastic grouping is required. This entry data has an index of the fixed-length-data table. The fixed-length-data table is read based on the index, and NVC is executed based on the read data. The case in which this next process is performed is rare. This next process is followed by (4) or (5). When process (4) is selected, it is expected that this entry has an enormous number of pieces of fixed-length data. When the previous next process indicates the execution of the NVC, the entry control data contains data extracted from an entire index, as shown in FIG. 6.

When the next process is (5) noted above, i.e., when a fixed-length-data table is read and comparison is executed, this entry data has an index of a fixed-length-data table and memory control data for the fixed-length-data table. Based on the index, the fixed-length-data table is read and read data are used to execute comparison. During the reading of the fixed-length-data table, the memory control data of the fixed-length-data table read only the memory array 561 in which fixed-length data belonging to the entry is stored. With this arrangement, the number of memory reading operations is increased and power required for memory reading is saved. Typically, in this next process, searching of a majority portion by the fixed-length-data searching apparatus 10 is finished. After an index of the fixed-length-data table is obtained from the entry data, the fixed-length-data table is read. Multiple entries from the obtained fixed-length-data table are sent to the comparing means 400 and are compared with the synchronization input-fixed-length data 193, so that comparison results are obtained. When the previous next process indicates the execution of the NVC, the entry control data contains data extracted from an entire index, as shown in FIG. 6.

[Comparing Means]

The entry data, which is an output of the fixed-length-data table memory 560, is input to the comparing means 400. The comparing means 400 serves to compare the input entry data with the pre-stored synchronization-input-fixed-length data 193 (comparison operation), to hold the result obtained by the comparison, to compare the value of the input entry data with the value of the extraction index extracted from the entire index, and to determine a next process in accordance with the next process in the input entry control data.

Figure 10:
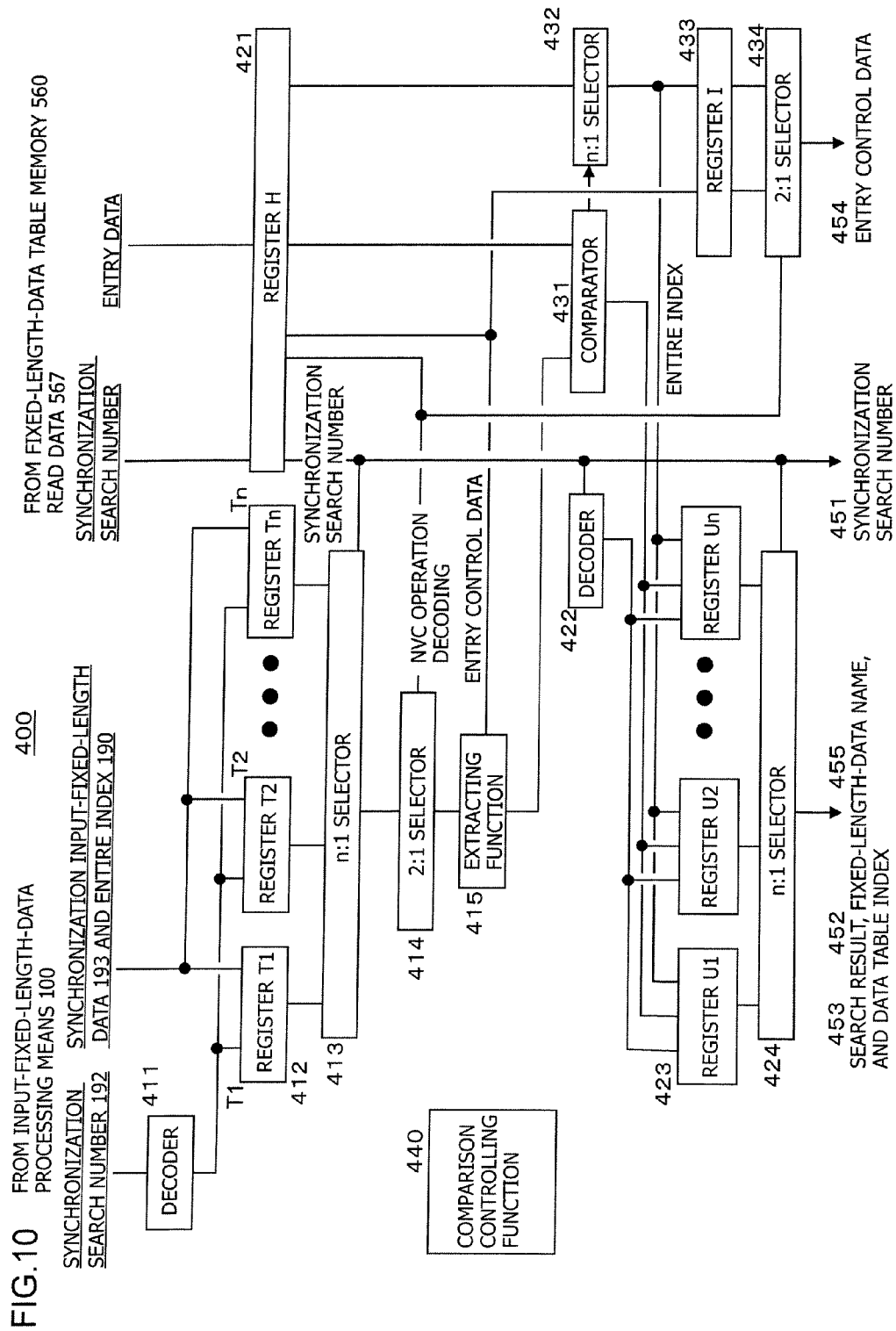
FIG. 10 is a block diagram showing the function of comparing means 400 included in the fixed-length-data searching apparatus 10 in one embodiment of the present invention.

FIG. 10 shows an example of the comparing means 400. The entry data of the fixed-length-data table, the entry data being an output of the fixed-length-data table memory 560, and the output of the input-fixed-length-data processing means are input to the comparing means 400. As shown in FIG. 10, the comparing means 400 receives the synchronization search number 192 and the entire index 190 output from the input-fixed-length-data processing means 100. The synchronization search number 192 is decoded by a decoder 411, and the synchronization input-fixed-length-data 193 and the entire index 190 are stored in a register Tx 412 corresponding to the decoded number x. The synchronization input-fixed-length-data 193 is used for comparison with the entry data of the fixed-value data table, the entry data being output from the fixed-value-data table memory 560. The entire index 190 is used for generation of a pointer table index or a fixed-length-data table index.

The synchronization search number and the entry data sent from the fixed-length-data table memory 560 are stored in a register H. Functions of the comparing means 400 are to perform processing for the entry data other than memory control data in the register H 421, i.e., processing for the previous next process and processing for the next process contained in the entry data in the register H. Thus, processing indicated by the previous next process will first be described and the processing of the comparing means 400, the processing being executed in the next process contained in the entry data, will then be described. The operation procedure in each description is controlled by a comparison controlling function 440. The comparison controlling function 440 generates a control signal for other circuits of the comparing means 400 in accordance with an input next process.

An input from the fixed-length-data table memory 560 to the comparing means 400 in the previous next process occurs in the following five cases.

(1) No fixed-length data exists in this entry in the pointer table, which results in the end of searching.

(2) One piece of fixed-length data exists in this entry in the pointer table, which results in the end of searching.

(3) A local table (LT) is read and comparison is executed.

(4) A fixed-length-data table is read and NVC is executed.

(5) A fixed-length-data table is read and comparison is executed.

Processing performed by the comparing means 400 will be described below with respect to each case.

When the next process is (1) noted above, i.e., when no fixed-length data exists in this entry, the comparison controlling function 440 recognizes the end of searching. In this case, the contents of a register Ux corresponding to the synchronization search number x stored in the register H, i.e., a search result 453 and a fixed-length-data name 452, together with the synchronization search number 451, are output to the outputting means 800 via an n:1 selector 424. Concurrently, when the search result indicates a match, the synchronization search number 451 and a data table index 455, which is held by the register Ux corresponding to the synchronization search number x, are sent to the modifying means 300.

When the next process is (2) noted above, i.e., when one piece of fixed-length data exits in this entry, the comparison controlling function 440 recognizes the end of searching and a match result and causes the comparator 431 to output the address of the fixed-length-data-table index held in the register H to an n:1 selector 432, thereby outputting the match result. The n:1 selector 432 outputs the fixed-length-data name and the fixed-length-data table index, and the comparator 431 outputs the search result and the address of the fixed-length-data-table index. The outputs are written to the register Ux corresponding to the synchronization search number x. After the writing operation, the data are sent to the outputting means 800 and the modifying means 300 via the n:1 selector 424. The fixed-length-data-table index and the address of the fixed-length-data-table index are concatenated to generate the data table index 455. The data output to the outputting means 800 are the search result 453, the synchronization search number 451, and the fixed-length-data name. The data output to the modifying means 300 are the synchronization search number 451 and the data table index 455.

When the next process is (3) noted above, i.e., when a local table (LT) is read and comparison is performed, processing performed by the comparing means 400 with respect to the entry data held in the register H is the same as the processing performed when the next process is (5), i.e., when the fixed-length-data table is read and comparison is executed. Based on the synchronization search number held in the register H, an n:1 selector 413 selects a register Tx and outputs the contents thereof, i.e., the synchronization input-fixed-length data and the entire index. Since the next process is (3) or (5), a 2:1 selector selects synchronization input-fixed-length data from the outputs of the register Tx. The selected output is then input to an extracting function 415. In this case, similarly, since the next process is (3) or (5), the extracting function 415 does not operate and the input synchronization fixed-length data is input to the comparator 431 without being directly output. On the other hand, the fixed-length-data table elements stored in the register H are input to the comparator 431 and a comparison operation is performed.

Figure 11:
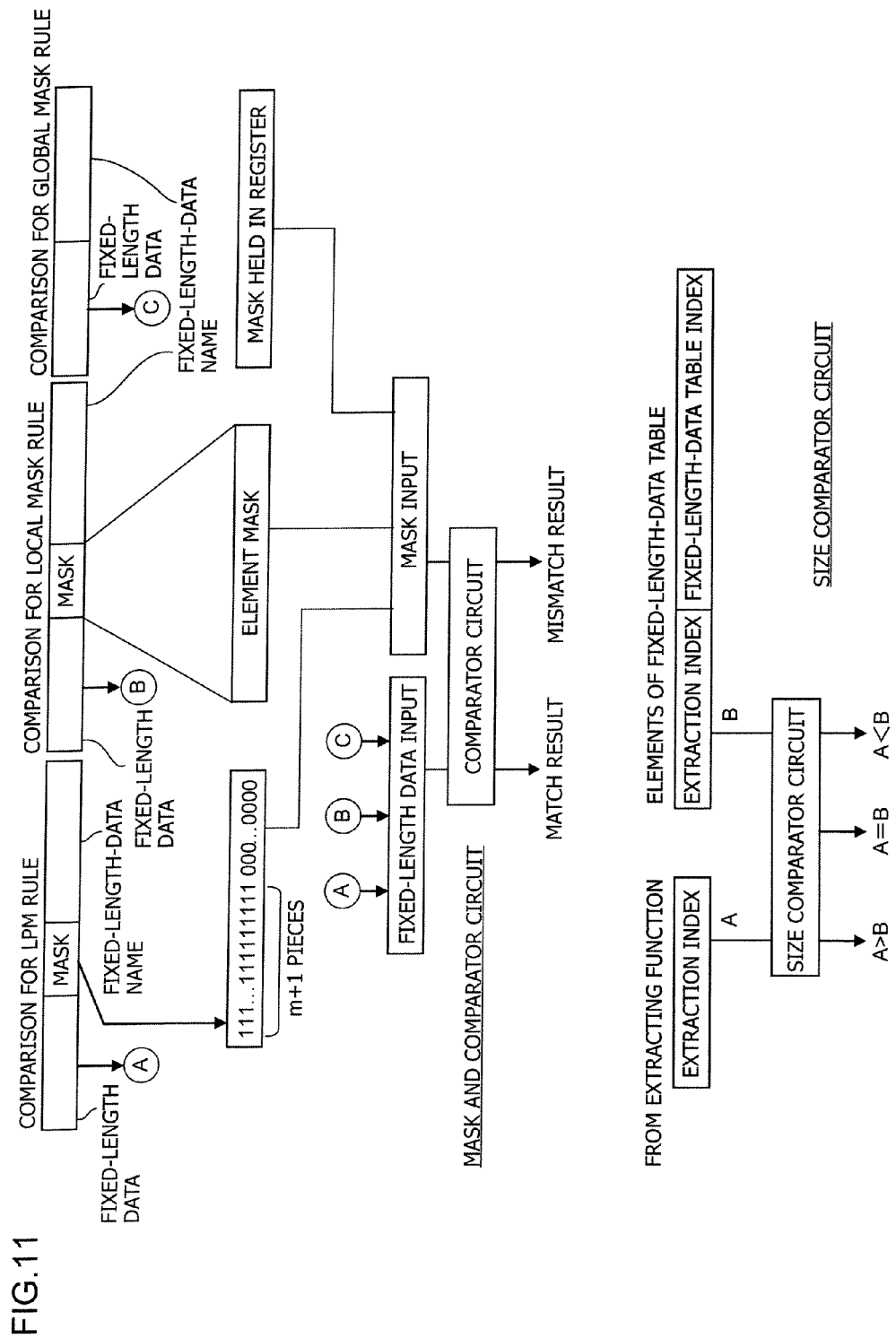
FIG. 11 includes a functional block showing a comparison method implemented by the comparing means 400 and a corresponding mask and a functional block showing a size comparison method implemented by the comparing means 400 in one embodiment of the present invention.

The comparator 431 performs three types of logic comparisons shown in FIG. 11. When the LPM (longest prefix match) method is used for the search rule, the fixed-length-data table elements have mask values. The mask is expanded into a bit string having the bit length of the fixed-length data. In the method for the expansion, 1s, the number of which is equal to a sum obtained by adding 1 to the value (m in FIG. 11) of the mask, are arranged from the left-side bit position, and subsequent thereto, 0s are arranged up to the bit length of the fixed-length data. The expanded bit string having the same length as the fixed-length data serves as a mask for a logic comparison operation. In this case, the logic comparison is performed on (m+1) bits from the left side of the fixed-length data. In the logic comparison, when a fixed-length-data-table element matches the (m+1) bits at the left side of the synchronization input-fixed-length data, it is determined to be a match. Otherwise, it is determined to be a mismatch. When a local mask rule method is used for the search rule, the fixed-length-data-table elements have own masks and the masks are used to execute logic comparison of the fixed-length-data-table elements and the synchronization input-fixed-length data. The logic comparison is the same as the processing performed after the mask expansion using the LPM method. However, since the mask has 1s at arbitrary bit positions, the logic comparison is executed only at the bit positions having 1s. When a global mask rule method is used for the search rule, the fixed-length-data-table elements have no mask. Instead, a mask is stored in a register that can be specified. The mask is used to execute logic comparison of the fixed-length-data-table elements and the synchronization input-fixed-length data. The logic comparison is the same as that using the local-mask rule method.

When the result of the logic comparison indicates that a matched element exists in the fixed-length-data table, the address of the matched element is generated and the search result, the fixed-length-data name, the fixed-length-data table index, and the address of the matched element are stored in the register Ux 423 addressed by the synchronization search number x held in the register H 421. Concatenating the fixed-length-data table index and the address of the matched element provides a data-table index.

When the next process is (4) noted above, i.e., when a fixed-length-data table is read and NVC is executed, the value comparison shown in FIG. 11 is performed and the search is continued. Based on the synchronization number x held in the register H, the n:1 selector 413 selects a register Tx from the registers T1 to Tn 412 and outputs the contents of the register Tx, i.e., the synchronization input-fixed-length data and the entire index. Since the next process is (4), the 2:1 selector 414 selects the entire index from the output data. The resulting output is input to the extracting function 415. Similarly, since the next process is (4), the extracting function 415 is controlled by the NVC length, the start bit position, and the end bit position held in the register H 421 to extract an extraction index therefrom. The extraction index is input to the comparator 431. On the other hand, the fixed-length-data-table elements held in the register H 421 are input to the comparator 431 and are subjected to a value comparison operation. When the previous next process indicates the NVC operation, the NVC length, the start bit position, and the end bit position are stored in the next process contained in the entry data in the register H.

As shown in FIG. 11, the comparator 431 compares the value of an extraction index (A) sent from the extracting function 415 and the value of an extraction index (B) of each element of the fixed-length-data table. Consequently, the comparator 431 generates A>B, A=B, and A<B.

Thus, the comparator 431 has comparator circuits and value comparator circuits. These circuits have a configuration in which the bit lengths of the circuits can be changed so that they can handle fixed-length data having various bit lengths. When circuits that are reconfigurable for each bit are wasteful, the comparator 431 has circuits that are reconfigurable for each byte or word.

Simultaneously with the processing in the processing of the described previous next process, the comparing means 400 performs processing of the next process contained in the entry data in the register H. The entry control data of the fixed-length-data table performs next processes described below and shown in FIG. 6.

(1) No fixed-length data exists in this entry in the fixed-length-data table, which results in the end of searching.

(2) A pointer table is read again.

(3) A local table (LT) is read and comparison is executed.

(4) A fixed-length-data table is read and NVC is executed.

(5) A fixed-length-data table is read and comparison is executed.

The processing in these next processes varies depending on whether the previous next process is the NVC operation or not. Thus, a case in which the previous next process is not the NVC operation will first be described in detail and a case in which the previous next process is the NVC operation will then be described.

When the next process is (1) noted above, i.e., when no fixed-length data exists in this entry in the fixed-length-data table, the comparison controlling function 440 recognizes the end of searching and the contents (i.e., the search result 453 and the fixed-length-data name 452) of the register Ux corresponding to the synchronization search number x held in the register H are output, together with the synchronization search number 451, to the outputting means 800 via the n:1 selector 424. Concurrently, when the search result indicates a match, the synchronization search number 451 and the data table index 455 held in the register Ux corresponding to the synchronization search number x are sent to the modifying means 300.

In other next processes (2) to (5), the entry control data is input to a register I 433 and is output via a 2:1 selector 434. Entry control data 454 to be output is output to the pointer processing means 200.

When the previous next process is an NVC operation, the following three processes can be employed for the next process for the entry control data.

(1) No fixed-length data exists in this entry in the fixed-length-data table.

(2) A fixed-length-data table is read and NVC is executed.

(3) A fixed-length-data table is read and comparison is executed.

In next process (1) of these processes, processing that is the same as that in next process (1) when the next process is not the NVC operation is performed.

When the next process is (2) and (3), entry control data to be output is different from data output when the previous next process is not the NVC operation. Since the previous next process indicates the NVC operation, value comparison is performed with the fixed-length-data-table elements in the entry data held in the register H. Since comparison performed in this case is value comparison, an element that meets the condition exists. The fixed-length-data table index of the element is stored in the register I 433 via the n:1 selector 432. The fixed-length-data table index is output together with the next process via the 2:1 selector 434. The entry control data 454 to be output is output to the pointer processing means 200.

FIG. 12 shows a summary of data output by the comparing means 400. Upon determining that the search operation is finished, the comparing means 400 outputs data shown in FIG. 12 to the modifying means 300 and the outputting means 800 (FIG. 1). That is, the comparing means 400 outputs the data-table index, together with the synchronization search number, to the modifying means 300. Using the synchronization number and the data-table index, the modifying means 300 accesses the user data and statistical data. Together with the search result and the synchronization search number, only when the comparison result shows a match, the fixed-length data name is additionally output to the outputting means 800. Upon determining that the search operation is continued, the comparing means 400 outputs data shown in FIG. 12 to the pointer processing means 200. When the previous next process is NVC, the comparing means 400 outputs the fixed-length-data table index obtained by the NVC operation, together with the synchronization search number. When the previous next process is not NVC, the comparing means 400 outputs the entry control data together with the synchronization search number.

When the circuitry of the comparing means 400 (FIG. 10) is divided between the register H 421 and the register I 433 into sections and the divided sections are called stages, respectively, the comparing means 400 can perform a search operation having different synchronization search numbers for the respective stages. In this manner, the comparing means 400 performs pipeline processing for increasing the search processing performance. The comparison controlling function 440 of the comparing means 400 controls the extracting function 415, the comparator 431, the storage-signal generation for the registers Ux, and the pipeline processing.

The entry control data output to the pointer processing means 200 is processed by the method described for the pointer processing means 200.

[Modifying Means]

The synchronization search number 451 and the data table index 455 input to the modifying means 300 are used to read user data stored in the data table and to modify statistical data. FIG. 13 shows an example of the modifying means 300.

In FIG. 13, the modifying means 300 receives the synchronization search number 192 and the synchronization statistical data 194 output from the input-fixed-length-data processing means 100, uses a decoder 311 to decode the synchronization search number 192, and stores the synchronization statistical data 194 in a register Tx corresponding to the decoded number x. The synchronization statistical data 194 is added to statistical data, which is one type of data-table entry data output from the data-table memory 540. The addition result is written in the same entry where the statistical data was stored. Other data and user data of the data-table entry data is read together with the statistical data and is output to the outputting means 800 together with the synchronization search number.

In FIG. 13, the data table index 455 and the synchronization search number 451 are input from the comparing means 400 and are stored in a register K 316. A read synchronization number 336 and a read data table index 335, which are outputs of the register K, are output to the data-table memory 540 to perform a read operation. The read data table index 335 is also stored in a register M 322, to perform writing after a change of the statistical data is made.

After the read operation of the data-table memory 540 is finished, data 556 read from the data-table memory 540, i.e., the synchronization search number and the entry data, are input. The synchronization search number and the entry data are stored in the register M 322 and a register J 315, respectively. The synchronization search number is used as a selection signal for an n:1 selector to select statistical data stored in a register Vx 312 corresponding to the synchronization search number x. The selected statistical data is stored in a register L 313 and is input to an adder 321. On the other hand, the statistical data of the entry data stored in the register J 315 is sent to another input of the adder 321. The user data of the entry data is stored in the register M 322.

The adder 321 outputs an addition result, which is stored in the register M 322. Subsequently, the read data table index 335, the synchronization search number, and the adder result which are stored in the register M 322 are output to the data-table memory 540 in the names of a write data table index 334, a write and output synchronization search number 333, and write cumulative statistical data 331, respectively, and the writing operation is performed. In this case, when a search number for processing management data is received, the adder 321 can also store the addition result in a register O 323. The search number for handing the management data is recognized by a decoder 324 and becomes a storage signal of the register O 323. An output of the register O 323 is read by the fixed-length-data searching and managing apparatus 50.

The details will be described below in connection with the fixed-length-data searching and managing apparatus 50.

The user data stored in the register M 322 is output, as output user data 332, to the outputting means 800, together with a write and output synchronization search number 333. FIG. 13 shows data output to the outputting means 800.

When the circuitry of the modifying means 300 is divided, at the register K 316, the register J 315, the register L 313, and the register M 322, into sections and the divided sections are called stages, the modifying means 300 can perform a search operation having different synchronization search numbers for the respective stages. In this manner, the modifying means 300 performs pipeline processing for increasing the search processing performance. A modification controlling function 340 of the modifying means 300 controls the adder 321, manages the storage-signal generation for the register K 316, the register J 315, the register L 313, and the register M 322, and manages the pipeline processing. In particular, with respect to the register M 322, a storage signal that corresponds to various types of data to be stored needs to be generated.

[Data Table Memory]

FIG. 4 shows an example of the structure of the data-table memory 540. The data-table memory 540 includes a memory section, constituted by memory arrays 541, and a write and read circuit 550. The write data table index 334 and the read data table index 335, which are outputs of the modifying means 300, are used to address the memory of the data-table memory 540. The read synchronization search number 336 is used for synchronization in a read circuit for the data-table memory 540. As shown in FIG. 5, each of the write data table index 334 and the read data table index 335 is constituted by the address of the memory array 551, the address of a memory bank 542, and an address (displacement) in the memory bank 542, and serves as a memory address of the data-table memory 540.

The writing function can receive write commands from two sections and can execute the commands. One is a write command output from the modifying means 300 and the other is a write command output from the management function for the data-table memory 540. The write command output from the modifying means 300 is executed using a write address/control signal A 551 and write data 552 which are input to the write and read circuit 550. The write command output from the management function for the data-table memory 540 is executed using a write address/control signal B 553 and write data 554 which are input to the write and read circuit 550. This writing function provided by the management function is mainly used by the fixed-length-data searching and managing apparatus; therefore, a detailed description will be given in conjunction with a description of the fixed-length-data searching and managing apparatus.

The reading function uses a read command from the modifying means 300, and the read command has an address/control signal 555 and the read synchronization search number 336 unique to the command. This is because the read commands are not executed in sequential order, but an executed in order of executable commands. After the execution of the read commands, read data are output the read data 556 shown in FIG. 4 together with the input read synchronization search number 336. This makes it possible to determine which read command the read data 556 corresponds to.

The memory section of the data-table memory 540 includes U memory arrays 541 (U is an integer of 1 or greater) and each memory array includes V memory banks 542 (V is an integer of 1 or greater). The memory arrays 541 are operated independently and all or some of the memory arrays 541 can be operated simultaneously. In each memory array 541, the memory banks 542 have independent timing generating circuits and thus operate independently. However, since address and data buses and control signals which connect the banks are shared, the number of memory banks 542 that can start operations at a time is just one. Since the operation time of each memory bank 542 is long compared to the interval of a memory operation command, multiple memory banks 542 in the memory array 541 can be operated. The data-table memory 540 includes U*V memory banks, as described above. The reason why it does not include U*V memory arrays 541 is that the amount of the address and data buses and the number of control signals would become enormous.

In the data-table memory 540, the read command can be issued to the same memory array 541 at the memory operation command intervals. When all memory banks 542 are operable, the memory operation command interval (t seconds) depends on the transfer capabilities of a bus that transfers the read address/control signals and a bus that transfers the read data. The memory operation command, i.e., the data-table reading, can be executed up to Q/t times per second. However, when multiple read commands are issued to the same memory bank 542, the commands can be executed only at the memory operation time intervals. In such a case, the merit of the parallel-operation capability of the pointer table memory 540 is lost. When this situation occurs, the only solution is to employ means for reducing the operation time. Means for improving the memory parallel operation when that situation occurs in a short period of time will be described below. FIG. 5 shows a reading function 549 for the data-table memory 540.

The reading function 549 for the memory array 541 includes n registers 543 and data-table memory controlling means 544. The n registers are labeled R1, R2, R3, . . . , and Rn and store the read commands. The read command includes a control signal and a memory address containing the address of the memory bank 542 to be read. The registers are connected by wiring lines that allow independent shift operations for shifting a read command from R2 to R1 and a read command from R3 to R2. For each shift operation, the data-table memory controlling means 544 issues an execution command. For example, when three read commands are in an execution-waiting state, the data-table memory controlling means 544 performs management so that the three commands are stored in R1, R2, and R3. In this case, regarding the time at which the commands are received, the command for R1 is the first and the command for R3 is the last. The data-table memory controlling means 544 manages the operation state of each memory bank 542 in the memory array 541 that the data-table memory controlling means 544 is in charge of.

When the read command 557 is input to the reading function 549, the data-table memory controlling means 544 selects a register next to a register in which storage was performed last and stores the command in the selected register. For example, when the registers R1, R2, and R3 are occupied, the register R4 is selected and the command is stored therein. Before the start time of accessing the memory array 541, the data-table memory controlling means 544 selects a next executable command for the memory bank, from the commands stored in the registers R1, R2, R3, and R4. For example, if commands in R2 and R4 are executable, the older command is executed. In this case, after the command in R2 is executed and the command in R2 is transferred to the memory bank 542, the command in the register R3 is shifted to R2 and the command in the register R4 is shifted to R3. The number of registers, n, is determined considering the number of memory banks 542 in the memory array 541, the memory operation command interval, and the memory operation time. In this manner, the execution of the given read commands 557 from an executable command can increase the number of memory reading operations per unit time.

The reading function of the data-table memory has been described above. As in the reading of the data-table memory, read data is modified and is written to the same location. Thus, the read command and the write command may be controlled at the same time in the above description.

Outputs of the data-table memory 540 are the read data 556 and the read synchronization search number 336 attached to the read command 557 for the read data 556. The read data 556 is entry data of the data table.

FIG. 13 shows the contents of entry data of the data table stored in the data-table memory 540. As shown in FIG. 13, the entry data can be split into two elements. They are cumulative statistical data and user data. The processing of those data has been described in conjunction with the modifying means 300.

[Outputting Means]

The outputting means 800 outputs the search result. FIG. 14 shows an example of the outputting means 800. The synchronization search number 451, the search result 453, and the fixed-length-data name 452 are input from the comparing means 400 to the outputting means 800. Through the decoding of the synchronization search number 451 by a decoder 811, those input data are stored in a register Sx 812 corresponding to the synchronization search number 451 (referred to as "x").

Similarly, the output synchronization search number 333 and the output user data 332 are input from the modifying means 300 to the outputting means 800. Through the decoding of the synchronization search number 333 by a decoder 815, those input data are stored in a register Sy 812 corresponding to the output synchronization search number 333 (referred to as "y").

When the search result 453 input from the comparing means 400 to the outputting means 800 indicates a mismatch, the synchronization search number 451, the search result 453, and the fixed-length-data name 452 are input from the comparing means 400, are registered in the Sx 812, are output from an AND-OR selector 813, are stored in a register N, and are output as a search result output 820. FIG. 14 shows the search result output 820, which is an output of the outputting means 800. In this case, the name in the register Sx 812, i.e., the synchronization search number, is also output from the AND-OR selector 813, is stored in the register N, and is output as the search result output 820.

When the search result 453 input from the comparing means 400 indicates a match, the synchronization search number 451, the search result 453, and the fixed-length-data name 452 are input from the comparing means 400 and are stored in the register Sx. The outputting means 800 then waits for the output user data 332 from the modifying means. After the output synchronization search number 333 and the output user data 332 are input from the modifying means 300 and are stored in the register Sx 812, all the contents (including the synchronization search number) of the register Sx are output from the AND-OR selector 813, are stored in the register N 814, and are output as the search result output 820. FIG. 14 shows the search result output 820, which is an output of the outputting means 800.

The output determination by the outputting means 800 is made by an output controlling function 840. When the synchronization search number handles the management data, the output controlling function 840 does not output the contents of the register Sx 812 corresponding to the synchronization search number to the management search result output 820 and directly outputs the contents of the register Sx 812 to the management search result output 821.

When circuits provided in the register Sx 812 and the circuit of the register N 814 are called stages, a search operation in which each stage has a different synchronization search number can be performed. In this manner, the outputting means 800 performs pipeline processing for increasing the search processing performance. The output controlling function 800 of the outputting means 800 makes an output determination, controls the storage-signal generation for the register N 814, and controls the pipeline processing.

EXAMPLES

FIG. 1 is a block diagram showing an example of the fixed-length-data searching and managing apparatus 50 of the present invention. In addition to the fixed-length-data searching apparatus 10 (FIG. 1), the fixed-length-data searching and managing apparatus 50 shown in FIG. 1 has a table-management controlling means 600, an empty-house table memory 700, an empty-room table memory, a room-management memory 740, and a structure-management table memory 760. The table-management controlling means 600 interprets and executes an input table-management command 1. When a unit read using one memory address or different memory addresses of multiple memory banks 562 in the fixed-length-data table memory 560 is defined as a house, the empty-house table memory 700 stores an empty-house table that manages unused houses. When a unit that holds fixed-length data, data corresponding to fixed-length data required for searching, and data required for searching is defined as a room in the house, the empty-room table memory stores an empty-room table that manages houses having unused rooms. The room-management memory 740 stores a room-management table that manages the usage states of the rooms. The structure-management table memory 760 stores a structure-management table that manages the structures of tables configured based on search methods. The empty-room table memory 700, the empty-house table memory 720, the room-management table memory 740, and the structure-management table memory 760 may be configured with a unified memory.

In addition to the memories described above, the pointer table memory 500, the fixed-length-data table memory 560, and the data-table memory 540, which are included in the fixed-length-data searching apparatus 10, have configurations that allow interruption, reading, and writing by the table-management controlling means 600 even during a reading/writing operation for a search operation. In this case, the reading and writing operations that are performed on those memories by the table-management controlling means 600 do not cause any problem in or interference with the search operation.

Figure 15:
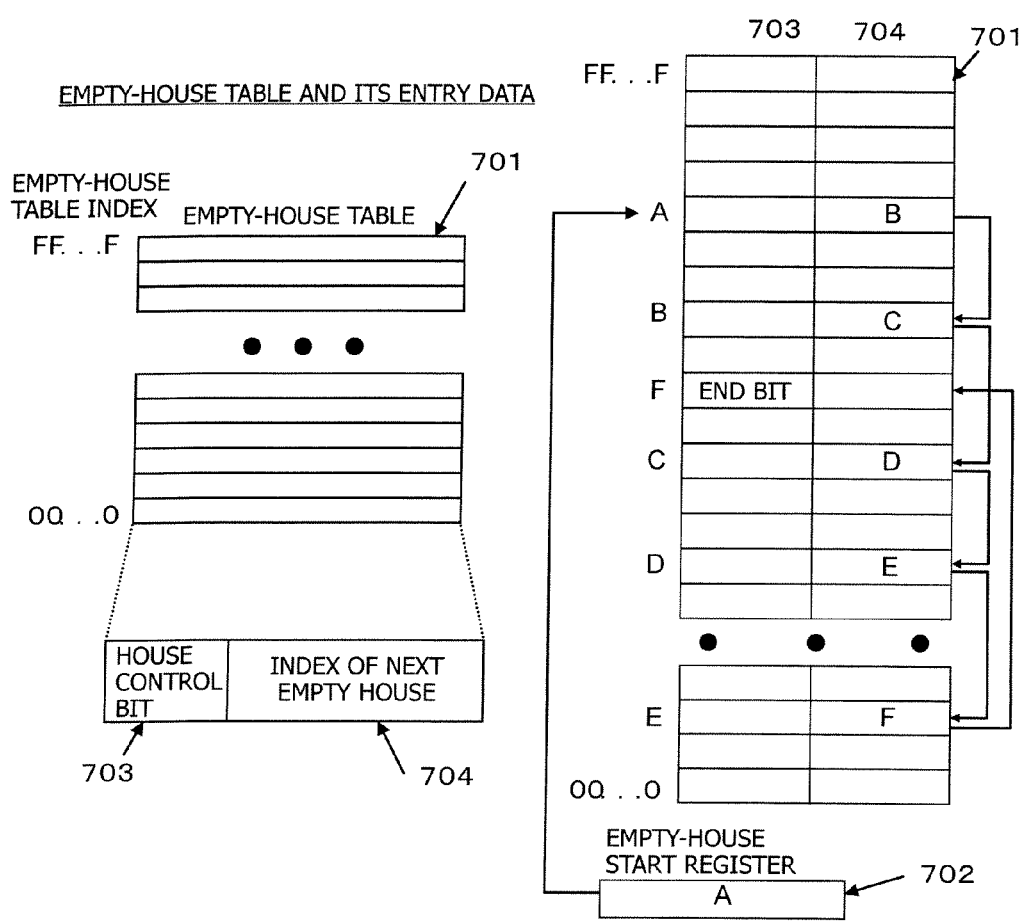
FIG. 15 is a diagram showing an empty-house table stored in an empty-house table memory 700, the contents of the empty-house table, and the relationships of entries in the empty-house table in one embodiment of the present invention.

FIG. 15 shows an empty-house table 701 stored in the empty-house table memory 700 and its entry data. Entry data of the empty-house table 701 is constituted by a house control bit 703 and a next-empty-house index 704. The maximum number of entries in the empty-house table 701 is equal to the number of houses included in the fixed-length-data table. Since the empty-house table 701 serves to merely manage empty houses, various other examples are possible.

[Empty-House Table Memory]

FIG. 15 shows one example of the empty-house table 701 and a method of using it. Registered empty houses are sequentially used in the empty-house management and are thus managed by the empty-house table 701 and an empty-house start register 702. The empty-house start register 702 holds an empty-house-availability bit and an index of a first empty house. FIG. 15 shows the management of six empty houses A, B, C, D, E, and F. The empty-house table 701 has a unidirectional link structure. Entry A in the empty-house table 701 has a house control bit 703 whose end bit is OFF and a next-empty-house index 704 whose value is B. Similarly, entries B, C, D, and E have house control bits 703 whose end bits are OFF and next-empty-house indices 704, C, D, E, and F, respectively. Entry F holds only a house control bit 703 whose end bit is ON. The empty-house start register 702 holds the index A of the first empty house. When there is a request for an empty house and it can be confirmed that the empty-house-availability bit held by the empty-house start register 702 is ON, the house index A can be used. When the empty-house-availability bit is OFF, it can be confirmed that there is no empty house. The empty-house table 701 is read using the empty-house index A. When the end bit of the house control bit is OFF, the next-empty-house house index 704 B located at the read index A is held by the empty-house start register 702. This operation is performed until the empty-house start register 702 stores the empty-house index F. Thereafter, since the empty-house-availability bit held by the empty-house start register 702 is ON when a request for an empty house is issued, the empty-house index 704 F is used as an empty house. Thereafter, the empty-house index 704 F is read and the empty-house-availability bit of the empty-house start register 702 is changed to OFF so as to correspond to the ON state of the end bit of the house control bit. Subsequently, the no-empty-house state continues in response to an empty-house request. For registration of an empty house, the index of an empty house to be registered is written to an index held by the empty-house start register 702 and the end bit of the written index is simultaneously changed to OFF. At this point, when the empty-house-availability bit of the empty-house start register 702 is OFF, the empty-house-availability bit is changed to ON. The method described above makes it possible to obtain and register an empty house.

[Empty-Room Table Memory]

Figure 16:
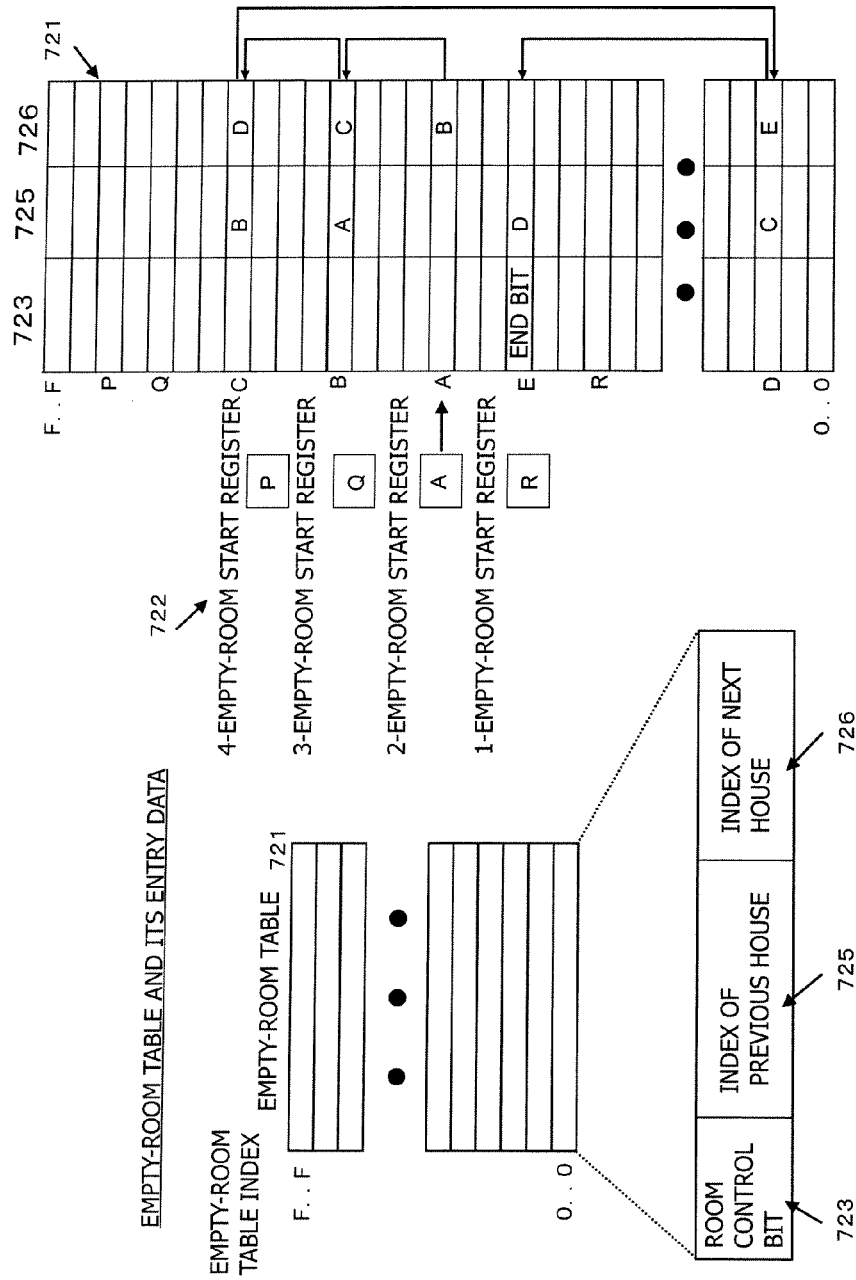
FIG. 16 is a diagram showing an empty-room table stored in an empty-room table memory 720, the contents of the empty-room table, and the relationships of entries in the empty-room table in one embodiment of the present invention.

FIG. 16 shows an empty-room table 721 stored in the empty-room table memory 720 and its entry data. Since a house having registered empty rooms is used when necessary, entry data of the empty-room table 721 is constituted by room control data 723, a previous-empty-house index 725, and a next-empty-house index 726. The maximum number of entries in the empty-room table 721 is equal to the number of houses included in the fixed-length-data table. Since the empty-house table 701 serves to merely manage houses having empty rooms, various other examples are possible.

FIG. 16 shows one example of the empty-room table 721 and a method of using it. Houses having empty rooms are managed by the empty-room table 721 and x-empty-room start registers 722, where x is an integer indicating the number of empty rooms. FIG. 16 shows a 1-empty-room start register for managing a house having one empty room, and similarly shows a 2-empty-room start register for managing a house having two empty rooms, a 3-empty-room start register for managing a house having three empty rooms, and a 4-empty-room start register for managing a house having four empty rooms. Each of the x-empty-room start registers 722 has the same function as the empty-house start register 702 described above. An empty-room management operation using the 2-empty-room start register shown in FIG. 16 will be described.

The 2-empty-room start register 722 holds an empty-room-availability bit and the index of a house having first two empty rooms. FIG. 16 shows the management of five houses A, B, C, D, and E each having two empty rooms. The empty-room table 721 has a bidirectional link structure. Entry A in the empty-room table 721 has a room control bit 723 whose end bit is OFF and a next-house index 726 B. In this case, an index 725 of a previous house having two empty rooms is not required because of the first entry. Similarly, entries B, C, and D have room control bits 723 whose end bits are OFF, previous-house indices 725 A, B, and C, and next-house indices 726 C, D, and E, respectively. Entry E holds only a room control bit 723 whose end bit is ON and a previous-house index 725 D. The 2-empty-room start register 722 has the index A of the first-2-empty-room house. When there is a request for a 2-empty-room house and it can be confirmed that the empty-room-availability bit held by the 2-empty-room start register 722 is ON, the house index A in the 2-empty-room start register 722 can be used. When the empty-room-availability bit is OFF, it can be confirmed that there is no house having empty rooms. The empty-room table 721 is read using the house index A. When the end bit of the room control bit is OFF, a next house index 724 B at the read index A is held by the 2-empty-room start register 722. This operation is performed until the 2-empty-room start register 722 stores the house index E. Thereafter, since the empty-room-availability bit held by the 2-empty-room start register 722 is ON in response to a request for two empty rooms, the next-house index 726 E is used as a house having two empty rooms. The next-house index 726 E is then read and, since the end bit of the room control bit is ON, the empty-house-availability bit of the 2-empty-room start register 722 is changed to OFF. Subsequently, the no 2-empty-room house state continues in response to a request for a 2-empty-room house.

For registration of a house having two empty rooms, the index of the 2-empty-room house to be registered is written to the previous-house index 725 at the index held by the 2-empty-room start register 722, and the end bit of the written index is simultaneously changed to OFF. The index held by the 2-empty-room start register 722 is also written to the previous-house index 725 at the index of the 2-empty-room house to be registered, and the index of the 2-empty-room house to be registered is written to the 2-empty-room start register 722. At this point, when the 2-empty-room-availability bit of the 2-empty-room start register 722 is OFF, the 2-empty-room-availability bit is changed to ON.

When a write request is issued for one room of a 2-empty-room house, the registration of the house in the empty-room table 721 needs to be deleted from a link created by the 2-empty-room start register 722. In this case, for example, when the index indicating the house is assumed to be C, the index C is read and a previous-house index 725 B and a next-house index 726 D are obtained. The index D is written to the next-house index 726 at the index B. In addition, the index B is written to the previous-house index 725 at the index D. Consequently, the index C is deleted from the link created by the 2-empty-room start register 722, and the link includes the indices A, B, D, and E. The method described above makes it possible to obtain and register a 2-empty-room house and delete the registration thereof.

FIG. 17 shows a method for managing rooms. It is assumed that a house is configured in two memory arrays and the house has eight rooms, in order to facilitate the description. The present invention, however, is not limited to this configuration. A collection of fixed-length data logically compared in a search operation, that is, a collection of rooms, will be referred to as a "group" hereinafter. The essence of the room management method is to put all rooms into a fully-occupied state. The fully-occupied state means that all rooms existing in a house are used by one group or multiple groups, as shown in FIG. 17. Increasing the number of groups in order to cause all rooms to be fully occupied leads to complexity of management, an increase in the amount of required memory and the number of registers, and so on. Further, in some cases, there is little advantage in increasing the number of groups. Thus, the number of groups that can exist in one house is set to, for example, two. When two groups exist in a house, a group having more rooms than the other group is called a large group and the other group is called a small group. When groups are stored in a house, consideration is given based on a large group. That is, a house in which a large group is stored is managed based on the number of empty rooms. The management is performed by the empty-room table and the x-empty-room start registers, where x is an integer of 1 to 4. When more small groups reside than a number of small groups which can co-reside with the large group, the house is divided into two, and two small groups are stored in the divided houses, as shown at the bottom of FIG. 17. In this case, a group that owns one room, a group that owns two rooms, and a group that owns three rooms reside. In order to manage these groups, an x'-empty-room start register is used. This is because it is necessary to make an effort to minimize the number of houses managed by the x'-empty-room start register, considering efficient use of the fixed-length-data table. Thus, when x empty rooms are required, houses registered in the x'-empty-room start register are used first. When those houses run out, houses registered in the x-empty-room start registers are used.

FIG. 18 shows a room-management table 741 stored in the room-management table memory 740 and its entry data. The number of entries in the room-management table 741 is equal to the number of houses in the fixed-length-data table and each entry in the room-management table 741 corresponds to each house. A typical format of an entry in the room-management table 741 includes room management data 742 and n pieces of group data 745, as shown in FIG. 18. The description will be given for a case in which n is 2. The room management data 742 includes a house format 744 and a house-data format 743. The data format 743 has 1 bit and selects data stored in the house, i.e., either NVC data or logic comparison data. Since a house is constituted by (1) one group, (2) a large group and a small group, or (3) two groups, the house format 744 is expressed by 2 bits and selectively has one of the three formats. When one group is stored in the house, group 1 data indicates the group and group 2 data is ignored. When a large group and a small group are selected, the group 1 data describes the large group and the group 2 data describes the small group. When two groups are selected, the group 1 data and the group 2 data describe the respective groups. The group data 745 has a table type 746 and a high-order address 748 representing a high-order-table index or address for calling up the house in which the group is stored, as well as a number-of-rooms 747 occupied by the group. When the table type 746 is a pointer table, the high-order address 748 indicates a pointer table index. When the table type 746 is a fixed-length-data table, the high-order address 748 indicates a fixed-length-data table index. When the table type 746 is an empty-room table, the high-order address 748 indicates an empty-room-table index, i.e., a house index. When a large group requires one room, it is necessary for a small room to be moved to another house and for the room that has become empty to be used by the large group. In this case, data in the room-management table is used to obtain and modify parameters of the small group.

Figure 19:
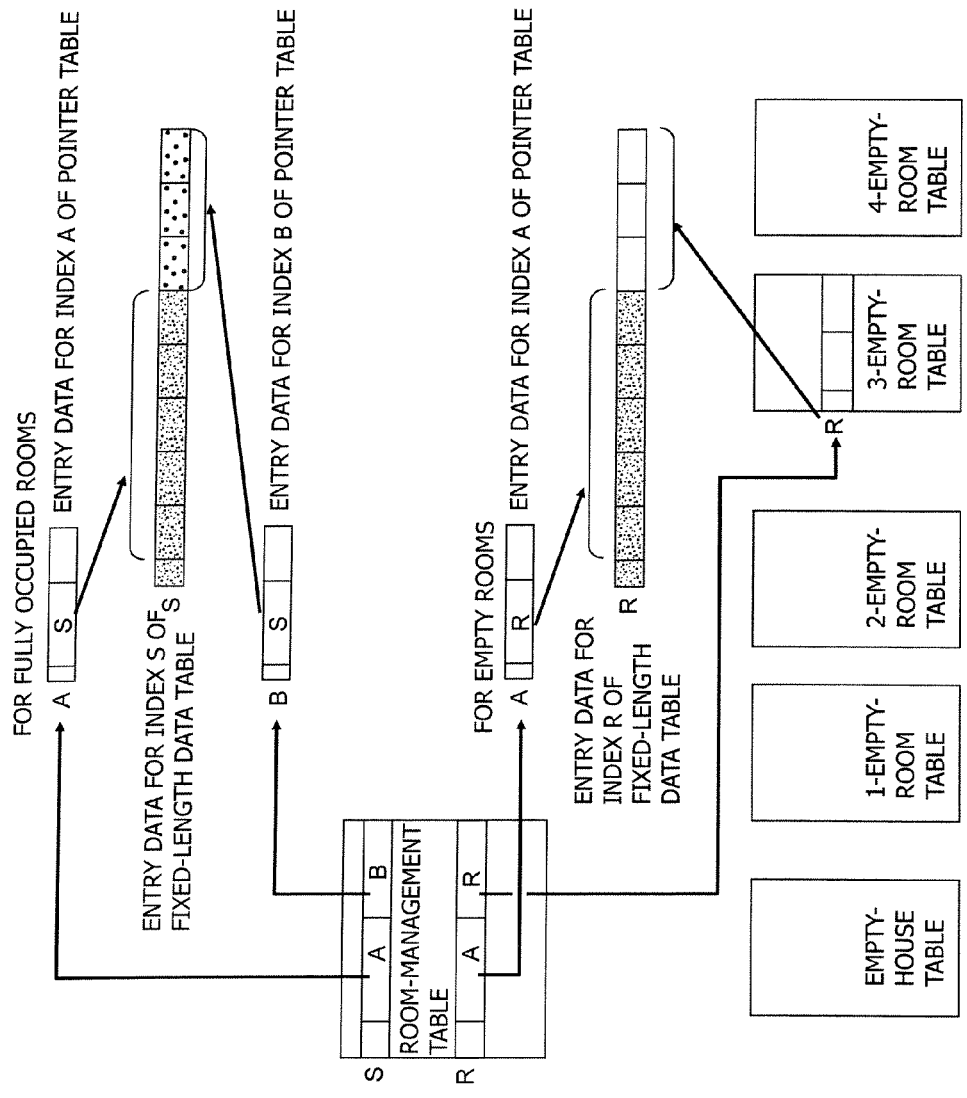
FIG. 19 is a diagram showing the relationships of the tables according to the fixed-length-data searching and managing apparatus in one embodiment of the present invention.

FIG. 19 shows the relationships among a house in the fixed-length-data table, indices of the pointer table, entry data of the room-management table 741, and the empty-room table 721. When the rooms in a house are fully occupied, an index S of the fixed-length-data table is contained in the entry at a pointer-table index A indicating a large group and is also contained in the entry at a pointer-table index S indicating a small group. This relationship is described in the entry data at the index S of the room-management table 741. When there are empty rooms, a house R having empty rooms is contained in the entry at a pointer-table index A indicating a large group and the empty rooms are managed by an x empty-room table, where x indicates the number of empty rooms. In this case, the entry data at the index R of the room-management table 741 has the pointer-table index A describing a large group and an x-empty-room table index R describing an empty room. The x-empty-room table in FIG. 19 means, of empty-room tables, a table linked by the x-empty-room start register.

Figure 20:
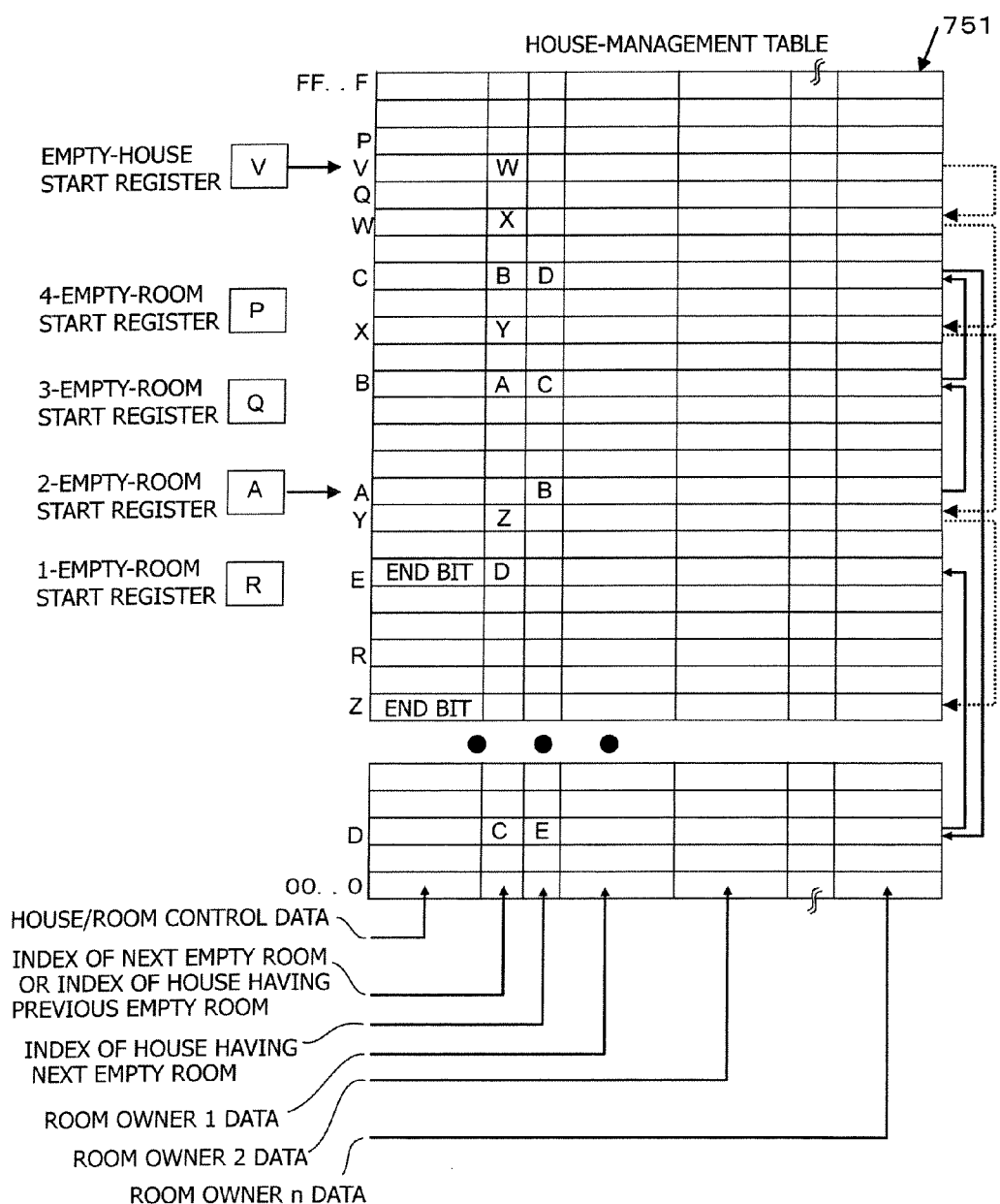
FIG. 20 is a diagram showing a management table in one embodiment of the present invention.

FIG. 20 shows an example of a house management table 751, in which the empty-house table 701, the empty-room table 721, and the room-management table 741 are integrated into one table. Entry data of the house management table 751 is constituted by house/room control data, a next-empty-house index or a previous-empty-room house index, a next-empty-room house index, and n pieces of group data. The house/room control data has an end bit, a data format, and a house format. The house/room control data and the next-empty-house index or previous-empty-room house index can achieve the function of the empty-house table. The house/room control data, the next-empty-house index or previous-empty-room house index, and the next-empty-room house index can achieve the function of the empty-room table. The house/room control data and the n pieces of group data can achieve the function of the room-management table. In this case, an empty-house start register and n-empty-room start registers are required to implement the three functions.

[Structure-Management Table Memory]

Figure 21:
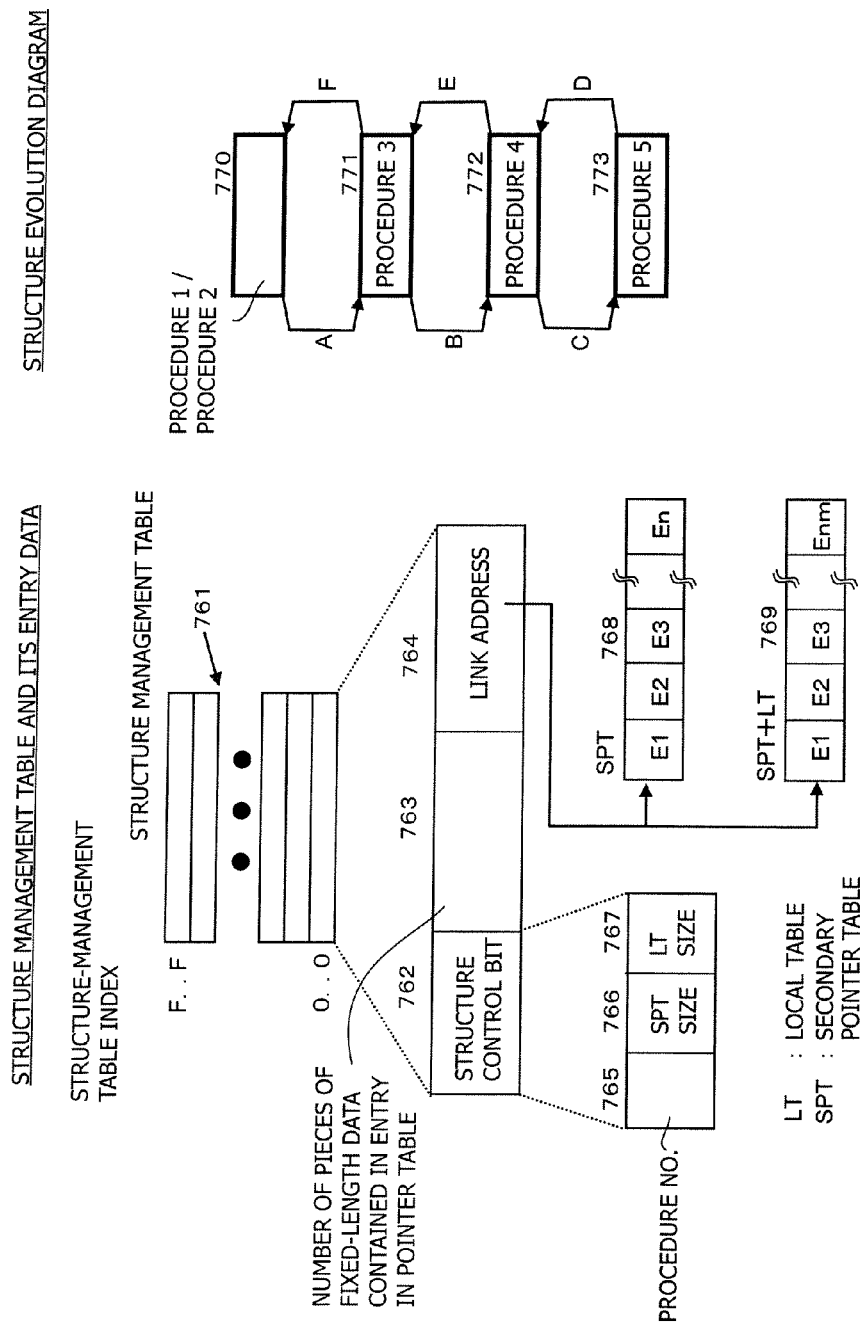
FIG. 21 is a diagram showing a structure-management table stored in a structure-management table memory 760, the contents of the structure-management table, and an evolution of the structure of the fixed-length-data table in one embodiment of the present invention.

FIG. 21 shows a structure-management table 761 stored in the structure-management table memory 760 and its entry data. The number of entries in the structure-management table 761 is equal to the number of entries in the pointer table. Entry data is constituted by a structure control bit, the number of pieces of fixed-data-length data of an entry in the pointer table, and a link address. The search method in which a collection of fixed-length data to be searched is temporarily split into a comparable number of pieces and comparison is performed has been described above in the present invention. However, a collection of fixed-length data is not generally distributed into a number of pieces of data that can be compared at a time. Accordingly, the present invention employs a scheme using a secondary pointer table, a local table, and an NVC-comparison-method-based table and the like to distribute a collection of fixed-length data. In the actual implementation of the present invention, those methods are combined. Before a detailed description for FIG. 21 is given, a search procedure from the viewpoint of a table structure will be described with reference to FIG. 22 and the evolution of the structure will be described with reference to FIG. 21. Subsequently, data needed for the structure evolution will be described with reference to the structure-management table shown in FIG. 21.

Figure 22:
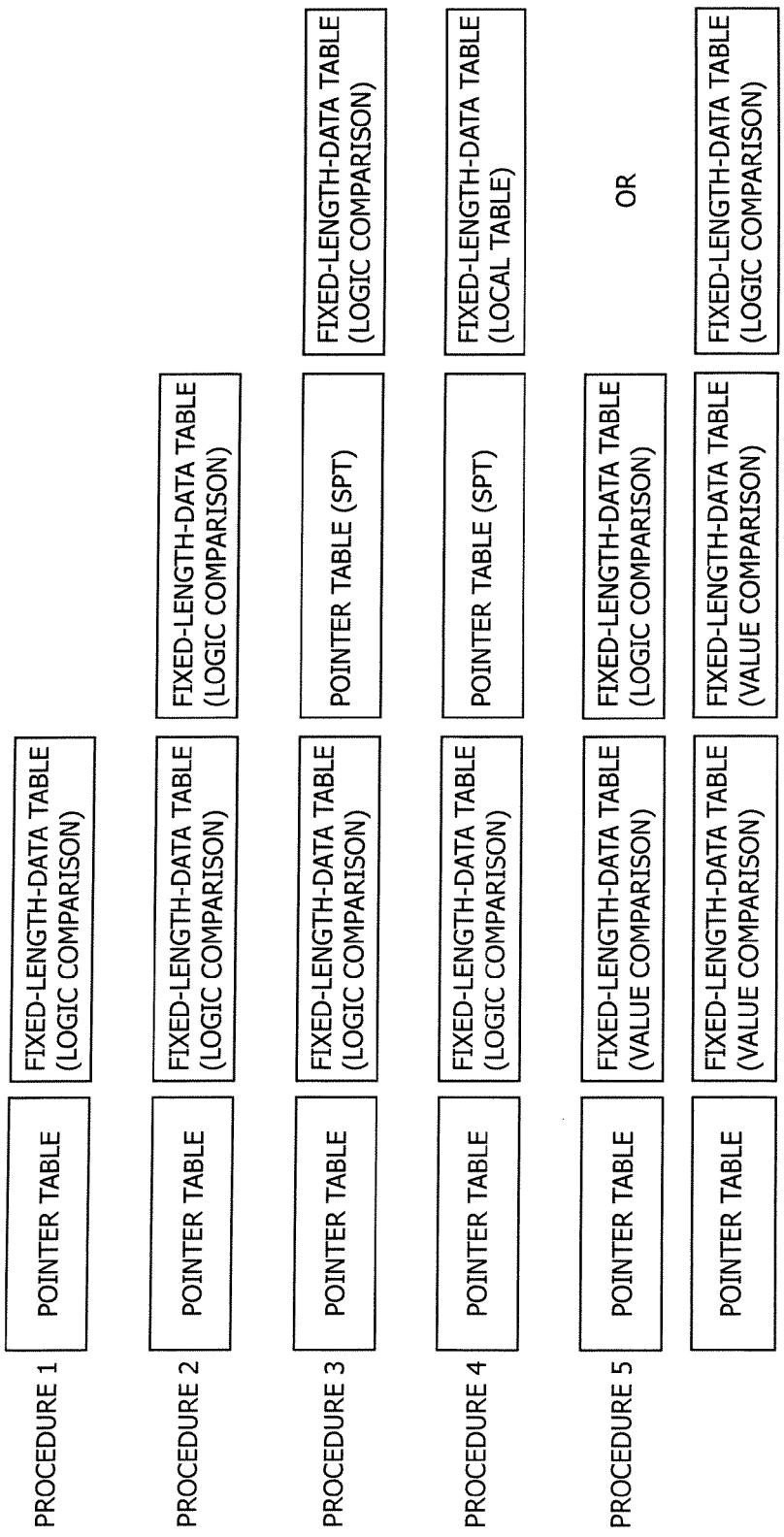
FIG. 22 is a diagram showing an example of a search procedure in one embodiment of the present invention.

FIG. 22 shows an example of search procedures. Although other search procedures can also be created, procedure 1 to procedure 5 will be used to describe searching means. In procedure 1, a pointer table is read, an index of a fixed-value data table is obtained, the fixed-value data table is read, and comparison is performed. This procedure is realized when the number of pieces of comparison data contained in an entry in the pointer table is less than or equal to the number of pieces of fixed-length data that can be stored in one house. Since the number of rooms (the number of pieces of fixed-length data) contained in a house is assumed to be 8 in this description, the number of pieces of fixed-length data contained in an entry in the pointer table is 8 or less in this case. In procedure 1, the fixed-length-data searching apparatus 10 of the present invention can search a majority of pieces of fixed-length data. Procedure 2 is a process in which a fixed-length-data table reading operation and a comparison operation are added to procedure 1. Procedure 2 is used when the number of pieces of comparison data in an entry in the pointer table is 16 or less. No structure change occurs between procedure 1 and procedure 2.

In procedure 3, a secondary pointer table (SPT) is read subsequent to procedure 1, a fixed-length-data table is read using an obtained fixed-length-data table index, and a comparison operation is performed. The reason why the SPT and the fixed-length-data table are read subsequent to the first fixed-length-data-table reading and comparison operations is that, when the search is performed based on the LPM rule, fixed-length data that require comparison prior to the SPT exist due to the relationship between the bit positions of some bits of the entire index 190 which are used for generating the SPT index and masks included in elements of the fixed-length data. The minimum number of pieces of fixed-length data processed in procedure 3 is 17 and the maximum number is $8*n+8$, where n indicates the size of the SPT. When it is assumed that the SPT is indexed with 3 bits, up to 72 pieces of fixed-length data can be processed in procedure 3.

Procedure 4 is a process in which the last fixed-length-data-table reading and comparison operations in procedure 3 are replaced with local-table reading and comparison operations. Procedure 4 is a case in which one entry in the SPT in procedure 3 requests a local table. Even when other SPT entries work in procedure 3, procedure 4 is used if one local table is requested. Thus, the minimum number of pieces of fixed-length data processed in procedure 4 is 17 and the maximum number is $8*n*m+8$, where m indicates the size of the local table. When it is assumed that the local table is indexed with 3 bits, up to 520 pieces of fixed-length data can be processed in procedure 4.

In procedure 5, which is quite different from the means used up to procedure 4, an NVC-structure table is created and search is performed through value comparison. Thus, the maximum number of pieces of fixed-length data processed in procedure 5 is $8*p*p$. In this case, p indicates the number of pieces of NVC-type data that can be stored in one house. Although procedure 5 in FIG. 22 illustrates two structures, a combination of the two structures is used in actual cases. When it is assumed that the number of pieces of NVC-type data is double the number of pieces of fixed-length data, up to 2048 pieces of fixed-length data can generally be processed in procedure 5. In general, the number of rooms stored by a house is set to a number when a collection of fixed-length data in the pointer table is ideally distributed, i.e., to double the average number of pieces of fixed-length data contained in an entry in the pointer table. When the fact that the average number of pieces of fixed-length data contained in an entry in the pointer table is 4 is considered, the number of pieces of fixed-length data handled in procedures 3 and 4 is very large. Thus, cases that require procedures 3 and 4 are assumed to be rare. Procedure 5 is a case beyond procedures 3 and 4, and it is doubtful whether or not it is even required. The use of procedure 5, however, enables a search operation even when the distribution of fixed-length data used is significantly imbalanced.

FIG. 21 shows the evolution of the structure of a table required for each procedure. Evolution A is executed when condition 774 is satisfied, evolution B is executed when condition 775 is satisfied, evolution C is executed when condition 775 is satisfied, evolution D is executed when condition 779 is satisfied, evolution E is executed when condition 778 is satisfied, and evolution F is executed when condition 777 is satisfied. In FIG. 21, the structures of the tables in procedures 1 and 2 are assumed to be the same. In FIG. 21, procedure 1/procedure 2 in a rectangle 770 means the structure of tables searched with procedure 1 or 2. The same applies to the other rectangles.

When the number of pieces of fixed-length data contained in an entry in the pointer table (for simplicity, the number is referred to as the number of pieces of PT fixed-length data) is 16 or less, searching is performed on the entry in procedure 1 or 2. When a fixed-length-data addition command is executed for an entry having 16 pieces of PT fixed-length data, i.e., when the number of pieces of fixed-length data in an entry contained in the pointer table exceeds 16 (condition 774), evolution A is executed and the table structure evolves to a structure for searching with procedure 3.

The table structure of an entry searched in procedure 3 is, first, a pointer table, then, a fixed-length-data table, then, an SPT, and last, a fixed-length-data table. When the rooms in a house in the last fixed-length-data table are fully occupied and a fixed-length-data addition command is executed, i.e., when the number of pieces of fixed-length data contained in an entry in the SPT exceeds 8 (condition 775), the table structure evolves to a structure for searching with procedure 4.

The table structure of an entry searched in procedure 4 is, first, a pointer table, then, a fixed-length-data table, then, an SPT, and last, a local table. When the rooms in a house in an entry in the last local table are fully occupied and a fixed-length-data addition command is executed, i.e., when the number of pieces of fixed-length data contained in an entry in the LT exceeds 8 (condition 776), the table structure evolves to a structure for searching with procedure 5. Procedure 5 has a table structure that is completely different from the table structures in procedures 1 to 4. Thus, a method used for managing the structure is the same as the scheme for managing the table structures in procedures 1 to 4. However, the table structure of an entry searched in procedure 5 is, first, a pointer table, then, an NVC-structure fixed-length-data table, then, an NVC-structure fixed-length-data table, and last, a fixed-length-data table.

When a command for deleting some pieces of fixed-length data is issued for an entry searched with procedure 5 and consequently all entries in the local table have 8 pieces of fixed-length data or less, i.e., when the number of pieces of fixed-length data contained in each entry of the LT is 8 or less (condition 779), the structure of tables searched with procedure 5 evolves to the structure of tables searched in procedure 4. Similarly, when a command for deleting some pieces of fixed-length data is executed for an entry searched in procedure 4 and consequently all entries contained in the SPT have 8 pieces of fixed-length data or less, i.e., when the number of pieces of fixed-length data contained in each entry in the SPT is 8 or less (condition 778), the structure of tables searched in procedure 4 evolves to the structure of tables searched in procedure 3. Lastly, when a command for deleting some pieces of fixed-length data is executed for an entry searched in procedure 3 and consequently all entries in the PT have 16 pieces of fixed-length data or less, i.e., when the number of pieces of fixed-length data contained in each entry in the pointer table is 16 or less (condition 777), the structure of tables searched in procedure 3 evolves to the structure of tables searched with procedure 1/procedure 2. Although conditions 777, 778, and 779 described above are described using sizes of 16 or less, 8 or less, and 8 or less, respectively, the actual values can be specified.

The structure-management table shown in FIG. 21 manages data for causing evolution (FIG. 21) in the structure of tables searched in each procedure. The structure-management table 761 has the same number of entries as that in the pointer table, each entry corresponding to an entry in the pointer table. One entry in the structure-management table 761 is constituted by structure control data 762, a number of pieces of fixed-length-data 763 contained in the entry in the pointer table, and a link address 764. The structure control data 762 is constituted by a procedure number 765, an SPT size 766, and a local-table size 767. When the procedure number 765 indicates procedure 1 or 2, the SPT size 766, the local-table size 767, and the link address are ignored. A majority of entries of the pointer table can fall within the procedures.

When the procedure number 765 indicates procedure 3, the SPT size 766 and the link address are used and the local-table size 767 is ignored. In this case, the link address 764 indicates the position of a table 768 corresponding to the number of pieces of fixed-length data contained in each entry of the SPT. The SPT size 766 is the number of entries, n, in the SPT.

When the procedure number 765 indicates procedure 4 or 5, the SPT size 766, the local-table size 767, and the link address are used. In this case, the link address 764 indicates the position of a table 769 corresponding to the number of pieces of fixed-length data contained in each entry in the SPT and the local table. The SPT size 766 is the number of entries, n, in the SPT. The local-table size 767 is the number of entries, n, in the local table. Thus, the use of the structure-management table 761 allows evolution of the table structure according to the search procedure. What should be noted here is that procedure 5 uses an NVC-structure table to perform searching but the table structure management using the structure-management table is managed in the forms of an SPT and a local table. This method provides coherent structure management, thereby making it possible to efficiently and easily achieve structure management.

[Table Managing Means]

Figure 23:
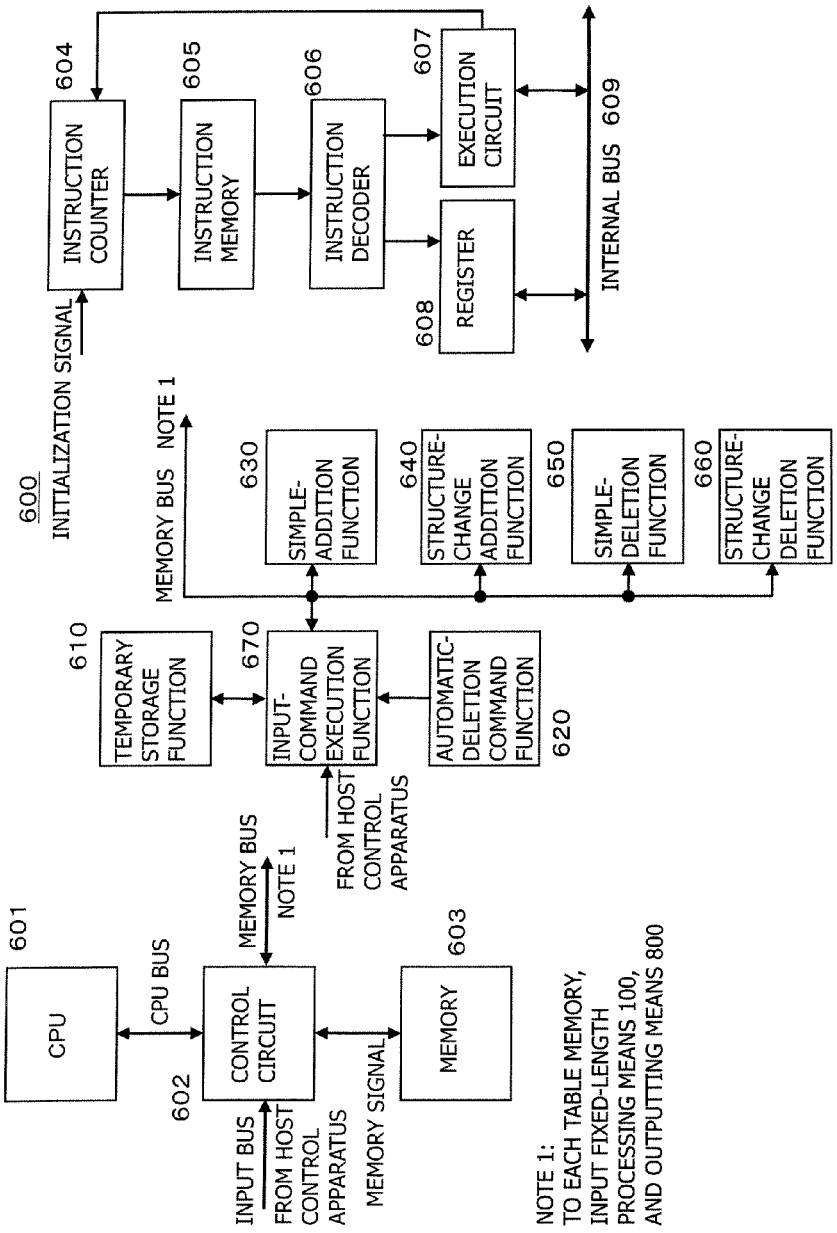
FIG. 23 is a block diagram showing examples of table-management controlling means according to the fixed-length-data searching and managing apparatus, and table-management controlling means and a controller or sequencer according to the fixed-length-data searching and managing apparatus, in one embodiment of the present invention.

FIG. 23 shows one example of the table managing means 600. The table managing means 600 includes a CPU 601; a control circuit 602 having an input/output bus, a CPU bus, a memory bus, and a memory signal; and a memory 603 for storing a program and data for the CPU 601. The table management method described with reference to FIG. 23 is complicated and is thus executed by the CPU 601 shown in FIG. 23. The input bus is used to input commands. The memory bus is used to transfer data between the control circuit 602 and the table memories, between the control circuit 602 and the input-fixed-length-data processing means 100, or between the control circuit 602 and the outputting means 800. In this example, a program that manages the tables simultaneously executes commands, which may complicate the structure.

FIG. 23 shows another example of the table managing means 600. In this example, the function achieved by the CPU 601 in example 1 is segmented and the segmented functions are achieved by a controller or sequencer shown in FIG. 23. In FIG. 23, the table-management controlling means 600 has an input-command execution function 670, a simple-addition function 630, a structure-change addition function 640, a simple-deletion function 650, a structure-change deletion function 660, an automatic-deletion command function 620, and a temporary storage function 610. In response to a command from a host control apparatus, the input-command execution function 670 analyzes and executes the command. During the addition-command execution of the input-command execution function 670, the simple-addition function 630 assists in addition that does not require an evolution of the table structure and the structure-change addition function 640 assists in addition that requires an evolution of the table structure. During the deletion-command execution of the input-command execution function 670, the simple-deletion function 650 assists in deletion that does not require an evolution of the table structure and the structure-change deletion function 660 assist in deletion that requires an evolution of the table structure. The automatic-deletion command function 620 generates an automatic deletion command and sends it to the input-command execution function 670. The input-command execution function 670 temporarily stores data in the temporary storage function 610.

Individual functions shown in FIG. 23, other than the temporary storage function 610, are achieved by a controller or sequencer shown in FIG. 23. In FIG. 23, the controller or sequencer includes an instruction counter 604, an instruction memory 605, an instruction decoder 606, an execution circuit 607, a register 608, and an internal bus 609. The instruction counter 604 is initialized by an initialization signal and is changed by an execution result of the instruction execution circuit 607. The instruction memory 605 stores an instruction that is indexed by the instruction counter 604 and is read. The instruction decoder 606 decodes the read instruction. The execution circuit 607 executes a function controlled and specified by the decoded signal. The register 608 temporarily stores data required for the execution circuit 607. The internal bus 609 transfers data between the execution circuit 607 and the register 608 and other circuits. Since the functions of the controller or sequencer are segmented, implementation of an execution circuit suitable for the functions can minimize the capacity of the instruction memory 605 and simplify the controller or sequencer. The individual functions using the controller or sequencer will be described below.

Figure 24:
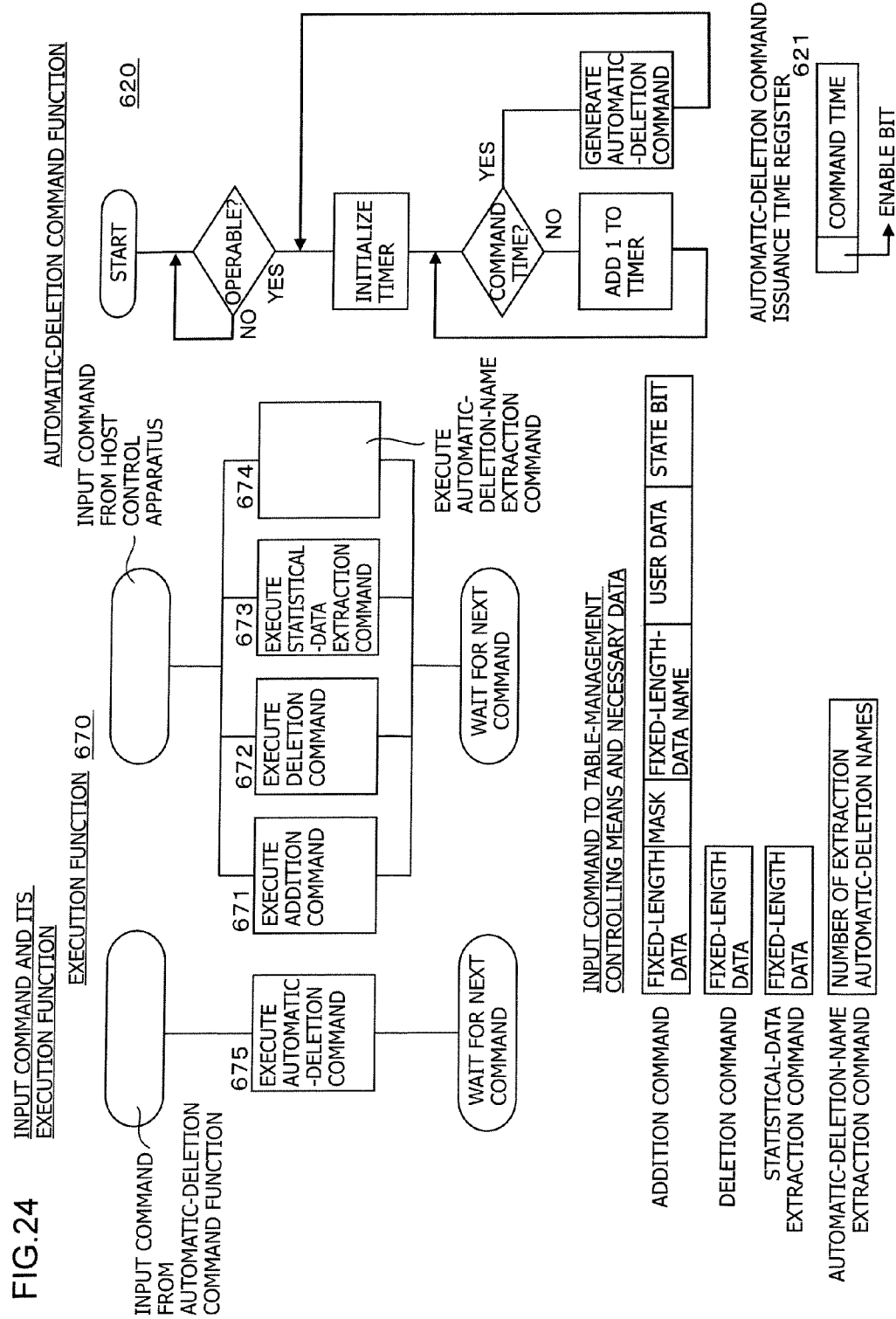
FIG. 24 includes flow charts showing commands for the table-management controlling means, the operation of input-command execution function, and the operation of an automatic-deletion command function in one embodiment of the present invention.

FIG. 24 shows four commands sent from the host control apparatus and received by the input-command execution function 670 (FIG. 23). As shown in FIG. 24, an addition command is input with fixed-length data, a mask, a fixed-length-data name, user data, and a state bit. In this case, the mask may not be sent, depending on the search rule. The sent fixed-length data, mask, and fixed-length-data name are stored in the fixed-length-data table, and the sent user data and initialized statistical data are stored in a user data table. The state bit is used to create element control data. When the state bit indicates that this element is to be resident, the element control data is set to a resident state. Otherwise, the element control data is set to a used state. A deletion command is input with fixed-length data. The sent fixed-length data and data relevant thereto are deleted from the fixed-length-data table and the user data table. A statistical-data extraction command is input with fixed-length data. Statistical data concerning the input fixed-length data is sent to the host control apparatus. Lastly, an automatic-deletion-name extraction command is input with the number of extraction automatic deletion names. The fixed-length-data names of fixed-length data corresponding to the number of extraction automatic deletion names deleted by the automatic deletion function are sent to the host control apparatus. When the number of pieces of fixed-length data deleted by the automatic deletion function is less than or equal to the number of extraction automatic deletion names, the deletion fixed-length-data names corresponding to the number of pieces of deleted fixed-length data are sent.

FIG. 24 shows an example of the input-command execution function 670. The input-command execution function 670 has two controllers or sequencers, one of which processes an input command from the host control apparatus and the other of which processes an input command from the automatic-deletion command function 620. The reason why two controllers or sequencers are provided is that the input command from the host control apparatus and the input command from the automatic-deletion command function 620 can be processed independently. Thus, there is a need for a system in which the two processing operations do not affect each other. This point will be described in connection with the execution of the automatic deletion command. The input command from the host control apparatus is received by the input-command execution function 670 and is decoded. Thereafter, one controller or sequencer that is in charge of the command is operated to perform execution corresponding to the input command. The execution is addition-command execution 671, deletion-command execution 672, statistical-data extraction command execution 673, or automatic-deletion-name-extraction-command execution 674. The execution result is sent to the host control apparatus and the execution corresponding to the input command is finished. Thus, when the controller or sequencer in charge of any of the executions is in operation, another input command from the host control apparatus is not sent. While an input command from the host control apparatus is being waited for or an input command is being executed, an input command from the automatic-deletion command function 620 can be received and executed by the input-command execution function 670. While the controller or sequencer in charge is executing an automatic deletion command, another automatic deletion command is not input to the input-command execution function 670. The reason is that the automatic-deletion command function 620 checks the operable state.

FIG. 24 shows an example of the automatic-deletion command function 620. As is clear from FIG. 24, the automatic-deletion command function 620 is merely a timer circuit. The automatic-deletion command function 620 has an automatic-deletion-command issuance-time register 621, and when the enable bit of the automatic-deletion-command issuance-time register 621 is 1, the automatic-deletion command function 620 issues an automatic deletion command at time intervals specified by the automatic-deletion-command issuance-time register 621. The operability determination shown in FIG. 24 is made after confirming that the automatic deletion command issued by the automatic-deletion command function 620 is already finished and the enable bit of the automatic-deletion-command issuance-time register 621 is 1. In this manner, there is no need for the automatic-deletion command function 620 to be achieved by a controller or sequencer.

Figure 25:
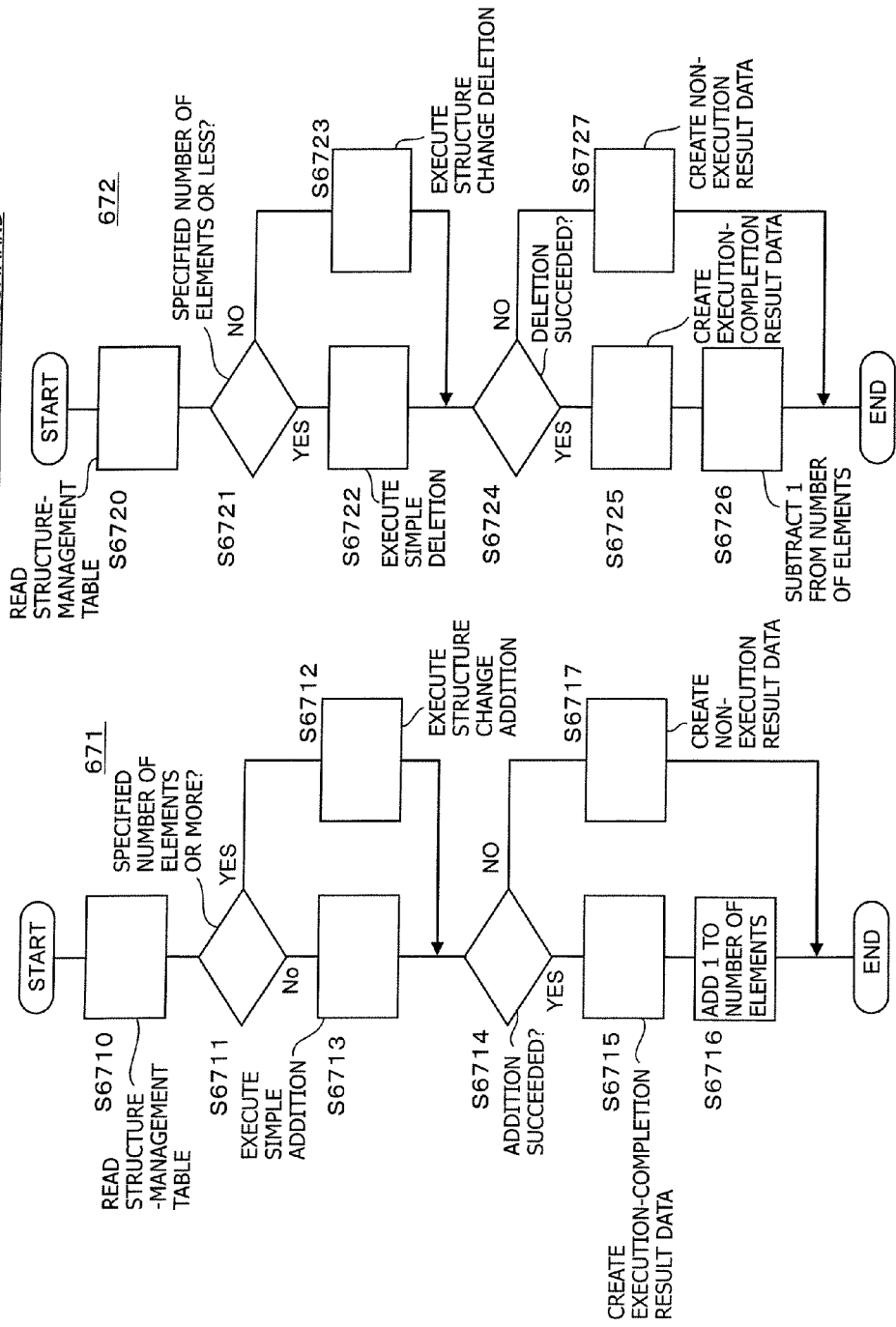
FIG. 25 includes flow charts showing the execution of an addition command and the execution of a deletion command in one embodiment of the present invention.

FIG. 25 shows an example of the operation of the controller or sequencer that executes an addition command from the host control apparatus. When the input-command execution function 670 receives an addition command, the structure-management table 761 is first read, a procedure number is checked, and the number of pieces of fixed-length data in a table which are to be read at the end of the procedure is obtained from the structure-management table 761 (S6710). Subsequently, it is checked whether or not the obtained number meets a condition required for the structure evolution shown in FIG. 21 (S6711). When the structure evolution condition is met, the input-command execution function 670 starts the structure-change addition function 640 and waits until it finishes (S6712). When the structure evolution condition is not met, the input-command execution function 670 starts the simple-addition function 630 and waits until it finishes (S6713). When the execution of the structure-change addition function 640 or the simple-addition function 630 finishes, the input-command execution function 670 receives the execution result and starts again. The obtained execution result is then analyzed (S6714). When the execution result reports that the execution was performed without any problem, execution-completion result data is created and is sent to a management outputting function (S6715). In this case, additionally, 1 is added to the number of corresponding elements in the structure-management table (S6716). When the obtained execution result indicates that the execution could not be performed, non-execution result data is created (S6717) and is sent to the management outputting function. The input-command execution function 670 then waits for a next command from the host control apparatus. Possible examples of cases in which the obtained execution result indicates that the execution could not be performed include a case (1) in which the fixed-length-data table has no location at which fixed-length data is added and a case (2) in which the fixed-length-data table already has fixed-length data to be added. In case (2), a register can be used to achieve a selection capability that allows the mask, fixed-length-data name, and user data, which accompany the fixed-length data to be added, to be replaced with the existing data.

FIG. 25 shows an example of the operation of the controller or sequencer that executes a deletion command from the host control apparatus. When the input-command execution function 670 receives a deletion command, the structure-management table 761 is first read, a procedure number is checked, and the number of pieces of fixed-length data in a table which are to be read at the end of the procedure is obtained from the structure-management table 761 (S6720). It is checked whether the obtained number meets the condition required for the structure evolution shown in FIG. 21 (S6721). When the structure evolution condition is met, the input-command execution function 670 starts the structure-change deletion function 660 and waits until it finishes (S6722). When the structure evolution condition is not met, the input-command execution function 670 starts the simple-deletion function 650 and waits until it finishes (S6723). When the execution of the structure-change deletion function 660 or the simple-deletion function 650 finishes, the input-command execution function 670 receives the execution result and starts again. The obtained execution result is analyzed and, when the execution result reports that the execution was performed without any problem (S6724), execution-completion result data is created and is sent to the management outputting function (S6725). Lastly, 1 is subtracted from the number of corresponding elements in the structure-management table (S6726). When the obtained execution result indicates that the execution could not be performed, non-execution result data is created and is sent to the management outputting function (S6727). The input-command execution function 670 then waits for a next command from the host control apparatus. Examples of cases in which the obtained execution result indicates that the execution cannot be performed include a case (1) in which the fixed-length-data table has no location for changing the structure and a case (2) in which the fixed-length-data table has no fixed-length data to be deleted. In case (1), there is a scheme involving deleting the fixed-length data in the command without the structure change, subtracting 1 from the number of corresponding elements in the structure-management table, and then issuing the report.

Figure 26:
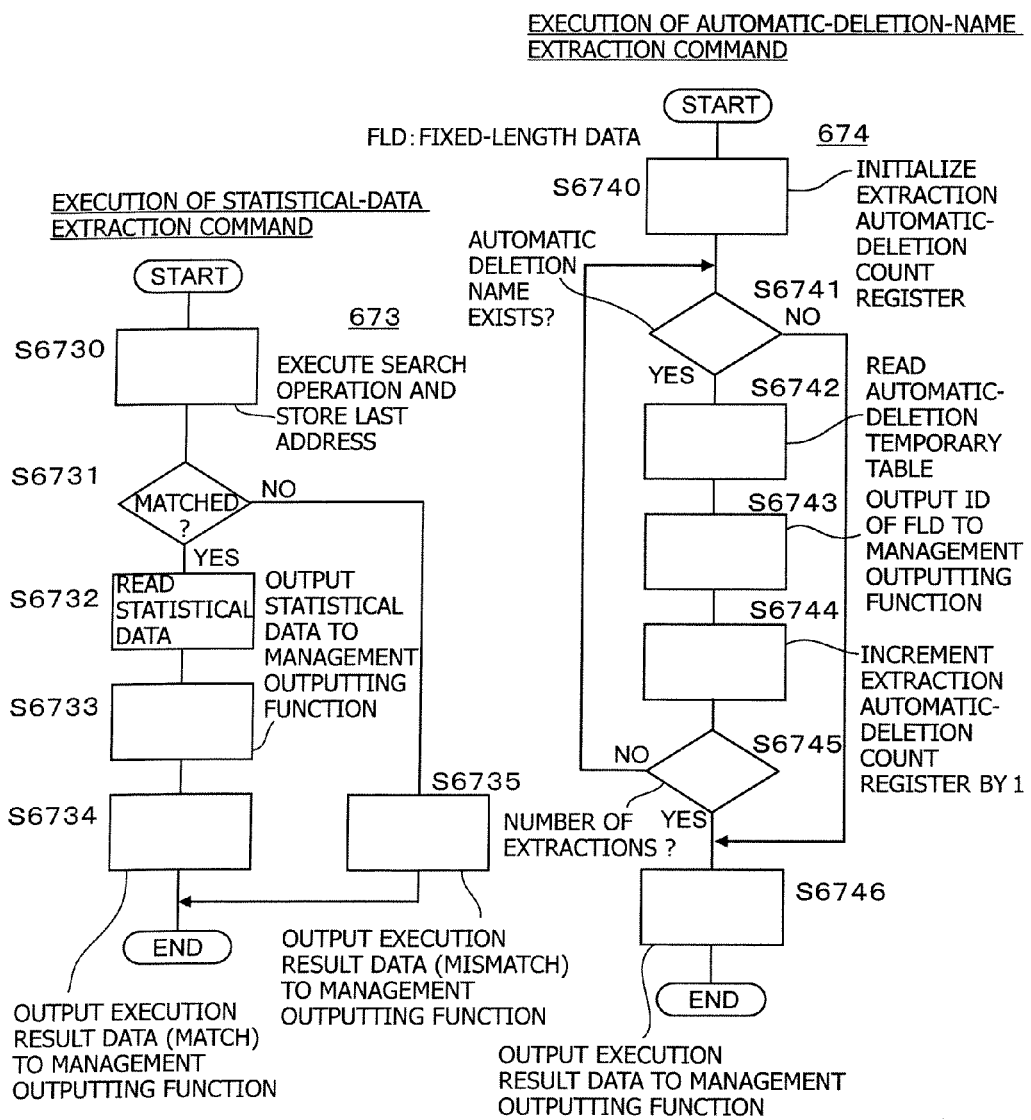
FIG. 26 includes flow charts showing the execution of a statistical-data extraction command and the execution of an automatic-deletion-name extraction command in one embodiment of the present invention.

FIG. 26 shows an example of the operation of the controller or sequencer that executes a statistical-data extraction command from the host control apparatus. When the input-command execution function 670 receives a statistical-data extraction command, fixed-length data in the statistical-data extraction command is first searched for (S6730). The input-command execution function 670 inputs the fixed-length data in the statistical-data extraction command, based on the management data 699 of the input-fixed-length-data processing means 100. An input search number is a search number assigned to the table-management controlling means 600 and zero is input for the input statistical data. A search operation using the search number assigned to the table-management controlling means 600 is finished by the output controlling function 840 when data is stored in the register S 812. At this point, the search result is stored in the register S 812 corresponding to the search number assigned to the table-management controlling means 600 and is read by the input-command execution function 670 via a management search result output 821. Statistical data regarding the fixed-length data in the statistical-data extraction command is stored in the register O of the modifying means 300 and is read by the input-command execution function 670 via statistical data 337 (S6732). The read statistical data is output to the management outputting function in the outputting means 800 (S6733). Based on the read search result, an execution result is created. When the search result indicates a match, the statistical data and the execution result, together with the fixed-length-data name, are output to the management outputting function of the outputting means 800 (S6734). When the search result does not indicate a match, only a mismatch execution result is output to the management outputting function of the outputting means 800 (S6735).

FIG. 26 shows an example of the operation of the controller or sequencer that executes an automatic-deletion-name extraction command from the host control apparatus. When the input-command execution function 670 receives an automatic-deletion-name extraction command, an extraction automatic-deletion count register is first initialized, as shown in FIG. 26. As a result of the execution of the automatic deletion command, the fixed-length-data name of deleted fixed-length data is stored in the temporary storage function 610 of the table managing means 600. The automatic-deletion-name extraction command causes a specified number of stored fixed-length-data names to be read and causes the read fixed-length-data names to be output to the management outputting function. Thus, as shown in FIG. 26, it is checked whether or not automatically deleted fixed-length-data names are stored in the temporary storage function 610 (S6741). If there are any, one of the fixed-length-data names stored in the temporary storage function 610 is obtained (S6742) and is output the management outputting function (S6743). Subsequently, the extraction automatic-deletion count register is incremented by 1 (S6744). After the increment, it is checked whether or not the extraction automatic-deletion count register indicates the same number as the number of extractions in the automatic-deletion-name extraction command (S6745). When the extraction automatic-deletion count register indicates a smaller number than the number of extractions, it is again checked whether any automatically deleted fixed-length-data name is stored in the temporary storage function 610. This operation is continued until the extraction automatic-deletion count register indicates the same number as the number of extractions. When the extraction automatic-deletion count register reaches the number of extractions, execution result data is output to the management outputting function together with the number of extractions (S6746).

When the automatically deleted fixed-length-data names stored in the temporary storage function 610 run out before the extraction automatic-deletion count register reaches the number of extractions, execution result data is output to the management outputting function together with the number of extractions indicated by the extraction automatic-deletion count register (S6746).

FIG. 27 shows an example of the operation of the controller or sequencer that executes an automatic deletion command from the automatic-deletion command function. When the input-command execution function 670 receives an automatic deletion command, as shown in FIG. 27, a fixed-length-data address register is first initialized (S6750). The automatic deletion command is executed with reference to the element control data for the fixed-length-data table shown in FIG. 8.

FIG. 27 shows details of the element control data. The element control data is constituted by an element state and a position change. The element state holds one of four states. The four states are (1) an empty-room state, (2) a resident state, (3) a deletion state, and (4) a used state. When fixed-length data is initialized, the element state is set to the empty-room state. When fixed-length data having a resident state bit is added to a fixed-length-data-table element in the empty-room state, the element control data for the element is changed to the resident state. Fixed-length data in the resident state is not included in targets to be deleted by the automatic deletion command. That is, fixed-length data in the resident state is not deleted unless the deletion command from the host control apparatus is executed. When fixed-length data having a non-resident state bit is added to a fixed-length-data-table element in the empty-room state, the control data for the element is put into the deletion state and the position change is set. Fixed-length data in the deletion state is included in targets to be deleted by the automatic deletion command. That is, fixed-length data in the deletion state is deleted by the execution of the deletion command and the automatic deletion command from the host control apparatus. (The deletion state in which the position change is set is excluded from targets of the automatic deletion command. The position change will be described below.) In a search operation, when a fixed-length-data-table element in the deletion state matches fixed-length data to be searched for, the state of the fixed-length-data-table element in the deletion state shifts to the used state. The aim of the automatic deletion command is to delete fixed-length data that is not used in a certain period of time. The automatic deletion command is issued periodically. During the period, fixed-length data that is not used, i.e., fixed-length data in the deletion state, is deleted. The state of a fixed-length-data-table element in the used state is changed to the deletion state by the execution of the automatic deletion command. When a next automatic deletion command is issued, it is checked whether or not the element is used, and when not used, it is deleted.

In FIG. 27, regarding the position change, when the addition command or deletion command from the host control apparatus or the automatic deletion command from the automatic-deletion command function is executed, the position change of fixed-length data that moves in the fixed-length-data table is set, so that the fixed-length data is excluded from targets of the automatic deletion command. When the automatic deletion command is executed, the fixed-length data for which the position change is set is not deleted and the position change is reset so that the fixed-length data becomes a target to be executed by a next automatic deletion command.

In FIG. 27, a house in the fixed-length-data table is read using the fixed-length-data address register as an index (S6751). The element control data of fixed-length data in the read house is checked (S6752). When the element state is the empty-room state or resident state, next fixed-length data is checked. When the element state is the deletion state and the position change is not set (when there is no access), the fixed-length data is deleted (S6753). The deletion involves the same operation as the deletion command to delete fixed-length data. The fixed-length-data name of the deleted fixed-length data is stored in the temporary storage function of the table-management controlling means 600 (S6754). When the element state is the deletion state and the position change is set (when there is access), the fixed-length data is not deleted and the position change is reset. This task is performed on all fixed-length data in the read house. When all the fixed-length data in the read house are checked (S6755), the fixed-length-data address register is incremented by 1 (S6756). Thereafter, a task for reading a house in the fixed-length-data table by using the fixed-length-data address register as an index is performed. When such a task is performed on all houses in the fixed-length-data table (S6757), the execution of the automatic deletion command is finished.

Figure 28:
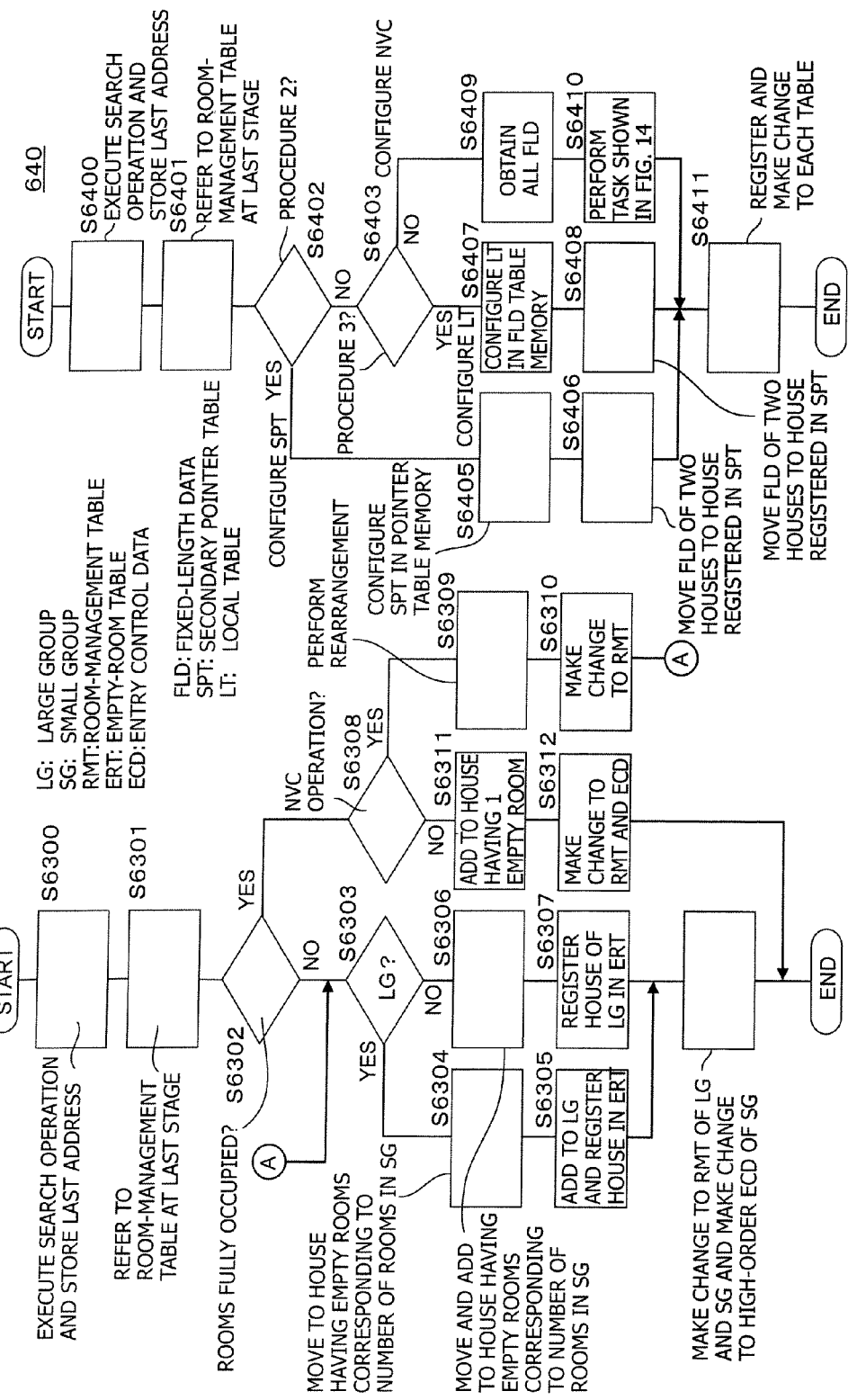
FIG. 28 includes flow charts showing a simple-addition function and a structure-change addition function in one embodiment of the present invention.

FIG. 28 shows a part of an example of the operation of the controller or sequencer that executes, in response to a request from the input-command execution function 670, an addition function that does not require a structure change (the simple-addition function 630). If all cases of the simple-addition function 630 were illustrated in FIG. 28, the illustration would become complicated; therefore, details of the function will be explained by way of the description below. When the execution of a simple addition command is accepted from the input-command execution function 670, fixed-length data in the addition command is first searched for (S6300). The simple-addition function 630 inputs the fixed-length data in the addition command, based on the management data 699 of the input-fixed-length-data processing means 100. An input search number is a search number assigned to the table-management controlling means 600 and zero is input for the input statistical data. A search operation using the search number assigned to the table-management controlling means 600 is finished by the output controlling function 840 when data is stored in the register S 812. When an index for the search number assigned to the table-management controlling means 600 is generated in the pointer processing means 200 shown in FIG. 7, the index is stored in the register P 217. During the search, the register P 217 is updated every time the pointer processing means 200 generates a table index 252. Thus, when the search is finished, the register P 217 holds the last index obtained when the fixed-length-data table is read. In addition, a search result, fixed-length-data name, and user data regarding the fixed-length data in the addition command are stored in the register S 812 corresponding to the search number assigned to the table-management controlling means 600 and are read by the simple-addition function 630. Although a description is omitted below, fixed-length data to be added are assumed to be arranged in order of value. The fixed-length data name and the mask, other than the fixed-length data to be added, and the element control data created from the state bit are stored in the fixed-length-data table, and user data and initialized statistical data are stored in the data table, at the same time when the fixed-length data are stored.

Although not illustrated in FIG. 28, when a mismatch search result is obtained, the execution of the simple-addition function 630 is continued. When a match result is obtained, two options are possible. One is to suspend the execution of the simple-addition function 630 and report the result to the host control apparatus. The other is to continue the execution of the simple-addition function 630 and perform an update by replacing various data relevant to fixed-length data to which addition is performed with data in the addition command. These options are specified by a register.

The room-management table 741 is referred to by using the index held by the register P 217 of the pointer processing means 200 (S6301), and it is checked whether the rooms in a house are fully occupied (whether eight rooms are occupied by a single group). When the rooms are not fully occupied, the house is constituted by two groups. At this point, when the situation is classified using the occupation state of the house and a group to which fixed-length data is added, there are the following possible cases: case (1) in which a large group and a small group co-reside in a house and fixed-length data is added to the large group; case (2) in which a large group and a small group co-reside in a house and fixed-length data is added to the small group; case (3) in which a large group and a small group can co-reside in a house but only a large group exists and fixed-length data is added thereto; case (4) in which two groups having the same size co-reside in a house and fixed-length data is added to one of the groups; case (5) in which two groups having the same size can co-reside in a house but only one group exists and fixed-length data is added to that group; and case (6) in which there is no group to which fixed-length data is added. While cases (1) and (2) have been illustrated in FIG. 28, cases (1) to (6) will be described below.

(1) When a large group and a small group co-reside in a house (P) and fixed-length data is to be added to the large group, the small group is moved and fixed-length data to be added and its relevant data are stored in empty rooms. As to the order of processes, the index of a house (Q) having empty rooms corresponding to the number of rooms owned by the small group is obtained from the empty-room table 721. The small group is moved to the house (Q) (S6304). Parameters relevant to the small group are then copied to the room-management table 741 for the house (Q) and a high-order address of the room-management table 741 is used to write the index of the house (Q) to the entry control data in a high-order table. Next, the fixed-length data in the addition command and data relevant to the fixed-length data are stored in the house (P) of the large group. When the rooms in the house are fully occupied as a result of the addition, changes are made to parameters of the room-management table 741 for the house and the structure-management table 761. When the rooms in the house are not fully occupied, in addition to the change, the house (P) is registered in the ("the number of small-group rooms"–1)-empty-room table 721 (S6305).

(2) When a large group and a small group co-reside in a house (P) and fixed-length data is to be added to the small group, a house (Q) having one more empty room than the number of rooms in the small group is obtained from the empty-room table 721, the small group is moved to the house (Q), and fixed-length data to be added and its relevant data are stored in the house (Q) (S6306). Parameters relevant to the small group are then copied to the room-management table 741 for the house (Q) and a high-order address in the room-management table 741 is used to modify the structure-management table 761 and the entry control data in a high-order table. Next, the house (P) of the large group is registered in the empty-room table 721 corresponding to the number of rooms in the small group, an address registered in the empty-room table 721 is written at a high-order address in the room-management table for the house (P), and changes are made to parameters corresponding thereto (S6307).

(3) When a large group and a small group can co-reside in a house but only a large group exists and fixed-length data is added thereto, fixed-length data in the addition command and data relevant to the fixed-length data are stored in the house of the large group. This house is deleted from the empty-room table 721 corresponding to the number of small-group rooms that were empty. When the rooms in the house are fully occupied as a result of the addition, changes are made to parameters of the room-management table 741 for the house and the structure-management table 761. When the rooms in the house are not fully occupied, in addition to the change, the house is registered in the ("the number of small-group rooms"–1)-empty-room table 721.

(4) When two groups (called A and B) having the same size co-reside in a house (P), fixed-length data is to be added to the group A, and the number of rooms in the group is 1, 2, or 3, a house (Q) having one more empty room than the number of rooms in the group A is obtained from the empty-room table 721. The group A is then moved, and fixed-length data to be added and its relevant data are stored in the house. Parameters relevant to the group A in the room-management table 741 for the house (Q) are then copied, and a high-order address in the room-management table 741 is used to write the index of the house (Q) to the entry control data in a high-order table and to modify the structure-management table 761. Next, the house (P) is registered in the empty-room table 721 corresponding to the number of rooms in the group B, and the parameters of the group A in the room-management table 741 for the house (P) of the group B are changed to an address in the empty-room table 721 in which the house (P) is registered. When the number of rooms in the group is 4, an empty house (R) is obtained from the empty-house table 701, the group A is moved, and fixed-length data to be added and its relevant data are stored in the house. Parameters relevant to the group A are then copied to the room-management table 741 for the new house (R), and a high-order address in the room-management table 741 is used to modify the structure-management table 761 and the entry control data in a high-order table. Next, the house (P) is registered in the empty-room table 721 corresponding to the number of rooms in the group B, and the parameters of the group B in the room-management table 741 for the house (P) of the group B are changed to an address in the empty-room table 721 in which the house (P) is registered.

(5) When two groups (called A and B) having the same size can co-reside in a house but only one group (the group A) exists and fixed-length data is to be added thereto, fixed-length data in the addition command and data relevant to the fixed-length data are stored in the house of the group A. This house is deleted from the empty-room table 721 corresponding to the number of group (B) rooms that were empty. The house is registered in the ("the number of group B rooms that were empty"+1)-empty-room table 721. The address in the empty-room table 721 in which the house is registered is written to a high-order address in the empty rooms in the room-management table 741 for the house, and changes are made to parameters of the structure-management table 761.

(6) When there is no group for addition, a house having one empty room is obtained from the 1-empty-room table 721. Fixed-length data to be added is added to the house, the house is registered in the pointer table, and an index of the pointer table is registered in an empty room in the room-management table 741 for the house. Lastly, changes are made to parameters of the structure-management table 761.

In FIG. 28, when the rooms in a house are fully occupied (eight rooms are occupied by a single group), processing is performed in two cases. One is the case of an NVC format and the other is the case of a non-NVC format (S6308). In the case of an NVC format, rearrangement is performed (S6309) and fixed-length data in the addition command and data relevant to the fixed-length data are stored. As a result of the rearrangement, one of the addition operations (1) to (5) described above is performed (S6310) on a house to which fixed-length data is to be added. In the case of a non-NVC format, a house (Q) having one empty room is obtained from the empty-room table 721, value comparison with eight pieces of fixed-length data in the house (P) is performed, and the nine pieces of fixed-length data are stored in the house (P) and the house (Q) (S6311). The entry control data for the house (P) is modified so that it is linked to the house (Q) (S6312). The entry control data for the house (Q) is modified and the index of the house (P) is written to the room-management table 741 for the house (Q). Lastly, the structure-management table 761 is modified.

FIG. 28 shows a part of an example of the operation of the controller or sequencer that executes, in response to a request from the input-command execution function 670, an addition function that requires a structure change (the structure-change addition function 640). If all cases of the structure-change addition function 640 were illustrated in FIG. 28, the illustration would become complicated; therefore, details of the function will be explained by way of the description below, as in the description of the simple-addition function 630. When the execution of a structure-change addition command is accepted from the input-command execution function 670, fixed-length data in the addition command is first searched for (S6400). The structure-change addition function 640 inputs the fixed-length data in the addition command, to the management data 699 of the input-fixed-length-data processing means 100. An input search number is a search number assigned to the table-management controlling means 600 and zero is input for the input statistical data. A search operation using the search number assigned to the table-management controlling means 600 is finished by the output controlling function 840 when data is stored in the register S 812. When an index for the search number assigned to the table-management controlling means 600 is generated in the pointer processing means 200 shown in FIG. 7, the index is stored in the register P 217. During the search, the register P 217 is updated every time the pointer processing means 200 generates a table index 252. Thus, when the search is finished, the register P 217 holds the last index obtained when the fixed-length-data table is read. In addition, a search result, fixed-length-data name, and user data regarding the fixed-length data in the addition command are stored in the register S 812 corresponding to the search number assigned to the table-management controlling means 600 and are read by the structure-change addition function 640.

Although not illustrated in FIG. 28, when a mismatch search result is obtained, the execution of the structure-change addition function 640 is continued. When a match result is obtained, two options are possible. One is to suspend the execution of the structure-change addition function 640 and report the result to the host control apparatus. The other is to continue the execution of the structure-change addition function 640 and perform an update by replacing various data relevant to fixed-length data to be added with data in the addition command. These options are specified by a register.

The room-management table 741 is referred to by using the index held by the register P 217 of the pointer processing means 200, and the house format is checked as to whether the house is occupied by one group (S6401). Then, a high-order address is obtained. Next, the structure-management table 761 is referred to, and a procedure number and a structure-change reason are checked (S6402 and S6403). In the case of procedure 2, an SPT is configured. In the case of procedure 3, a local table is configured. In the case of procedure 4, the structure is changed to an NVC-format table structure.

When the procedure number in the structure-management table 761 is 2, 16 pieces of fixed-length data stored in two houses (P and Q) in the fixed-length-data table and fixed-length data to be added are rearranged by configuring an SPT (S6405). In this process, first, segmentation for 17 pieces of fixed-length data is performed. Since this description is given assuming that the size of the SPT is 8, segmentation into 9 segments (segment 0 to segment 8) is performed. Data used for the segmentation is 3 bits from bits used by a pointer-table index out of an entire index. For example, when the pointer-table index is 31 bits to 16 bits of an entire index (e.g., 32 bits), the SPT index is bit 15, bit 14, and bit 13. These are expressed by (bit 15, bit 14, bit 13). In this case, segment 0 is expressed by (000), segment 1 is expressed by (001), and segment 7 is similarly expressed by (111). Of 17 pieces of fixed-length data, segment 8 handles fixed-length data having a mask length of 17 bits (32 bits–15 bits) or 18 bits (32 bits–14 bits). After the segmentation, a house (R) having empty rooms corresponding to the number of pieces of fixed-length data belonging to segment 8 is obtained from the empty-room table 721, and the fixed-length data belonging to segment 8 are moved to the house (R) (S6406). The operation in this case is the same as that described for the simple-addition function 630. The index of the house (R) is written to the entry data in the pointer table.

A table, i.e., an SPT, having eight entries is configured in the pointer table memory 500 and is initialized. The memory address of index (000) of the SPT, i.e., the base address, and parameters of the SPT are written to the entry control data for the house (R).

A house (S) having empty rooms corresponding to the number of pieces of fixed-length data belonging to segment 0 is obtained from the empty-room table 721, and the fixed-length data belonging to segment 0 are moved to the house (S). The operation in this case is the same as that described for the simple-addition function 630. The index of the house (S), the next process 101, and the memory control data are written to the entry data in the SPT. When the number of empty rooms corresponding to the fixed-length data is 4 or less, data for activating only a memory array in which the empty rooms are stored is written to the memory control data. Lastly, the next process 000 of the entry control data for the house (S) is written. This operation is performed on segment 1 to segment 7. Changes are made to the structure-management table. The house P and the house Q are then registered in the empty-house table 701, which completes the structure change to the SPT (S6411).

When the procedure number in the structure-management table 761 is 3 (S6403), eight pieces of fixed-length data stored in one house (P) in the fixed-length-data table and fixed-length data to be added are rearranged by configuring a local table (S6407). This is because these nine pieces of fixed-length data cannot be stored in one entry in an SPT. In this process, first, segmentation for nine pieces of fixed-length data is performed. Since this description is given assuming that the size of the SPT is 8, segmentation into 8 segments (segment 0 to segment 7) is performed. Data used for the segmentation is 3 bits from bits used by the pointer-table and SPT indices out of an entire index. For example, when the pointer-table index is 31 bits to 16 bits of an entire index (e.g., 32 bits), the SPT index is bit 15, bit 14, and bit 13. Thus, the local-table index is bit 12, bit 11, and bit 10. These are expressed by (bit 12, bit 11, bit 10). In this case, segment 0 is expressed by (000), segment 1 is expressed by (001), and segment 7 is similarly expressed by (111).

A local table having eight entries is configured in the fixed-length-data table memory 560 and is initialized. The memory address of index (000) of the local table, i.e., the base address, and parameters of the local table are written to the entry control data for entries in an SPT indicated by a high-order address in the room-management table 741 for the house (P). Some houses in the fixed-length-data table are reserved in the local table.

Fixed-length data belonging to segment 0 are moved to a house in the fixed-length-data table, the house being indexed by the base address (S6408). The operation in this case is the same as that described for the simple-addition function 630. Setting of an LT bit in the room-management table 741 for the house prevents the addition command and deletion command from moving the group from the house. Lastly, the next process 000 of the entry control data for the house is written. This task is performed on segment 1 to segment 7. Changes are made to the structure-management table. The house P is then registered in the empty-house table 701, which completes the structure change to the local table (S6411).

When the procedure number in the structure-management table 761 is 4, all fixed-length data belonging to a pointer-table entry to which the fixed-length data to be added belongs, and the fixed-length data to be added become targets of the structure change (S6409). Fixed-length data owned by every house are arranged, in order of value, in the groups in the house. Thus, it is assumed that SPT and local-table fixed-length data belonging to a pointer-table entry to which the fixed-length data to be added belongs are arranged in order of value. For example, when index 0 of an SPT that does not include a local table is expressed by (000) and index 1 of an SPT that includes a local table (its index is 0) is expressed by (001, 000), the fixed-length data are expressed by (111), (110), (101), (100), (011), (010), (001, 111), (001, 110), (001, 101), (001, 100), (001, 011), (001, 010), (001, 001), (001, 000), and (000) in decreasing order of value. This sequence is interrupted by the fixed-length data of the house (P) in the fixed-length-data table that is read subsequent to the pointer table.

A method for comparing the value of fixed-length data arranged in order of value is described. With the above example, when the pointer-table index is 31 bits to 16 bits of an entire index (e.g., 32 bits), the SPT index is bit 15, bit 14, and bit 13 and the local-table index is bit 12, bit 11, and bit 11. These are merely used for classification into tables. Thus, even when value comparison is performed on bit 15 to bit 0 of an entire index, there is no problem with the above description. In addition, since this is value comparison using a mask, comparison of masked bits is meaningless. That is, if the mask is 23, bit 31 to bit 8 of an entire index are compared and bit 7 to bit 0 are meaningless. Thus, masked bits are handled as 0. An element with an NVC format in fixed-length-data table is constituted by an extracted index (bit 15 to bit 0 of an entire index) and a fixed-length-data table index to be referred to as a result of value comparison with the extracted index (see FIG. 8). In procedure 5, up to two NVC-format houses can be provided using the fixed-length-data table. Up to eight pieces of fixed-length data can be stored in one house, but up to 16 pieces of NVC-format data can be stored in one house. Thus, up to 256 pieces of NVC-format data can be stored in two houses. This property is used for the structure change to the NVC format.

When the SPT and one local table are assumed to exist in the example described above, the number of indices is 15. Thus, fixed-length data to be added and eight pieces of fixed-length data of a house to which the fixed-length data is added are split into two and a total of 16 houses are provided. Thereafter, task 3, task 4, and task 5 illustrated in FIG. 9 are performed (S6411). A house (P) is obtained from the empty-house table 701. Bit 15 to bit 0 of fixed-length data having a minimum value in each house are extracted, and they are stored in the house (P) in decreasing order of value. The indexes of houses corresponding to those fixed-length data are stored as fixed-length-data table indices for respective extraction indices. The index of the house (P) is stored in the entry data in the pointer table and the NVC format is set for the next process. The structure-management table is then modified. LT bits in the room-management table 741 for the houses included in the local table are not modified. After the processing described above, the structure change is completed.

A description is given of a method for splitting the fixed-length data to be added and eight pieces of fixed-length data in a house (R) to which addition is performed into two portions. It is assumed that the fixed-length data to be added corresponds, in decreasing order of value, to the m-th one of the eight pieces of fixed-length data to which addition is performed, where m is a value of 0 to 8. "0" indicates that fixed-length data to be added is largest and "8" indicates that fixed-length data to be added is smallest. When m is 1, 2, or 3, a house (S) having m+1 empty rooms is obtained from the empty-room table 721 and m pieces of fixed-length data and the fixed-length data to be added are moved in decreasing order of value. The house (R) is registered in the m-empty-room table and its address is written to the room-management table for the house (R). For each case, a pointer-table index is written to a high-order address in the room-management table for the house. When m is a value other than 1, 2, or 3, a house (S) having m empty rooms is obtained from the empty-room table 721 and (8-m) pieces of fixed-length data are moved in increasing order of value. The fixed-length data to be added is stored in the house (R) and is registered in the (7-m)-empty-room table, and its address is written to the room-management table for the house (R). For each case, a pointer-table index is written to a high-order address in the room-management table for the house.

Although the structure change to the NVC-format table has been described in the context of an example of one local table, the described scheme can be used even when multiple local tables exist. When all entries in an SPT have local tables, 64 houses exist. Although the above description has been given using one NVC-format house, up to two houses can be provided and thus 256 houses can be processed. That is, in the above description of the scheme for the structure change from procedure 4 to procedure 5, even when any table structure is used in procedure 4, it can be changed to the NVC-format table structure in procedure 5.

Figure 29:
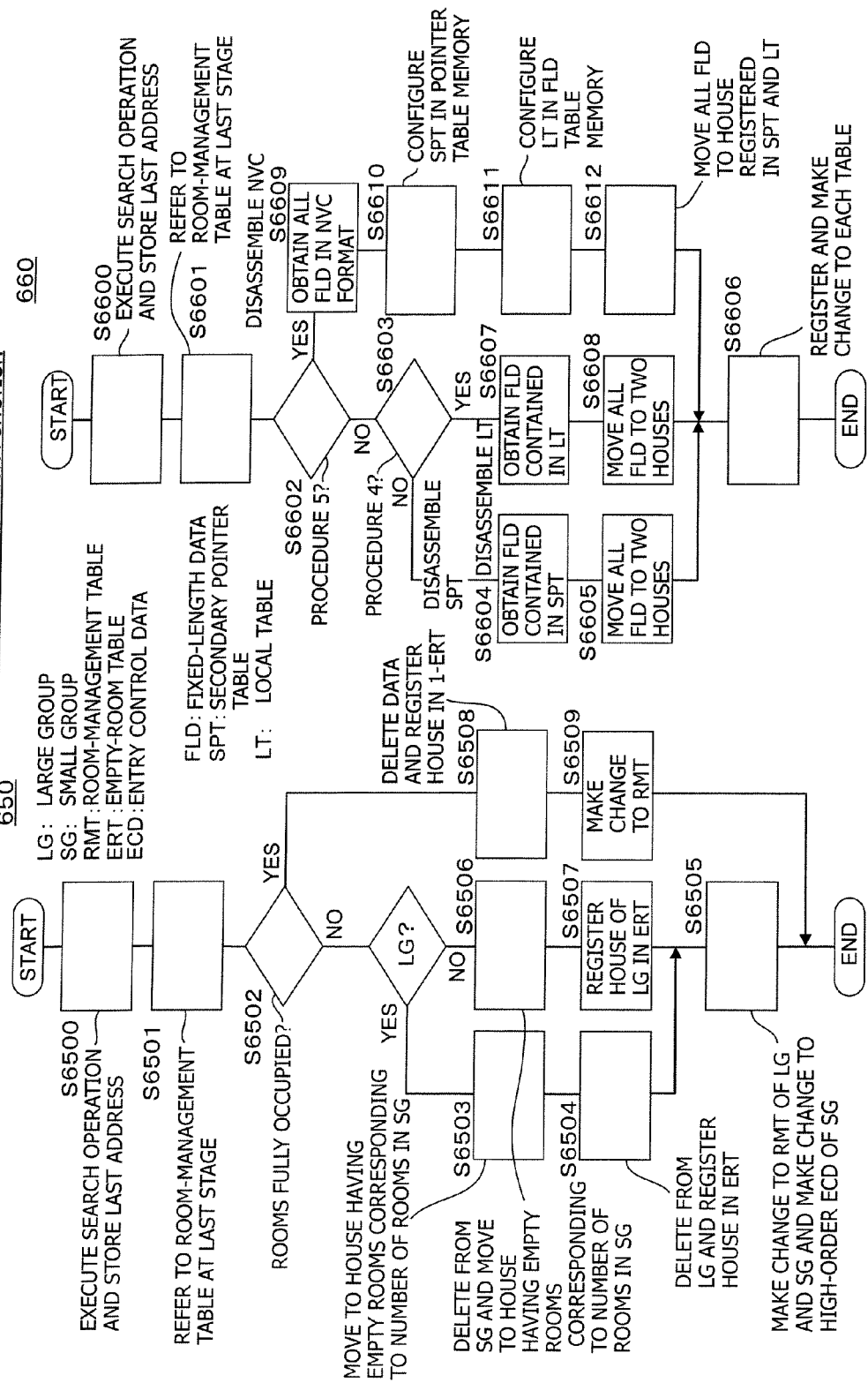
FIG. 29 includes flow charts showing a simple-deletion function and a structure-change deletion function in one embodiment of the present invention.

FIG. 29 shows a part of an example of the operation of the controller or sequencer that executes, in response to a request from the input-command execution function 670, a deletion function that does not require a structure change (the simple-deletion function 650). If all cases of the simple-deletion function 650 were illustrated in FIG. 29, the illustration would become complicated; therefore, details of the function will be explained by way of the description below. When the execution of a simple deletion command is accepted from the input-command execution function 670, fixed-length data in the deletion command is first searched for (S6500). The simple-deletion function 650 inputs the fixed-length data in the deletion command, to the management data 699 of the input-fixed-length-data processing means 100. An input search number is a search number assigned to the table-management controlling means 600, and zero is input for the input statistical data. A search operation using the search number assigned to the table-management controlling means 600 is finished by the output controlling function 840 when data is stored in the register S 812. When an index for the search number assigned to the table-management controlling means 600 is generated in the pointer processing means 200 shown in FIG. 7, the index is stored in the register P 217. During the search, the register P 217 is updated every time the pointer processing means 200 generates a table index 252. Thus, when the search is finished, the register P 217 holds the last index obtained when the fixed-length-data table is read. In addition, a search result, fixed-length-data name, and user data regarding the fixed-length data in the deletion command are stored in the register S 812 corresponding to the search number assigned to the table-management controlling means 600 and are read by the simple-deletion function 650.

Although not illustrated in FIG. 29, when a match search result is obtained, the execution of the simple-deletion function 650 is continued. When a mismatch result is obtained, the execution of the simple-deletion function 650 is suspended, and the result is reported to the host control apparatus. A case in which the search result indicates a match will be described below.

The room-management table 741 is referred to by using the index held by the register P 217 of the pointer processing means 200 (S6501), and it is checked whether the rooms in a house are fully occupied (whether eight rooms are occupied by a single group). When the rooms are not fully occupied, the house is constituted by two groups. At this point, when the situation is classified using the occupation state of a house and a group to which fixed-length data is deleted, there are the following possible cases: case (1) in which a large group and a small group co-reside in a house and fixed-length data is deleted from the large group; case (2) in which a large group and a small group co-reside in a house and fixed-length data is deleted from the small group; case (3) in which a large group and a small group can co-reside in a house but only a large group exists and fixed-length data is deleted therefrom; case (4) in which two groups having the same size co-reside in a house and fixed-length data is deleted from one of the groups; and case (5) in which two groups having the same size can co-reside in a house but only one group exists and fixed-length data is deleted from the group. FIG. 29 shows (1) and (2) and a case in which all rooms are occupied. Cases (1) to (5) will be described below.

(1) When a large group and a small group co-reside in a house (P) and fixed-length data is to be deleted from the large group, the small group is moved (S6503) and fixed-length data is deleted from the large group. Thereafter, the house (P) is registered in the ("the number of rooms in the small group"+1)-empty-room table 721 (S6504). As to the order of processes, the index of a house (Q) having empty rooms corresponding to the number of rooms owned by the small group is obtained from the empty-room table 721. The small group is moved to the house (Q). Parameters relevant to the small group are then copied to the room-management table 741 for the house (Q) and a high-order address in the room-management table 741 is used to write the index of the house (Q) to the entry control data in a high-order table. Next, the fixed-length data in the deletion command is deleted from the house (P) of the large group, and changes are made to parameters of the room-management table 741 for the house (P) and the structure-management table 761. The house (P) is registered in the ("the number of small-group rooms"+1)-empty-room table 721 (S6505).

(2) When a large group and a small group co-reside in a house (P) and fixed-length data is to be deleted from the small group, a house (Q) having one less empty room than the number of rooms in the small group is obtained from the empty-room table 721, fixed-length data in the deletion command is deleted from the small group, and the small group is moved to the house (Q) (S6506). Parameters relevant to the small group are then copied to the room-management table 741 for the house (Q), and a high-order address in the room-management table 741 is used to modify the structure-management table 761 and the entry control data in a high-order table. Next, the house (P) of the large group is registered in the empty-room table 721 corresponding to the number of rooms in the small group before the deletion (S6507), the address registered in the empty-room table 721 is written at a high-order address in the room-management table for the house (P), and changes are made to parameters corresponding thereto (S6505).

(3) When a large group and a small group can co-reside in a house but only a large group exists and fixed-length data is to be deleted therefrom, fixed-length data in the deletion command and data relevant to the fixed-length data are deleted from the house of the large group. This house is deleted from the empty-room table 721 corresponding to the number of rooms in a small group which were empty. Changes are made to parameters of the room-management table 741 for the house and the structure-management table 761. The house is then registered in the ("the number of small-group rooms that were empty"+1)-empty-room table 721.

(4) When two groups (called A and B) having the same size co-reside in a house (P), fixed-length data is to be deleted from one group A, and the number of rooms in the group is 2, 3, or 4, a house (Q) having one less empty room than the number of rooms in the group A is obtained from the empty-room table 721. After fixed-length data in the deletion command and data relevant to the fixed-length data are deleted from the group A, the group A is moved to the house (Q). Parameters relevant to the group A in the room-management table 741 for the house (Q) are then copied, and the high-order address in the room-management table 741 is used to write the index of the house (Q) to the entry control data in a high-order table and to modify the structure-management table 761. Next, the house (P) is registered in the empty-room table 721 corresponding to the number of rooms in the group B, the parameters of the group A in the room-management table 741 for the house (P) of the group B are changed to the address in the empty-room table 721 in which the house is registered. When the number of rooms in the group is 1, is fixed-length data in the deletion command and data relevant to the fixed-length data are deleted from the group A. Further, changes are made to the next process of a table indicated by a high-order address of the group A of the house (P) and relevant parameters. Next, the house (P) is registered in the empty-room table 721 whose number of rooms is 1, and the parameters of the group A in the room-management table 741 for the house (P) of the group B are changed to an address in the empty-room table 721 in which the house (P) is registered.

(5) When two groups (called A and B) having the same size can co-reside in a house but only one group (the group A) exists and fixed-length data is to be deleted therefrom, fixed-length data in the deletion command and data relevant to the fixed-length data are deleted from the house of the group A. When the number of rooms in the group is 2, 3, or 4, this house is deleted from the empty-room table 721 corresponding to the number of rooms in the group (B) which were empty. The house is registered in the ("the number of group B rooms that were empty"−1)-empty-room table 721. The address in the empty-room table 721 in which the house is registered is written to a high order address in the empty rooms in the room-management table 741 for the house. Then, parameters of the structure-management table 761 are changes. When the number of rooms in the group is 1, the house is registered in the empty-house table 701. Then, changes are made to the next process of a table indicated by a high-order address of the group A of the house and relevant parameters.

In FIG. 29, when the rooms in a house are fully occupied (when eight rooms are occupied by a single group), fixed-length data in the deletion command and data relevant to the fixed-length data are deleted from the house. The house is then registered in the empty-room table 721 whose number of room is 1 (S6508). Lastly, changes are made to parameters in the structure-management table 761 (S6509).

FIG. 29 shows a part of an example of the operation of the controller or sequencer that executes, in response to a request from the input-command execution function 670, a deletion function that requires a structure change (the structure-change deletion function 660). If all cases of the structure-change deletion function 660 were illustrated in FIG. 29, the illustration would become complicated; therefore, details of the function will be explained by way of the description below, as in the description of the simple-deletion function 650. When the execution of a structure-change deletion command is accepted from the input-command execution function 670, fixed-length data in the deletion command is first searched for (S6600). The structure-change deletion function 660 inputs the fixed-length data in the deletion command, to the management data 699 of the input-fixed-length-data processing means 100 (S6600). An input search number is a search number assigned to the table-management controlling means 600 and zero is input for the input statistical data. A search operation using the search number assigned to the table-management controlling means 600 is finished by the output controlling function 840 when data is stored in the register S 812. When an index for the search number assigned to the table-management controlling means 600 is generated in the pointer processing means 200 shown in FIG. 7, the index is stored in the register P 217. During the search, the register P 217 is updated every time the pointer processing means 200 generates a table index 252. Thus, when the search is finished, the register P 217 holds the last index obtained when the fixed-length-data table is read. In addition, a search result, fixed-length-data name, and user data regarding the fixed-length data in the addition command are stored in the register S 812 corresponding to the search number assigned to the table-management controlling means 600 and are read by the structure-change deletion function 660.

Although not illustrated in FIG. 29, when a match search result is obtained, the execution of the structure-change deletion function 660 is continued. When a mismatch result is obtained, the execution of the structure-change deletion function 660 is suspended and the result is reported to the host control apparatus. A case in which the search result indicates a match will be described below.

The room-management table 741 is referred to by using the index held by the register P 217 of the pointer processing means 200 (S6601) to obtain a high-order address. Next, the structure-management table 761 is referred to check a procedure number and a structure-change reason. In the case of procedure 3, the SPT is disassembled. In the case of procedure 4, the local table is disassembled. In the case of procedure 5, the NVC-format table structure is disassembled.

When the procedure number in the structure-management table 761 is 3, fixed-length data stored in a house managed by the SPT and a house managed by the pointer table and data relevant to the fixed-length data are moved to two houses (S6604 and S6605) and a format managed by the pointer table is configured. Since this description is given assuming that the size of the SPT is 8, segmentation into 9 houses (segment 0 to segment 8) is performed. Data used for the segmentation is 3 bits from bits used by the pointer-table index out of an entire index. For example, when the pointer-table index is 31 bits to 16 bits of an entire index (e.g., 32 bits), the SPT index is bit 15, bit 14, and bit 13. These are expressed by (bit 15, bit 14, bit 13). In this case, segment 0 is expressed by (000), segment 1 is expressed by (001), and segment 7 is similarly expressed by (111). Of 17 pieces of fixed-length data, segment 8 handles fixed-length data having a mask length of 17 bits (32 bits–15 bits) or 18 bits (32 bits–14 bits). Segment 0 to segment 7 are houses managed by the SPT and segment 8 is a house managed by the pointer table. Fixed-length data stored in each house are arranged in order of value.

A method for moving fixed-length data in houses in segment 0 to segment 8 to two houses will be described. First, two houses (P and Q) are obtained from the empty-house table 701. Fixed-length data having a maximum number in the houses in segments 7 and 8 are compared in size. Fixed-length data determined to be larger as a result of the comparison is moved to and stored at a place where the maximum value in the house P exists. The size comparison is performed using bit 15 to bit 0 of an entire index. Next, the fixed-length data determined to be smaller and fixed-length data subsequent to the fixed-length data determined to be larger are compared in size. This task is performed until the fixed-length data contained in the house in segment 8 are moved and stored. Thereafter, the fixed-length data belonging to the remaining segments are sequentially moved to and stored in the houses P and Q. In this case, the fixed-length data in the deletion command is excluded from targets of the value comparison, movement, and storage.

The houses belonging to segment 0 to segment 8 are registered in the empty-house table 701. In this case, depending on the segment, a house that does not have fixed-length data from the beginning exists. In this case, the fixed-length data are not moved to/stored in the house, and registration in the empty-house 701 is not performed either. Lastly, parameters of the houses P and Q are written to the corresponding entry control data, the address of the house P is written to a corresponding entry in the pointer table, and changes are made to the structure-management table 761 corresponding to the entry. After the processing described above, the structure change from the SPT is completed (S6606).

When the procedure number in the structure-management table 761 is 4, a local table managed by a high order address obtained from the index held by the register P 217 of the pointer processing means 200, i.e., an entry address in the SPT, is disassembled, and the fixed-length data managed by the local table, except for the fixed-length data in the deletion command, are moved to and stored in one house (S6607 and S6608). Since those fixed-length data cannot be stored in one entry in the SPT, the local table has been configured in the above. However, those fixed-length data can be stored in one house as a result of the deletion command. The local-table index uses 3 bits from bits used by the pointer-table and SPT indices out of an entire index. For example, when the pointer-table index is 31 bits to 16 bits of an entire index (e.g., 32 bits), the SPT index is bit 15, bit 14, and bit 13. Thus, the local-table index is bit 12, bit 11, and bit 10. These are expressed by (bit 12, bit 11, bit 10). In this case, segment 0 is expressed by (000), segment 1 is expressed by (001), and segment 7 is similarly expressed by (111).

In this task, first, one house P is obtained from the empty-house table 701. Since this description is given assuming that the size of a local table is 8, fixed-length data stored in houses segmented into 8 segments (segment 0 to segment 7) are sequentially moved from the house in segment 7 and stored. After the processing on the fixed-length data in the house in segment 7 is completed, processing on the fixed-length data in the house in segment 6 is performed. Such processing is performed on the fixed-length data in the house in segment 0. In this case, the fixed-length data in the deletion command is excluded from targets of movement and storage.

The houses belonging to segment 0 to segment 7 are registered in the empty-house table 701. In this case, depending on the segment, a house that does not have fixed-length data from the beginning exists. In this case, fixed-length data are not moved to/stored in the house and registration in the empty-house 701 is not performed either. Lastly, parameters of the house P are written to its own entry control data, the address of the house P is written to a corresponding entry in the SPT, and changes are made to the structure-management table 761 corresponding to the entry. After the processing, a structure change from the local table is finished.

When the procedure number in the structure-management table 761 is 5, the NVC-format table structure in procedure 5 is converted to a combined table structure of the SPT and the local table. Important points in this case will be pointed out below. A pointer-table entry to which the fixed-length data in the deletion command belongs indicates, in its next process, a search operation using the NVC operation, and a table structure associated with the entry is the NVC format. However, the structure-management table 761 corresponding to the entry employs a combination of the SPT and the local table to manage fixed-length data that work in the NVC format. Thus, the corresponding NVC-format structure-management table 761 is largely involved in the structure change operation. Before a description for the structure change operation is given, the structure of the NVC-format structure-management table 761 will be described.

For example, as in the description of the structure-change addition command, index 0 of an SPT that does not contain a local table and index 1 of an SPT that contains a local table (its index is 0) are expressed by (000) and (001, 000), respectively. Entry data corresponding to the NVC format of the structure-management table 761 are, in order from the left side, structure control data, the number of pieces of fixed-length data in an entry in the pointer table, the number of pieces of fixed-length data contained in a next house, and the number of pieces of fixed-length data stored in each entry in the SPT and the local table. The numbers of pieces of fixed-length data stored in each entry in the SPT and the local table are arranged in the sequence of entries and can be expressed by (111), (110), (101), (100), (011), (010), (001, 111), (001, 110), (001, 101), (001, 100), (001, 011), (001, 010), (001, 001), (001, 000), and (000) in decreasing order of value. This sequence shows an example in which the NVC format is managed in the form of the SPT and one local table by the structure-management table. If it is managed by multiple local tables, the number of entries for storing a number of pieces of fixed-length data is increased by (7*"the number of local tables"). The generation of the structure-change deletion command is determined when the number of pieces of fixed-length data in a next house in an entry in the structure-management table and the number of pieces of fixed-length data stored in each entry in the SPT and the local table become a specified number or less.

A method for comparing the values of fixed-length data arranged in order of value will be described. With the example described above, when the pointer-table index is 31 bits to 16 bits of an entire index (e.g., 32 bits), the SPT index is bit 15, bit 14, and bit 13 and the local-table index is bit 12, bit 11, and bit 10. These are merely used for classification into tables. Thus, even when size comparison is performed on bit 15 to bit 0 of an entire index, there is no problem with the above description. In addition, since it is size comparison using a mask, comparison of masked bits is meaningless. That is, if the mask is 23, bit 31 to bit 8 of an entire index are compared and bit 7 to bit 0 are meaningless. Thus, masked bits are handled as 0. An element in the NVC-format fixed-length-data table includes an extracted index (bit 15 to bit 0 of an entire index) and a fixed-length-data table index that is referred to as a result of value comparison with the extracted index (see FIG. 8). Based on the above description, the structure change operation in procedure 5 of the structure-change deletion will be described below. The structure change operation of the structure-change deletion command is the reverse of the structure-change operation of the structure-change addition command. First, the structure-management table 761 is referred to (S6609), an SPT and a local table are configured (S6610 and S6611), and a house (P) is obtained from the empty-house table 701. B '101' is set as the next process in an entry in the pointer table and the index of the house (P) is set as an index of the fixed-length-data table. B '010' is set as the next process of the entry control for the house (P), the address of entry 0 in the SPT is set as an address in the pointer table memory, and other parameters are set (S6610). B '011' is set as the next process of the entry control data for an entry in the SPT having a local table, the index of entry 0 in the local table is set as the index of the fixed-length-data table, and other parameters are set (S6611). With this processing, the preparation of the structure-change operation is finished.

The index of an NVC-format house held in an entry in the pointer table is used to analyze and make a change to the NVC-format table structure. Since houses are essentially configured with the SPT and local-table structure owned by the structure-management table 761, a description will be given using an example of an entry of the structure-management table 761. In the example, the numbers of pieces of fixed-length data stored in each entry of the SPT and the local table are arranged in the sequence of entries and can be expressed by (111), (110), (101), (100), (011), (010), (001, 111), (001, 110), (001, 101), (001, 100), (001, 011), (001, 010), (001, 001), (001, 000), and (000) in decreasing order of value. That is, houses corresponding to 15 pieces exist. This is the basic concept. Naturally, when the number of pieces of fixed-length data is 0, no house exists. Even when the number of pieces of fixed-length data in one entry is a specified value or less, they may be divided into some houses and stored. When the index of an NVC-format house indicates that a highest-order element correspond to (111) noted above, a fixed-length-data table index contained in the element is stored in entry (111) in the SPT, and B '101' is set as the next process. In this case, fixed-length data whose mask is located between bit 15 and bit 11 is moved from the house to the house (P). Needless to say, fixed-length data for which the structure-change command is issued is deleted from the house. When the number of pieces of fixed-length data in the house changes, the various-table modification, which was described in the simple deletion function, is performed.

In the above example, when an entry in the SPT is (001), processing for a house belonging to a local table is performed. When the index of an NVC-format house indicates that the element corresponds to (001, 111) noted above, a fixed-length-data table index contained in the element is stored in entry (111) in the local table and B '101' is set as the next process (S6612). As in the SPT, fixed-length data whose mask is located between bit 15 and bit 11 is moved from the house to the house (P). Needless to say, fixed-length data for which the structure-change command is issued is deleted from the house. When the number of pieces of fixed-length data in the house changes, the various-table modification, which was described in the simple deletion function, is performed.

For example, when the index of an NVC-format house indicates that the multiple elements correspond to (001, 111) noted above, fixed-length data in a house subsequent to a house having the maximum value of the elements is moved to and stored in the house having the maximum value. After fixed-length data of the houses of all elements corresponding to (001, 100) are moved and stored, a house whose rooms are empty is registered in the empty-room table corresponding to the number of empty rooms, and the address in the room empty-room table is stored in parameters in the empty-room-management table for the house. The index of a house whose fixed-length data are all stored is stored in entry (100) in the local table and B '101' is set as the next process (S6612). As in the SPT, in this case, fixed-length data whose mask is located between bit 15 and bit 11 is moved from the house to the house (P). Naturally, fixed-length data for which the structure-change command is issued is deleted from the house. Movement of fixed-length data to the house and storage of fixed-length data in the house are executed by the simple deletion function. After the processing described above, the structure change is completed.

Figure 30:
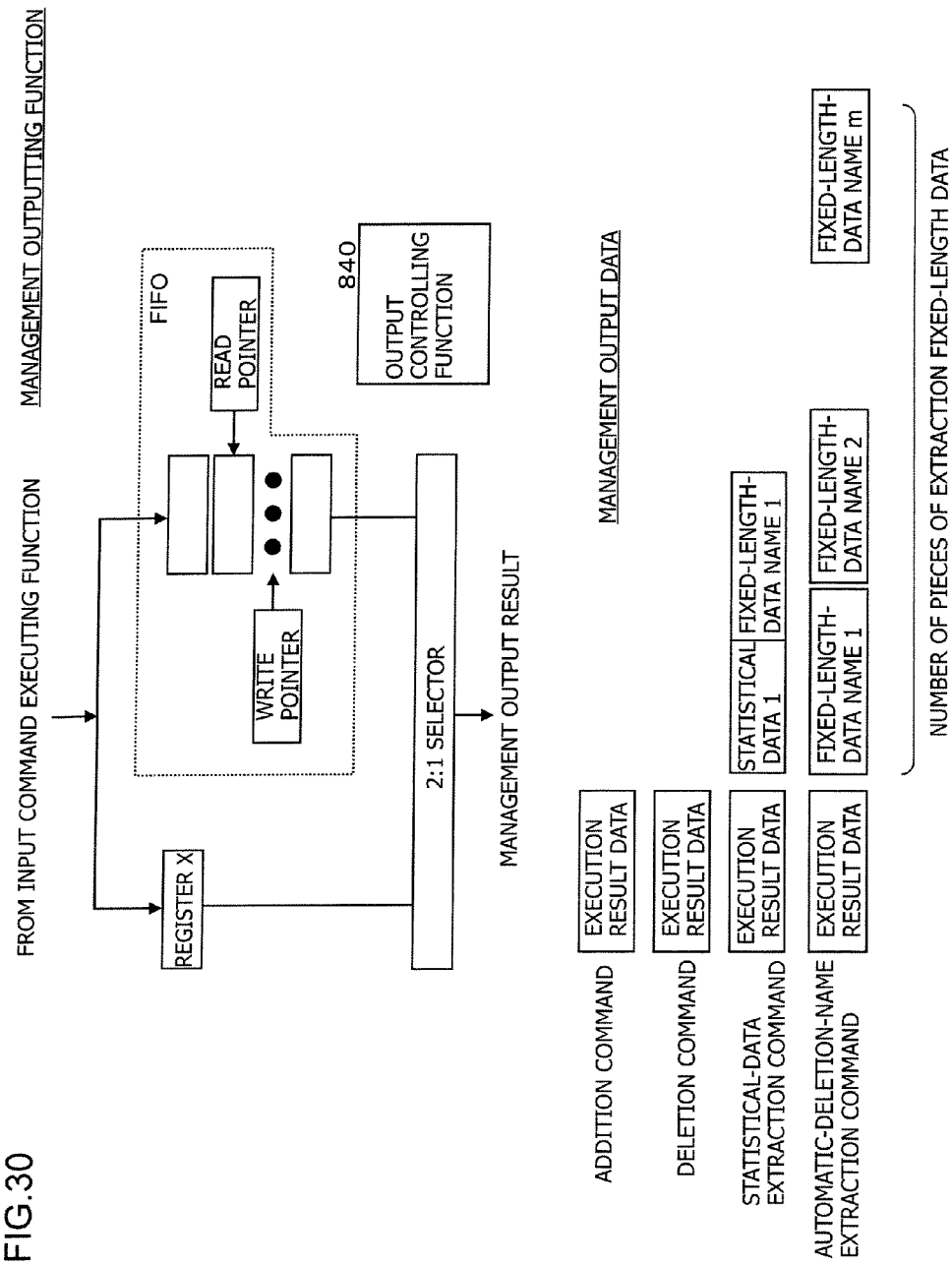
FIG. 30 is an explanatory diagram showing the block of a management outputting function and management output data in one embodiment of the present invention.

FIG. 30 shows an example of the management outputting function for outputting an execution result for the command (shown in FIG. 24) executed by the table-management controlling means 600. The execution result sent from the input-command execution function 670 is stored in a register X and data accompanying the execution result is stored in a FIFO register. When a large number of pieces of data are sent, the FIFO register complies with the sequence and holds the data by using a write pointer. When all data are sent, the output controlling function 840 first outputs the execution result stored in the register X. When next data exists, the output controlling function 840 outputs the data held in the FIFO register, in accordance with a read pointer.

FIG. 30 shows the contents of management output data. Only the execution result data is sent as the result of the execution of the addition command. Contents of the execution result data indicate that: (1) the execution was completed without any problem; (2) the addition is not performed since fixed-length data to be added exists or (2) the execution was completed, although fixed-length data to be added exists; (3) the addition could not be performed due to a memory shortage for addition; and so on. Only the execution result data is sent as the result of the execution of the deletion command. The contents of the execution result data in this case indicate that: (1) the execution was completed without any problem; (2) fixed-length data to be deleted does not exist; and so on. As a result of the execution of the statistical-data extraction command, the execution result data, the statistical data, and the fixed-length data name are output. In this case, execution-completion data is output as the execution result. As a result of the execution of the automatic-deletion name extraction command, the execution result data and automatically deleted fixed-length data names corresponding to a number specified by the command or all existing are output. In this case, execution-completion data is output as the execution result data.

Figure 31:
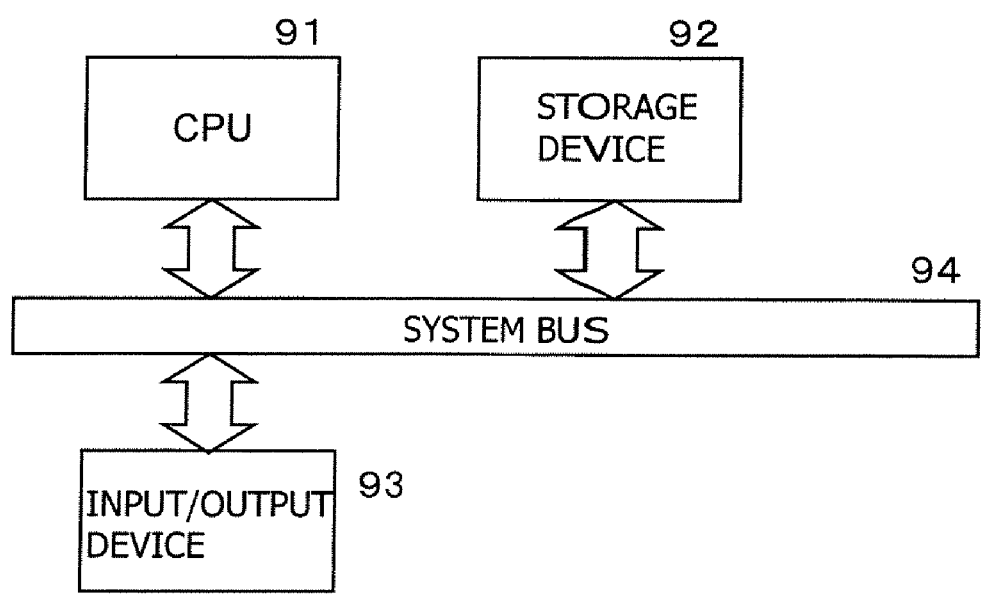
FIG. 31 is a block diagram showing an example of the configuration of a computer system to which a computer program and a storage medium are applicable in one embodiment of the present invention.

FIG. 31 is a block diagram showing an example of the configuration of a computer program and hardware that can use a storage medium. In FIG. 31, a computer system 90 includes a CPU (Central Processing Unit) 91, a storage device 92, and input/output device 93, which are connected to a system bus 94. The CPU 91 includes at least a computing device and a controlling device. The storage device 92 includes, for example, a built-in primary storage memory, a hard disk drive, and a floppy disk drive. When the computer program of the present invention is installed on the computer system 90, the computer program is stored in the hard disk drive and is loaded into the primary storage memory as needed. The primary storage memory of the storage device 55 or a cache memory provided in the CPU 91 implements the pointer table memory, fixed-length-data table memory, data-table memory, empty-house table memory, empty-room table memory, empty-room-management table memory, structure-management table memory, and so on in the present invention. The input/output device 93 has multiple input/output ports and can perform data communication with outside. For example, the hard disk or floppy disk drive of the storage device 92 reads the computer program of the present invention from a storage medium in which the program is stored.

As described above in detail, according to embodiments of the present invention, search processing for fixed-length-data table in which a large number of pieces of fixed-length data are stored can be executed, based on various search rules, at a speed of about 2 to 3 memory cycles. In addition, since the pipeline configuration is possible, the number of search processing operations per second becomes enormous. Since the user data and statistical data are managed in addition to search processing, the amount of data processing after searching can be reduced, the search processing is sped up, and the number of search processing operations is increased. In addition, since addition, deletion, and automatic deletion of fixed-length data is performed, the amount of heavy processing performed by a host control apparatus can be reduced. As described in the examples, the fixed-length-data searching apparatus, the fixed-length-data searching and managing apparatus, the managing method, and the searching method of the present invention are applicable to IP-address search operations and various filters which are often used in network communications. The present invention is also applicable to a computer program for causing a computer to function as an information processing apparatus to which the fixed-length-data searching and managing apparatus or the managing/searching method of the present invention is applied. In addition, the present invention is also applicable to a computer-readable storage medium in which the computer program is recorded.

Some illustrative embodiments according to the present invention have been described above in detail. It is apparent to those skilled in the art that various improvements can be made to the embodiments without substantially departing from the novel disclosure and advantages of the present invention. It is, therefore, intended that all of such improvements are also encompassed by the claims of the present invention.

The invention claimed is:

1. A fixed-length-data searching apparatus for communication comprising:

an input fixed-length-data processing unit for performing a specified process and producing an output, in response to an input of fixed-length-data to be searched for communication a first memory for storing a data table, the data table including an entry which contains various data regarding a communication packet corresponding to each fixed-length-data;

a second memory constituted by Q memory arrays, each of which can be read R bits at a time, wherein the second memory stores a fixed-length-data table, a local table, and a numeric value comparison table, wherein each of the tables has an entry which can hold Q-by-K members of either specific data corresponding to fixed-length-data required for searching or data required for searching, wherein each entry stores first entry control data, wherein each memory array can hold K members for each R bits, wherein the fixed-length-data table, the local table, and the numeric value comparison table each comprises a reading unit for reading the Q-by-K members and the first entry control data, and wherein Q and R are integers of 1 or greater, and K is an integer of 2 or greater;

a third memory for storing a pointer table and a secondary pointer table, wherein each of the pointer table and the secondary pointer table includes an entry which is specified by an index having a bit length shorter than the fixed-length-data, wherein the pointer table and the secondary pointer table each contains a memory address, data for controlling operation of a next step, and a parameter for determining the memory address, the memory address serving as a pointer to each entry of the fixed-length-data table, the local table, and the numeric value comparison table;

a comparator which operates as follows: if the first entry control data does not indicate a need for further comparison, then the comparator compares the Q-by-K members stored in the entry specified by the memory address in the fixed-length-data table, the local table, or the numeric value comparison table and the input fixed-length-data to be searched for, and outputs a result of the comparison, whereas if the first entry control data indicates a need for further comparison, the comparator compares the Q-by-K members stored in the entry specified by the memory address in the fixed-length-data table, the local table, or the numeric value comparison table and an output value from the input fixed-length-data processing unit, and outputs, as second entry control data, a result of the comparison and an instruction to require further comparison;

a pointer processing unit, which uses a pointer value corresponding to specific fixed-length-data output from the third memory according to the index, a parameter for determining a next process to be executed, and a memory address, an output value of the input fixed-length-data processing unit, and control data of one of the first and second entry control data, and operates as follows: if the number of members is small and no further comparison is required, then the pointer processing unit provides an address to be read and memory control data for specifying the fixed-length-data table that is stored in the second memory and for instructing readout thereof; if the number of members is large and no further comparison is required, then the pointer processing unit provides a memory address to be read and memory control data for specifying a local table that is stored in the second memory and has an entry with the same format as that of the fixed-length-data table and for instructing readout thereof; and if the number of members is very large and further comparison is required, then the pointer processing unit provides a memory address to be read and memory control data for specifying at least one of the secondary pointer table that is stored in the third memory and has an entry with the same format as that of the pointer table and the numeric value comparison table that is stored in the second memory, and for instructing, readout thereof;

a modifying unit for reading from the first memory and modifying data that is stored in the data table, and corresponds to the fixed-length-data matched in the comparison result, and an output unit for outputting search results output from the comparator and the modifying unit, a fixed-length-data name, and other data, wherein the index is contained in output values from the input fixed-length-data processing unit or the pointer processing unit.

2. The fixed-length-data searching apparatus for communication according to claim 1, wherein the input fixed-length-data processing unit comprises a unit for outputting a name or search number assigned to an input in order to search the fixed-length-data which was input to be searched for; and wherein the search number from the input fixed-length-data processing unit is used for performing a number of searching operations in parallel in the respective memories and processing units in the fixed-length-data searching apparatus.

3. The fixed-length-data searching apparatus for communication according to claim 1, wherein the input fixed-length-data processing unit for processing the fixed-length-data which was input to be searched comprises at least one of a unit for using all or a part of the input fixed-length-data, calculating a hash value in accordance with a specified hash function, and supplying the hash value; or a unit for outputting all or a part of the input fixed length data fixed-length-data.

4. The fixed-length-data searching apparatus for communication according to claim 1, wherein the pointer table comprises at least one of:

data required for an address generating unit in each processing unit which uses an input from the pointer table;

a plurality of bits indicating a processing procedure in each processing unit which uses an input from the pointer table;

a plurality of bits indicating a procedure for reading only a relevant memory array among a plurality of memory arrays constituting a fixed-length-data table memory in which the fixed-length-data table is stored; and a plurality of bits indicating a memory address regarding fixed-length-data in the fixed-length-data table which can be searched for without comparison with the input fixed-length-data in the comparator.

5. The fixed-length-data searching apparatus for communication according to claim 1, wherein the pointer processing unit comprises an address generator for generating, based on at least one of an output from the pointer table and an output from the fixed-length-data table, at least one of the following addresses:

an address of the fixed-length-data table;

an address of a numeric value comparison table produced in the fixed-length-data table and a database which contains the fixed-length-data table;

an address of the secondary pointer table; and an address of a local table produced in the database.

6. The fixed-length-data searching apparatus for communication according to claim 1, wherein each member comprises:

fixed-length-data;

a fixed-length-data name unique to the fixed-length-data; and element control data.

7. The fixed-length-data searching apparatus for communication according to claim 6, wherein each member further comprises one of a prefix mask used for prefix mask unit or a local mask used for local mask unit, wherein the prefix mask unit is a unit contained in the comparator, in which when the comparator compares bits of multiple pieces of fixed-length-data stored in the fixed-length-data table and bits of the input fixed-length-data to be searched for, the prefix mask unit uses, with respect to an output of the comparator, only a unique bit length from the highest bit of the fixed-length-data to obtain the comparison result; and wherein the local mask unit is a unit, in which when the comparator compares bits of multiple pieces of fixed-length-data stored in the fixed-length-data table and bits of the input fixed-length-data to be searched for, the local mask unit masks an output of the comparator, with mask data unique to the fixed-length-data to obtain the comparison result.

8. The fixed-length-data searching apparatus for communication according to claim 6, wherein the element control data comprises multiple bits for controlling a unit for automatically deleting a member in the fixed-length-data table.

9. The fixed-length-data searching apparatus for communication according to claim 1, wherein the entry control data comprises multiple bits indicating a processing content for an output read from the fixed-length-data table.

10. The fixed-length-data searching apparatus for communication according to claim 1, wherein the fixed-length-data table comprises, as entry control data, at least one of:
an address for reading the fixed-length-data table;
an address for reading a secondary pointer table;
an address for reading a local table therein; and
an address for reading a numeric-value comparison table therein.

11. The fixed-length-data searching apparatus for communication according to claim 1, wherein the fixed-length-data table comprises a configuration in which a local table and a numeric value comparison table are configurable therein.

12. The fixed-length-data searching apparatus for communication according to claim 1, wherein the first and third memories have N and U memory arrays (N and U are integers of 1 or greater), respectively, each memory array having corresponding M and V memory banks (M and V are integers of 1 or greater), and the second memory has P memory arrays (P is an integer of 1 or greater),
wherein the memory arrays and each memory bank in at least one of the first, second and third memories are operable independently and operate in parallel, each memory bank comprising at least one of a unit which can read or write multiple bits at a time and a reading unit for efficiently performing parallel operation of the memory banks in the memory array.

13. The fixed-length-data searching apparatus for communication according to claim 1, wherein the data table comprises a unit for holding static data that corresponds to the fixed-length-data stored in the fixed-length-data table and that is irrelevant to a search operation, and dynamic data that is modified by a result of the search operation.

14. The fixed-length-data searching apparatus for communication according to claim 1,
wherein the modifying unit comprises a unit for reading data from the data table based on the result output by the comparator and a unit for modifying the read data and writing the modified data to the data table.

15. The fixed-length-data searching apparatus for communication according to claim 1, wherein the comparator comprises:
N*R bit maskable bit comparators and value comparators (* is an operation sign indicating multiplication) for simultaneously comparing, based on a specified method, multiple pieces of fixed-length-data stored in the fixed-length-data table with the input fixed-length-data to be searched for and for outputting the comparison result,
wherein the N*R maskable bit comparators and the value comparators comprise a unit that is reconfigurable with a variable bit length to perform comparison with the fixed-length-data or part thereof, N being an integer of 1 or greater indicating the number of memory arrays and R being the number of bits that are simultaneously readable from or writable to the memory banks in the memory arrays.

16. The fixed-length-data searching apparatus for communication according to claim 1,
wherein the comparator compares bits of multiple pieces of fixed-length-data stored in the fixed-length-data table and bits of the input fixed-length-data to be searched for and the comparator comprises at least one of:
global mask unit for masking an output of the comparator bit by bit to obtain the comparison result;
local mask unit for masking an output of the comparator with mask data unique to the fixed-length-data to obtain the comparison result; and
prefix mask unit for using, with respect to an output of the comparator, only a unique bit length from the highest bit of the fixed-length-data to obtain the comparison result.

17. The fixed-length-data searching apparatus for communication according to claim 1, wherein the comparator comprises a unit for outputting the comparison result together with a name or search number assigned to the input.

18. The fixed-length-data searching apparatus for communication according to claim 1,
wherein the output unit comprises at least one of:
a unit for outputting the comparison result received from the comparator and user data received from the modifying unit in synchronization with each other; and
a unit for outputting, as a command slot of the fixed-length-data searching apparatus, a name or search number attached to the input of fixed-length-data to be searched for, to prevent-overflow of the input.

19. A fixed-length-data searching method used by a fixed-length-data searching apparatus for communication, the apparatus comprising: a first memory for storing a data table that holds various data regarding a communication packet; a second memory for storing a fixed-length-data table, a local table, and a numeric value comparison table; a third memory for storing a pointer table and a secondary pointer table; and at least one of a data processing unit, the method comprising:
a step of computing, by the data processing unit, an index with respect to an input of fixed-length-data to be searched for;
a step of reading an entry indicated by the index from a pointer table stored in the third memory;
a first pointer processing step of obtaining, by the data processing unit, a table indication, issued based on data in an entry read from the pointer table, which specifies the table to be read next, among a fixed-length-data table, a local table, a numeric value comparison table, and a secondary pointer table;
a step of repeating the first pointer processing step if the table indication specifies a secondary pointer table, by reading an entry of the secondary pointer table from the third memory based on the memory address of the third memory contained in the entry, and obtaining a memory address indicating an entry of a fixed-length-data table corresponding to the index;
a reading step, if the table indication specifies any one of a fixed-length-data table, a local table, and a numeric value comparison table, of reading an entry of the specified table from the second memory based on the memory address of the second memory contained in the entry and obtaining the members not more than Q-by-K and first entry control data;

a first comparison step, in which if first entry control data does not indicate a need for further comparison, the data processing unit compares multiple members of fixed-length-data read from the second memory and the input fixed-length-data to be searched for, whereas if the first entry control data indicates a need for further comparison, the data processing unit compares multiple members of fixed-length-data read from the second memory and an output value from the input fixed-length-data processing unit, and thereby providing, as second entry control data, a result of the comparison and an indication to request further comparison;

a second pointer processing step, in which the data processing unit uses second entry control data, and if the control data indicates a need for further comparison, any one of the memory addresses of the second and third memories is used to store the control data in the third memory, and to store the control data in a secondary pointer table having the same format as that of the pointer table or in the second memory, so that the data processing unit obtains memory control data for instructing reading the entry from any of the fixed-length-data tables;

a step of reading an entry from a fixed-length-data table or a secondary pointer table to be read next, based on the second pointer processing step;

a second comparison step, in which if a fixed-length-data table is selected, the data processing unit repeats the first comparison step in the case of a need for further comparison being indicated, based on the entry read from the fixed-length-data table;

a step of reading a fixed-length-data table, in which if a secondary pointer table is selected, the data processing unit reads the fixed-length-data table based on the entry read from the secondary pointer table;

a third comparison step of repeating the first comparison step in the case of a need for further comparison being not indicated, based on the entry read from the fixed-length-data table;

a reading step in which if the result of the first, second, or third comparison step indicates a match, various data corresponding to the matched fixed-length-data stored in the fixed-length-data table is read from the data table;

a modifying step of modifying data read by the reading step; and an outputting step of outputting a search result, a fixed-length-data name, and other data output in the comparing steps and the modifying step.

20. A fixed-length-data searching and managing apparatus for communication comprising:

a fixed-length-data searching apparatus comprising:

an input fixed-length-data processing unit for performing a specified process and producing an output, in response to an input of fixed-length-data to be searched for communication;

a first memory for storing a data table, the data table including an entry which contains various data regarding a communication packet corresponding to each fixed-length-data;

a second memory constituted by Q memory arrays, each of which can be read R bits at a time, wherein the second memory stores a fixed-length-data table, a local table, and a numeric value comparison table, wherein each of the tables has an entry which can hold Q-by-K members of either specific data corresponding to fixed-length-data required for searching or data required for searching, wherein each entry stores first entry control data, wherein each memory array can hold K members for each R bits, wherein the fixed-length-data table, the local table, and the numeric value comparison table each comprises a reading unit for reading the Q-by-K members and the first entry control data, and wherein Q and R are integers of 1 or greater, and K is an integer of 2 or greater;

a third memory for storing a pointer table and a secondary pointer table, wherein each of the pointer table and the secondary pointer table includes an entry which is specified by an index having a bit length shorter than the fixed-length-data, wherein the pointer table and the secondary pointer table each contains a memory address, data for controlling operation of a next step, and a parameter for determining the memory address, the memory address serving as a pointer to each entry of the fixed-length-data table, the local table, and the numeric value comparison table;

a comparator which operates as follows: if the first entry control data does not indicate a need for further comparison, then the comparator compares the Q-by-K members stored in the entry specified by the memory address in the fixed-length-data table, the local table, or the numeric value comparison table and the input fixed-length-data to be searched for, and outputs a result of the comparison, whereas if the first entry control data indicates a need for further comparison, the comparator compares the Q-by-K members stored in the entry specified by the memory address in the fixed-length-data table, the local table, or the numeric value comparison table and an output value from the input fixed-length-dataprocessing unit, and outputs, as second entry control data, a result of the comparison and an instruction to require further comparison;

a pointer processing unit, which uses a pointer value corresponding to specific fixed-length-data output from the third memory according to the index, a parameter for determining a next process to be executed, and a memory address, an output value of the input fixed-length-data processing unit, and control data of one of the first and second entry control data, and operates as follows: if the number of members is small and no further comparison is required, then the pointer processing unit provides an address to be read and memory control data for specifying the fixed-length-data table that is stored in the second memory and for instructing readout thereof; if the number of members is large and no further comparison is required, then the pointer processing unit provides a memory address to be read and memory control data for specifying a local table that is stored in the second memory and has an entry with the same format as that of the fixed-length-data table and for instructing readout thereof; and if the number of members is very large and further comparison is required, then the pointer processing unit provides a memory address to be read and memory control data for specifying at least one of the secondary pointer table that is stored in the third memory and has an entry with the same format as that of the pointer table and the numeric value comparison table that is stored in the second memory, and for instructing readout thereof;

a modifying unit for reading from the first memory and modifying data that is stored in the data table and corresponds to the fixed-length-data matched in the comparison result; and an output unit for outputting search results output from the comparator and the modifying unit, a fixed-length-data name, and other data, wherein the index is contained in output values from the input fixed-length-data processing unit or the pointer processing unit;

a table-management controlling unit for executing an input table-change command;

an empty-house table memory for storing an empty-house table referenced when the table-management controlling unit executes the table-change command;

an empty-room table memory for storing an empty-room table referenced when the table-management controlling unit executes the table change command;

a room management table memory for storing a room management table referenced when the table-management controlling unit executes the table-change command;

a structure-management table memory for storing a structure-management table referenced when the table-management controlling unit executes the table-change command; and a management outputting unit for outputting an execution result after the table-management controlling unit executes the table change command.

* * * * *